United States Patent [19]
Baxter

[11] Patent Number: 5,805,871
[45] Date of Patent: Sep. 8, 1998

[54] SYSTEM AND METHOD FOR PHASE-SYNCHRONOUS, FLEXIBLE-FREQUENCY CLOCKING AND MESSAGING

[75] Inventor: Michael A. Baxter, Sunnyvale, Calif.

[73] Assignee: Ricoh Company Ltd., Japan

[21] Appl. No.: 501,970

[22] Filed: Jul. 21, 1995

[51] Int. Cl.$^6$ .................................................. G06F 1/04
[52] U.S. Cl. ..................................... 395/555; 395/200.78
[58] Field of Search .................................... 395/800, 555, 395/556, 200.78

[56] References Cited

U.S. PATENT DOCUMENTS

| | | | |
|---|---|---|---|
| 3,245,048 | 4/1966 | Carter et al. | 340/172.5 |
| 3,358,236 | 12/1967 | Weber | 328/58 |
| 3,988,696 | 10/1976 | Sharpe | 331/1 A |
| 4,322,643 | 3/1982 | Preslar | 307/528 |
| 4,771,440 | 9/1988 | Fromm | 375/52 |
| 4,817,197 | 3/1989 | Shimizu et al. | 455/208 |
| 4,870,699 | 9/1989 | Garner et al. | 455/76 |
| 4,884,035 | 11/1989 | Cok et al. | 328/133 |
| 4,905,305 | 2/1990 | Garner et al. | 455/182 |
| 4,980,653 | 12/1990 | Shepherd | 331/16 |
| 5,038,117 | 8/1991 | Miller | 331/16 |
| 5,053,639 | 10/1991 | Taylor | 307/269 |
| 5,079,768 | 1/1992 | Flammer | 370/94.1 |
| 5,101,117 | 3/1992 | Johnson et al. | 307/269 |
| 5,130,987 | 7/1992 | Flammer | 370/103 |
| 5,258,660 | 11/1993 | Nelson et al. | 307/269 |
| 5,258,724 | 11/1993 | Tanis et al. | 331/1 A |
| 5,280,474 | 1/1994 | Nickolls et al. | 370/60 |
| 5,285,116 | 2/1994 | Thaik | 307/443 |
| 5,303,412 | 4/1994 | Kushner | 455/260 |
| 5,361,277 | 11/1994 | Grover | 375/107 |
| 5,375,258 | 12/1994 | Gillig | 455/87 |

(List continued on next page.)

FOREIGN PATENT DOCUMENTS 0 313 491 A1  4/1989  European Pat. Off. .
93/14587  7/1993  WIPO .

OTHER PUBLICATIONS

Koukourlis, C.S., Houlis, P.H. & Sahalos, J.N. "A General Purpose Differential Digital Modulator Implementation Incorporating a Direct Digital Synthesis Method," *IEEE Transactions on Braodcasting*, vol. 39, No. 4, Dec. 1993, pp. 383–389.

Garodnick, Joseph, Greco, John & Schilling, Donald L. "Response of an All Digital Phase–Locked Loop," *IEEE Transactions on Cummunications*, vol. com–22, No. 6, Jun. 1974, pp. 751–763.

Gardner, Floyd M. and Heck, John F. "Phaselock Loop Cycle Slipping Caused by Excessive Angle Modulation," *IEEE Transactions on Communications*, vol. com–26, No. 8, Aug. 1978, pp. 1307–1309.

(List continued on next page.)

*Primary Examiner*—Eric Coleman
*Attorney, Agent, or Firm*—Fenwick & West LLP

[57] ABSTRACT

A master time-base unit generates quadrature-phase sinusoidal system reference signals that are phase-locked to a frequency reference oscillator. Based upon messaging signals received from an external source, each system reference signals is modulated according to direct carrier amplitude modulation, and is distributed to local time-base units via a transmission line. Within each local time-base unit, local reference signals and an offset signal are generated, where the local reference signals are phase-locked to the modulated system reference signals. A local reference signal and the offset signal are mixed to generate a local timing signal via frequency upconversion. A frequency-divided version of the local timing signal is phase-locked to a frequency-divided version of a local reference signal. Reprogrammable frequency dividers in combination with phase-lock facilitate the programmable specification of local timing signal frequencies. Within each local time-base unit, the modulated system reference signals are synchronously demodulated to produce bit sequences. The bit sequences are converted into synchronous messages and/or synchronous data, facilitating system-wide broadcast-type operations characterized by latencies measured in nanoseconds.

39 Claims, 29 Drawing Sheets

U.S. PATENT DOCUMENTS

| | | | |
|---|---|---|---|
| 5,446,766 | 8/1995 | Wray | 375/373 |
| 5,450,044 | 9/1995 | Hulick | 332/103 |
| 5,461,632 | 10/1995 | Lomp | 371/43 |
| 5,466,117 | 11/1995 | Resler et al. | 414/799 |
| 5,481,573 | 1/1996 | Jacobowitz | 375/356 |
| 5,506,878 | 4/1996 | Chiang | 377/39 |
| 5,511,173 | 4/1996 | Yamaura et al. | 395/375 |
| 5,524,243 | 6/1996 | Gheorghiu | 395/650 |
| 5,550,515 | 8/1996 | Liang et al. | 331/11 |
| 5,557,783 | 9/1996 | Oktay et al. | 395/550 |
| 5,561,792 | 10/1996 | Ganapathy | 395/550 |
| 5,577,075 | 11/1996 | Cotton | 375/356 |

OTHER PUBLICATIONS

Baden, C.C.E. "Flexible Digital Modulator Structures Using DDS Techniques," Telecommunications Research Group, at the University of Bradford.

Adler, Robert. "A Study of Locking Phenomena in Oscillators," *Proceedings of the IEEE,* vol. 61, No. 10, Oct. 1973, pp. 1380–1385.

Yen, Chu–Sun. "Phase–Locked Sampling Instruments," *IEEE Transactions on Instrumentation and Measurement,* Mar–Jun. 1965, pp. 64–68.

O'Leary, P., Horvat, H. and Maloberti, F. "Direct digital synthesis applied to modulators for data communication," *Journal of Semicustom Ics,* vol. 8, No. 3, 1991, pp. 32–41.

Bondarev, A.N. "Effect of Digital Frequency Synthesizer Imperfections on Digital Reciever Characteristics," *Telecommunications and Radio Engineering,* vol. 45, No. 2, Feb. 1990, pp. 76–77.

Bryukhanov, Yu A. "Control of the Duration of the Transients in a Digital Phase Locked Loop System," *Telecommunications and Radio Engineering,* vol. 47, No. 7, Jul. 1992, pp. 13–16.

Balodis, M. "Laboratory Comparison of TANLOCK* and Phaselock Recievers," *Porceedings of the 1964 National Telemetering Conference* (Jun. 2–4, 1964, Los Angeles, CA), pp. 1–11.

Gupta, S.C. "Transient Analysis of a Phase–Locked Loop Optimized for a Frequency Ramp Input," *IEEE Transations on Space Electronics and Telemetry,* Jun. 1964, pp. 79–84.

Acampora, A. and Newton, A. "Use of Phase Subtraction to Extend the Range of a Phase–Locked Demodulator," *RCA Review,* Dec. 1966, pp. 577–599.

Viterbi, A.J. "Acquisition and Tracking Behavior of Phase–Locked Loops," *National Aeronaultics and Space Administration Contract No. NASw–6,* (External Publication No. 673) Jul. 14, 1959.

Seki, Kazuhiko, Sakata, Tetsu and Kato, Shuzo. "A Digitalized Quadrature Modulator for Fast Frequency Hopping," *IEICE Trans. Commun.,* vol. E77–B, No. 5, May 1994, pp. 656–662.

Crozier, Stewart, Datta, Ravi and Sydor, John. Direct Digital FR Synthesis and Modulation for MSAT Mobile Applications, Department of Communications, Communications Research Centre (Ontario, Canada), pp. 399–403.

Nauta, Henk C. and Nordholt, Ernst H. "A Novel High–Dynamic–Range PLL System for Synchronous Detection in AM Receivers," *IEEE Transactions on Consumer Electronics,* vol. CE–31, No. 3, Aug. 1985, pp. 447–455.

Martin, Larry. "Use Programmable Logic Devices to Enhance Phase–Locked Oscillator Performance," Oct. 1995, pp. 30–40.

Smith, Brian Cantwell. "Reflection and Semantics in LISP," Xerox Corporation (Intelligent Systems Laboratory: Corporate Accession P84–00030), Jun. 1984, pp. 1–32.

des Rivieres, Jim and Smith, Brian Cantwell. "The Implementation of Procedurally Reflective Languages," Xerox corporation (Intelligent Systems Laboratory: Corporate Accession P84–00070), Jul. 1984, pp. 1–36.

New Bernie and Hoflich, Wolfgang. "Harmonic Frequency Synthesizer and FSK Modulator," Xilinx Application Note (XAPP 009.000), pp. 8.165–8.168.

Knapp, Steven K. "Using Programmable Logic to Accelerate DSP Functions," Xilinx, Inc., 1995, pp. 1–8.

New, Bernie. "Compex Digital Waveform Generator," Xinlinx Application Note (XAPP 008.002), pp. 8.163–8.164.

McCune, Jr., Earl W. "Digital Communications Using Direct Digital Synthesis," Digital RF Solutions, pp. 413–417.

McCune, Jr., Earl W. "Direct Digital Synthesis and the Numerically Controlled, Modulated Oscillator," Digital RF scluctions, pp. 413–424.

Chrisfield, R.P., Doan, D.T., Williams, K.R. and Wrage, R.H. "Phase–Locked Clocking," *IBM Technical Disclosure bulletin,* vol. 23, No. 7A, De. 1980, pp. 2924–2926.

Wooton, R.M. "Auto–Reference Phase–Locked–Loop Clock Generator," *IBM Technical Disclousre Bulletin,* vol. 24, No. 5, Oct. 1981, pp. 2294–2296.

Leung, W.C. "Digital Phase–Locked Loop Circuit," *IBM Technical Disclosure Bulletin,* vol. 18, No. 10, Mar. 1976, pp. 3334–3337.

Grice, D.G. "PLA Implementation of a PLO," *IBM Technical Disclosure Bulletin,* vol. 19, No. 7, Dec. 1976, pp. 2600–2602.

Newman, E.L. "Voltage–Controlled Oscillator," *IBM Technical Disclosure Bulletin,* vol. 19, No. 10, Mar. 1977, pp. 3899–3900.

Beaven, P.A. "Phase–Locked Clock Generator," *IBM Technical Disclosure Bulletin,* vol. 22, No. 8B, Jan. 1980, pp. 3835–3838.

Dialog Search on "Bipolar Integrated Tech Inc".

Ahmed, Rahim & and Malarsie, Louis; "Optimizing For Low Skew And Phase Error On PLL Based Clock Generators", 1994, National Semiconductor Application Note 968, pp. 1–5.

Andren, Carl; "A Brief Tutorial On Spread Spectrum And Packet Radio", May 1996, Harris Semiconductor—Tech Brief, No. TB337.1, pp. 1–3.

CMP Publications via Fulfillment by Individual, Inc.; "Altera Speeds FPGA Clock with a PLL", May 28, 1996.

Miscellaneous Abstracts from Derwent Search.

Miscellaneous Abstract on IBM Patents.

Vaidya, Chai; "Phase–Locked Loop Based Clock Generators", Jun. 1995, National Semiconductor ASIP Applications Application Note 1006, pp. 1–6.

Partial translation of EP 0 313 491 A1.

|    | Amplitude of First Modulated System Reference Signal | First/In Phase Dibit | Amplitude of Second Modulated System Reference Signal | Second/ Quadrature Phase Dibit | Function |
|---|---|---|---|---|---|
| 1  | 1Vm | <00> | 1Vm | <00> | Assert SSR |
| 2  | 3Vm | <10> | 1Vm | <00> | Data {001} inserted into SDC |
| 3  | 4Vm | <11> | 1Vm | <00> | Toggle SI |
| 4  | 2Vm | <01> | 1Vm | <00> | Data {000} inserted into SDC |
| 5  | 1Vm | <00> | 3Vm | <10> | Data {011} inserted into SDC |
| 6  | 3Vm | <10> | 3Vm | <10> | Set SI to L |
| 7  | 4Vm | <11> | 3Vm | <10> | Data {010} inserted into SDC |
| 8  | 2Vm | <01> | 3Vm | <10> | Set SI to H |
| 9  | 1Vm | <00> | 4Vm | <11> | Set SE to L |
| 10 | 3Vm | <10> | 4Vm | <11> | Data {101} inserted into SDC |
| 11 | 4Vm | <11> | 4Vm | <11> | Set SE to H |
| 12 | 2Vm | <01> | 4Vm | <11> | Data {100} inserted into SDC |
| 13 | 1Vm | <00> | 2Vm | <01> | Data {110} inserted into SDC |
| 14 | 3Vm | <10> | 2Vm | <01> | Toggle SE |
| 15 | 4Vm | <11> | 2Vm | <01> | Data {111} inserted into SDC |
| 16 | 2Vm | <01> | 2Vm | <01> | idle: non-signalling condition |

FIG. 5B

|  | CRS Frequency (MHz) | K1 | K2 | LTO Frequency (MHz) | Local Timing Signal Frequency (MHz) |
|---|---|---|---|---|---|
| 1 | 25 | 170 | 50 | 60 | 85 |
| 2 | 25 | 174 | 50 | 62 | 87 |
| 3 | 25 | 178 | 50 | 64 | 89 |
| 4 | 25 | 182 | 50 | 66 | 91 |
| 5 | 25 | 186 | 50 | 68 | 93 |
| 6 | 25 | 190 | 50 | 70 | 95 |
| 7 | 25 | 194 | 50 | 72 | 97 |
| 8 | 25 | 198 | 50 | 74 | 99 |
| 9 | 25 | 202 | 50 | 76 | 101 |
| 10 | 25 | 206 | 50 | 78 | 103 |
| 11 | 25 | 210 | 50 | 80 | 105 |
| 12 | 25 | 214 | 50 | 82 | 107 |
| 13 | 25 | 218 | 50 | 84 | 109 |
| 14 | 25 | 222 | 50 | 86 | 111 |
| 15 | 25 | 226 | 50 | 88 | 113 |
| 16 | 25 | 230 | 50 | 90 | 115 |

FIG. 7A

|    | CRS Frequency (MHz) | K1  | K2 | LTO Frequency (MHz) | Local Timing Signal Frequency (MHz) |
|----|---------------------|-----|----|---------------------|--------------------------------------|
| 1  | 20                  | 160 | 40 | 60                  | 80                                   |
| 2  | 21                  | 168 | 42 | 63                  | 84                                   |
| 3  | 22                  | 176 | 44 | 66                  | 88                                   |
| 4  | 23                  | 184 | 46 | 69                  | 92                                   |
| 5  | 24                  | 192 | 48 | 72                  | 96                                   |
| 6  | 25                  | 200 | 50 | 75                  | 100                                  |
| 7  | 26                  | 208 | 52 | 78                  | 104                                  |
| 8  | 27                  | 216 | 54 | 81                  | 108                                  |
| 9  | 28                  | 224 | 56 | 84                  | 112                                  |
| 10 | 29                  | 232 | 58 | 87                  | 116                                  |
| 11 | 30                  | 240 | 60 | 90                  | 120                                  |
| 12 | 31                  | 248 | 62 | 93                  | 124                                  |
| 13 | 32                  | 256 | 64 | 96                  | 128                                  |
| 14 | 33                  | 264 | 66 | 99                  | 132                                  |
| 15 | 34                  | 272 | 68 | 102                 | 136                                  |
| 16 | 35                  | 280 | 70 | 105                 | 140                                  |

FIG. 7B

SYSTEM AND METHOD FOR PHASE-SYNCHRONOUS, FLEXIBLE-FREQUENCY CLOCKING AND MESSAGING

CROSS-REFERENCE TO RELATED APPLICATION

The present invention relates to U.S. Pat. application Ser. No. 08/423,560, entitled "System and Method for Scalable, Parallel, Dynamically Reconfigurable Computing," filed on Apr. 17, 1995.

BACKGROUND OF THE INVENTION

1. Field of the Invention

The present invention relates generally to systems and methods for timing signal distribution, and also to systems and methods for message broadcast in multiprocessing and multicomputing environments. More particularly, the present invention is a system and method for generating, distributing, and receiving phase-synchronous, flexible-frequency clocking and messaging signals.

2. Description of the Background Art

The generation and distribution of a reference timing signal is a fundamental operation performed in many computing environments. For example, in multiprocessing systems, a reference timing signal is typically generated and distributed to each individual processor. As another example, a master node within a network may generate and distribute a reference timing signal for network synchronization purposes.

In prior art digital systems that generate and distribute a reference timing signal, the reference timing signal is typically the highest-frequency signal used within the system. Processing elements within the system receive the reference timing signal via a sequence of buffer amplifiers connected along a distribution path. Each processing element is either clocked at the frequency of the reference timing signal, or at a fixed frequency-divided or downconverted frequency that is less than that of the reference timing signal.

The operating frequency of each processing element within the digital system is determined during system design. Following system manufacture, modification of the operating frequency of one or more processing elements, particularly in an independent manner, is generally a difficult, time-consuming, and costly process. A need therefore exists for a means by which processing element operating frequencies can be easily and independently modified.

The need for increased processing power has led to the development of systems operating at ever-faster frequencies. As previously indicated, the reference timing signal is typically the highest-frequency signal distributed and utilized within a system. The system-wide distribution of the reference timing signal, however, becomes increasingly difficult as operating frequencies increase. Complex impedance and signal reflection effects along the distribution path increase with increasing frequency, leading to pulse attenuation and distortion. In nearly all digital systems, the reference timing signal is generated and distributed as a square wave pulse train. To preserve pulse fidelity and propagate signal edge transitions with minimal skew, amplification stages used along the distribution path require exceptionally stable gain as well as exceptionally high slew rate performance. As the frequency of the reference timing signal increases, satisfaction of gain and slew rate performance requirements undesirably necessitates the use of expensive components. Moreover, when the reference timing signal passes through multiple amplification stages, such as would be the case for a conventional clock distribution tree, cumulative pulse skew cannot be avoided. Each amplification stage produces some amount of signal edge jitter, thereby increasing the uncertainty in reference timing signal arrival time at any given processing element within the system. What is needed is a means for generating and distributing a reference timing signal that minimizes the problems described above while simultaneously maximizing the operating frequency of each processing element.

Computing systems characterized by multiple processing elements often require the distribution of a common set of messaging signals to each processing element within the system. The common set of messaging signals may be used, for example, to indicate that a system-wide reset is required. The distribution of a common set of messaging signals to each processing element is conventionally known as a broadcast operation.

In the prior art, messaging signal distribution is generally accomplished via: 1) a dedicated interconnect network; and 2) specialized hardware and possibly specialized software associated with each processing element, dedicated to receiving messaging signals from and transferring messaging signals to the interconnect network. The maximum time required to transfer messaging signals from one processing element to another in the prior art may range from a few microseconds to a few hundred microseconds, depending upon system size and messaging signal flow management techniques employed. Such latency unacceptably precludes the possibility of performing high-speed broadcast operations. Prior art systems and methods for messaging signal distribution are incapable of performing broadcast operations in which the latency is on the order of the time required for signals to propagate through hardware within an individual processing element (i.e., nanoseconds). Moreover, in the prior art, messaging signal transfer delays may vary significantly between different locations on the interconnect network. This in turn precludes the possibility of federating the processing elements to perform simultaneous or nearly-simultaneous operations on a system-wide level. What is needed is a means for overcoming the aforementioned limitations in the prior art.

SUMMARY OF THE INVENTION

The present invention is a system and method for phase-synchronous, flexible-frequency clocking and messaging. The system preferably comprises a master time-base unit, a system bus having a termination, and at least one local time-base unit. Within the master time-base unit, a calibrated reference system generates a first and a second system reference signal that are phase-locked to an output of a crystal frequency reference oscillator. The first and second system reference signals are sinusoidal signals having a quadrature phase relationship. A modulation state machine receives messaging signals from an external source, synchronously converts the messaging signals into bit sequences, and performs a level conversion to convert each bit sequence into an information signal. A modulator performs direct carrier amplitude modulation upon the first and second system reference signals based upon the information signals, and outputs the modulated system reference signals to the system bus. The system bus is preferably implemented as transmission lines that distribute the modulated system reference signals to each local time-base unit. The implementation of the system bus in this manner allows for the precise determination of the arrival time of a signal sent from the master time-base unit to any given local time-base unit.

Within each local time-base unit, a local reference oscillator generates a first and a second local reference signal that are phase-locked to the first and second modulated system reference signals. Additionally, a Local Timing Oscillator (LTO) generates an offset signal. Preferably, the frequency of the offset signal is higher than that of the system reference signals. A mixer and a diplexer generate a local timing signal from the second local reference signal and the offset signal via frequency upconversion. Thus, the frequency of the local timing signal is preferably equal to the sum of the frequency of the offset signal and the frequency of the system reference signals. The local timing signal is output to a local timing line to preferably provide timing information to one or more external components associated with the local time-base unit.

A first and a second frequency divider respectively provide a frequency-divided version of the local timing signal and a frequency-divided version of the second local reference signal to a phase and frequency detector. The phase and frequency detector outputs a tuning signal that controls the frequency of the offset signal generated by the LTO. In this manner, the frequency-divided version of the local timing signal is phase-locked to the frequency-divided version of the second local reference signal.

The first frequency divider is characterized by a divider constant k1, and the second frequency divider is characterized by a divider constant k2. In the preferred embodiment, the first and second frequency dividers are implemented using a reconfigurable logic device such as a Field Programmable Gate Array (FPGA). Such an implementation provides for the selective modification of the divider constants k1 and k2, thereby facilitating the programmable specification of the frequency of the local timing signal at any given time. The present invention thus provides a means by which the frequency output by any given local time-base unit can be easily modified, independently of any other local time-base unit.

Within each local time-base unit, a coherent reception unit synchronously demodulates the modulated system reference signals and recovers bit sequences that were encoded onto the first and second system reference signals by the modulator within the master time-base unit. A message assembly unit synchronously decodes the bit sequences into messages and data according to a signaling plan. The messages selectively include a synchronous system reset signal, a system interrupt signal, and a system event signal. A data selector outputs the messages to either of a first or a second signaling channel. Within the message assembly unit, data signals are grouped into data words, each of which is output to a synchronous data channel.

As described above, the present invention encodes messages directly onto the system reference signals via direct carrier amplitude modulation. The modulated system reference signals are distributed to each local time-base unit via transmission lines (i.e., wire). The present invention thus facilitates synchronous broadcast-type operations characterized by latencies many times lower than in the prior art.

BRIEF DESCRIPTION OF THE DRAWINGS

FIG. 5B is a table defining a preferred signaling plan of the present invention;

FIG. 7A is a table showing a preferred local frequency plan of the present invention;

FIG. 7B is a table showing a preferred system frequency plan of the present invention;

DETAILED DESCRIPTION OF THE PREFERRED EMBODIMENTS

Figure 1:
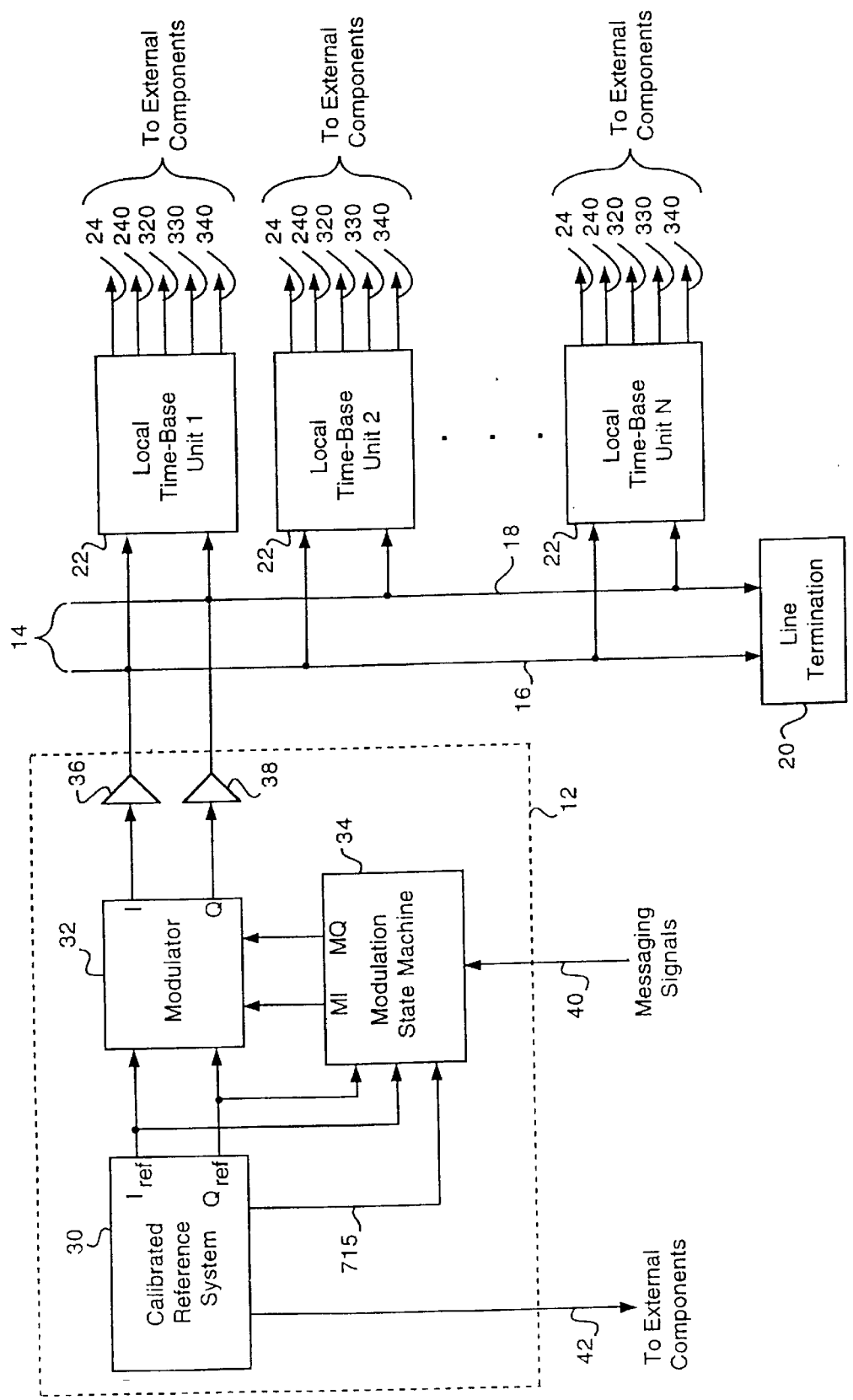
FIG. 1 is a block diagram of a preferred embodiment of system for phase-synchronous, flexible-frequency clocking and messaging constructed in accordance with the present invention.

Referring now to FIG. 1, a block diagram of a preferred embodiment of a system 10 for phase-synchronous, flexible-frequency clocking and messaging constructed in accordance with the present invention is shown. The system 10 preferably comprises a master time-base unit 12, a system bus 14, a line termination 20, and at least one local time-base unit 22. Preferably, the system 10 includes multiple local time-base units 22. The master time-base unit 12 has a first output coupled to a first line 16 of the system bus 14, a second output coupled to a second line 18 of the system bus 14, an input coupled to a messaging signal source via a first message line 40, and a reset output that provides a reset signal to one or more components external to the system 10 via a reset line 42. The messaging signal source is preferably a computer external to the system 10. Each local time-base unit 22 has a first and second input coupled to the first and second lines 16, 18 of the system bus 14. Each local time-base unit 22 also includes a timing output that provides a local timing signal to one or more components external to the system 10 via a local timing line 24; a lock output that provides a first lock signal to one or more external components via a first lock indication line 240; a first signaling output that provides a first set of signals to external components via a first signaling channel 320; a second signaling output that provides a second set of signals to external components via a second signaling channel 330; and a data output that provides data to external components via a synchronous data channel 340. The line termination 20 has a first and second input coupled to the first line 16 and the second line 18 of the system bus 14, respectively. The line termination 20 is preferably an impedance matched to that of the system bus 14. Those skilled in the art will recognize that in an alternate embodiment in which the system bus 14 comprises more than two lines 16, 18, each such line would terminate at the line termination 20.

Within the master time-base unit 12, system reference signals are generated for providing a system-wide frequency reference. Elements within the master time-base unit 12 selectively modulate the system reference signals according to messaging signals received via the first message line 40. The system bus 14 delivers the modulated system reference signals to each local time-base unit 22. Within each local time-base unit 22, a local timing signal is generated, and the system reference signals are demodulated. One or more components external to the system 10 preferably utilize the local timing signal, the demodulated system reference signals, and/or information derived from the demodulated system reference signals. Herein, an external component is preferably a processing unit, a computer, or a device associated with a computer system. The system 10 of the present invention is preferably utilized within the context of a parallel computing system, such as that described in U.S. Pat. application Ser. No. 08/423,560, entitled "System and Method for Scalable, Parallel, Dynamically Reconfigurable Computing." The internal structure and functionality of each element of the present invention is described in detail below.

Master Time-Base Unit

Referring again to FIG. 1, the master time-base unit 12 preferably comprises a Calibrated Reference System (CRS) 30, a modulator 32, a Modulation State Machine (MSM) 34, a first distribution amplifier 36, and a second distribution amplifier 38. The CRS 30 has a first reference output and a second reference output coupled to a first carrier input and a second carrier input of the modulator 32, respectively; a third reference output coupled to a reference input of the MSM 34 via a reference line 715; and a reset output that forms the master time-base unit's reset output. In addition to its first and second carrier inputs, the modulator 32 has a first modulation input and a second modulation input coupled to a first and second modulation output of the MSM 34, respectively. The modulator 32 further has a first output coupled to an input of the first distribution amplifier 36, and a second output coupled to an input of the second distribution amplifier 38. In addition to the couplings described above, the MSM 34 also has an input that forms the input of the master time-base unit 12, at which messaging signals are received. Finally, the first distribution amplifier 36 has an output that forms the master time-base unit's first output, and the second distribution amplifier 38 has an output that forms the master time-base unit's second output. In an exemplary embodiment, each of the first and second distribution amplifiers 36, 38 are implemented using a National Semiconductor LM6181 current feedback operational amplifier (National Semiconductor Corporation, Santa Clara, Calif.).

The CRS 30 preferably generates a first system reference signal and a second system reference signal at its first and second reference outputs, respectively, to produce the system reference signals. In the preferred embodiment, the first and second system reference signals are sinusoidal signals having a quadrature phase relationship. That is, the phase difference between the first and second system reference signals is $\pi/2$.

Figure 2A:
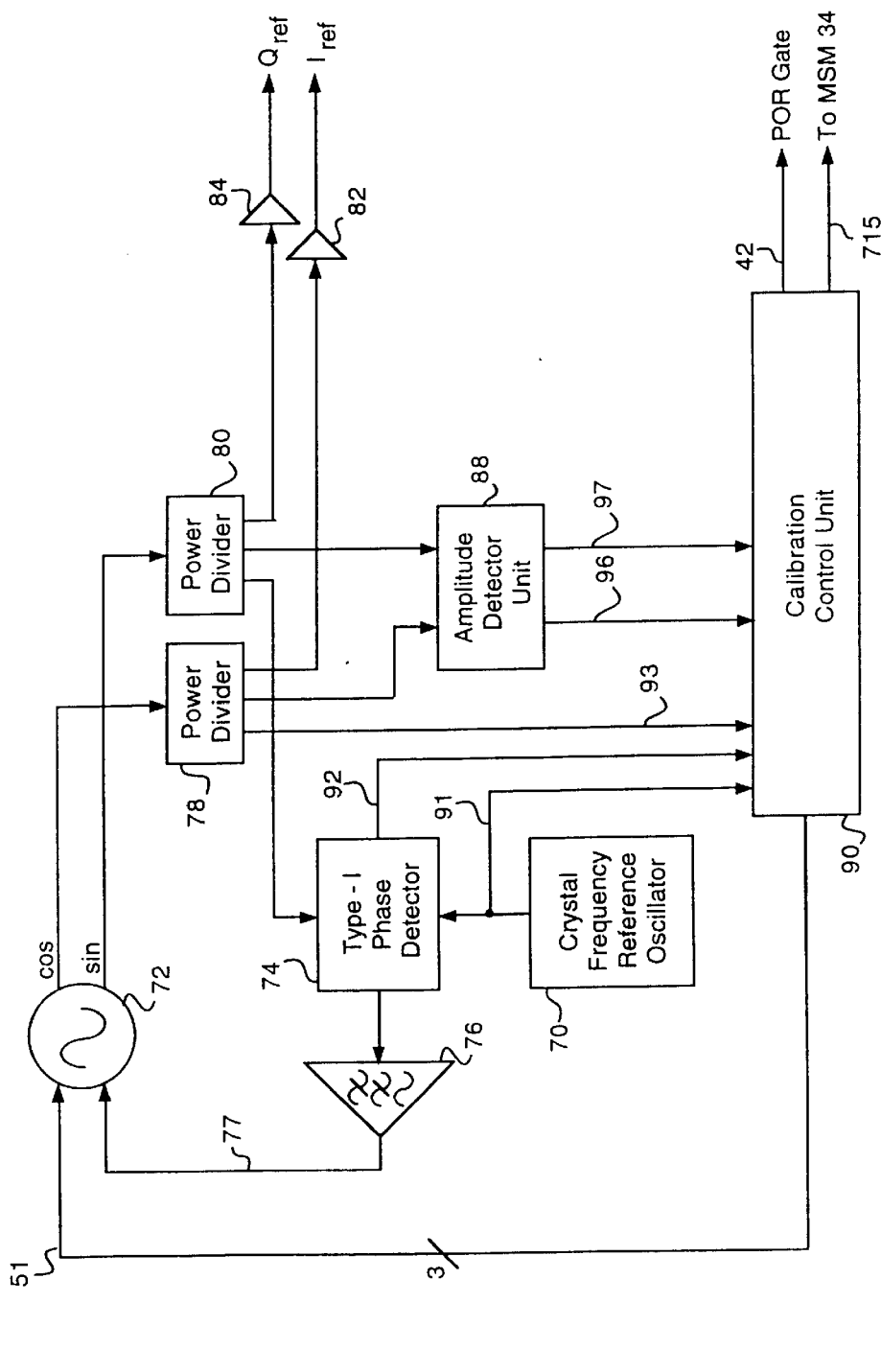
FIG. 2A is a block diagram of a first and preferred embodiment of a Calibrated Reference System of the present invention.

Referring now to FIG. 2A, a block diagram of a first and preferred embodiment of the Calibrated Reference System 30 is shown. The CRS 30 preferably comprises a crystal frequency reference oscillator 70, a system Quadrature Reference Oscillator (QRO) 72, a first phase detector 74, a first loop filter 76, a first power divider 78, a second power divider 80, a first buffer amplifier 82, a second buffer amplifier 84, an amplitude detector unit 88, and a calibration control unit 90. The crystal frequency reference oscillator 70 is preferably a conventional crystal oscillator that generates an original frequency reference signal. The original frequency reference signal serves as a base frequency to which the first and second system reference signals are phase-locked, as will be described in detail hereafter. The system QRO 72 preferably generates an in-phase reference signal and a quadrature-phase reference signal in a manner described in detail below in relation to FIG. 3D. The first phase detector 74 and the first loop filter 76 form a conventional phase-locked loop for maintaining phase lock between the original frequency reference signal and the quadrature-phase reference signal (and hence also the in-phase reference signal). The first phase detector 72 is coupled to receive the original frequency reference signal and a first reduced-power version of the quadrature-phase reference signal provided by the second power divider 80. The first phase detector 72 is coupled to deliver a first phase error signal to the first loop filter 76, which in turn is coupled to deliver a first tuning signal to the system QRO 72 via a first calibration line 77. In the preferred embodiment, the first phase detector 74 is a type-I phase detector, and the first loop filter 76 is a low-pass filter, both of which are utilized to implement phase locking in a conventional manner that will be readily apparent to those skilled in the art. The system QRO 72 is additionally coupled to receive calibration signals from the calibration control unit 90 via a second calibration line 51, as will be described in detail below with reference to FIG. 3A.

The first and second power dividers 78, 80 preferably comprise conventional balanced power-divider circuitry coupled to receive the in-phase and quadrature-phase reference signals, respectively. The first power divider 78 provides a first reduced-power version of the in-phase reference signal to the calibration control unit 90, a second reduced-power version of the in-phase reference signal to the amplitude detector unit 88, and a third reduced-power version of the in-phase reference signal to the first buffer amplifier 82. Similarly, the second power divider 80 provides a second reduced-power version of the quadrature-phase reference signal to the amplitude detector unit 88, and a third reduced-power version of the quadrature-phase reference signal to the second buffer amplifier 84. In the preferred embodiment, the second reduced-power version of the in-phase reference signal and the second reduced-power version of the quadrature-phase reference signal have identical peak amplitudes, as do the third reduced-power versions of the in-phase and quadrature-phase reference signals. The first buffer amplifier 82 has an output that forms the first reference output of the CRS 30, and thus outputs the first system reference signal. Similarly, the second buffer amplifier 84 has an output that forms the second reference output of the CRS 30, and therefore outputs the second system reference signal. As described above, the in-phase and quadrature-phase reference signals are each phase-locked to the original frequency reference signal. Because the first and second system reference signals are reduced-power versions of the in-phase and quadrature-phase reference signals, the first and second system reference signals are phase-locked to the original frequency reference signal as well.

The amplitude detector unit 88 preferably comprises two conventional amplitude detectors, such that a first amplitude detector provides an in-phase amplitude signal and a second amplitude detector provides a quadrature-phase amplitude signal. Those skilled in the art will recognize that the system 10 described herein is inherently Alternating Current (AC) coupled. If in an alternate embodiment the maintenance of a particular Direct Current (DC) level is required, circuitry for detecting one or more DC offsets could be included in a manner analogous to that for the amplitude detector unit 88, in a manner that will be readily understood by those skilled in the art.

The calibration control unit 90 receives signals generated within the CRS 30, and in turn generates a set of calibration signals that are provided to the system QRO 72 via the second calibration line 51. The calibration control unit 90 is preferably coupled to receive: the original frequency reference signal via a frequency input line 91; a second lock signal output by the first phase detector 74 via a second lock indication line 92; the first reduced-power version of the in-phase reference signal via a power monitoring line 93; the in-phase amplitude signal via a first amplitude line 96; and the quadrature-phase amplitude signal via a second amplitude line 97. The calibration control unit 90 additionally outputs a synchronized Power-On/Reset (POR) signal to form the reset output of the CRS 30, and a voltage reference signal to form the third reference output of the CRS 30.

Figure 3A:
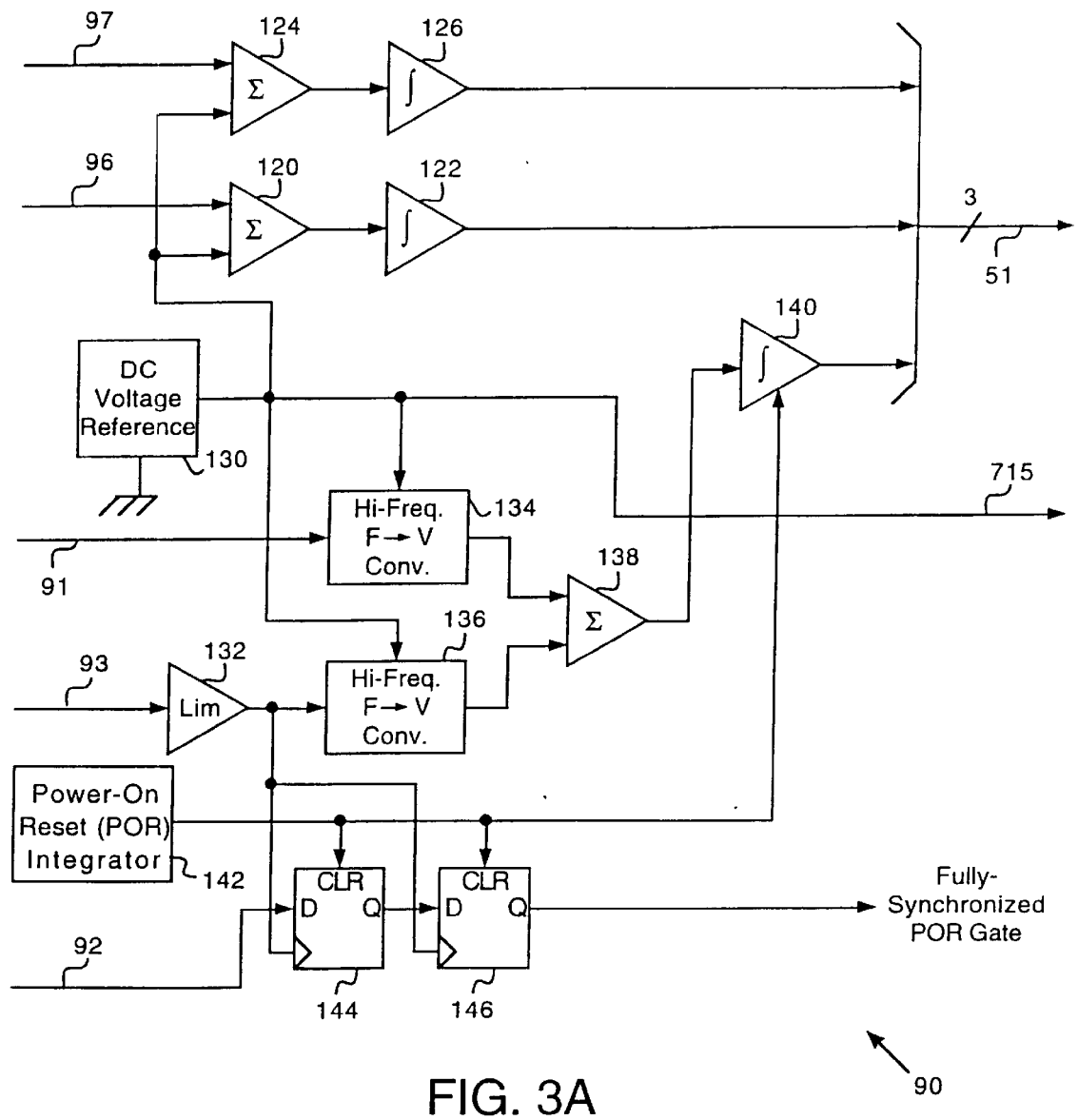
FIG. 3A is a block diagram of a preferred embodiment of a calibration control unit of the present invention.

Referring now to FIG. 3A, a block diagram of a preferred embodiment of the calibration control unit 90 is shown. The calibration control unit 90 preferably comprises a first amplitude difference amplifier 120, a first amplitude error integrator 122, a second amplitude difference amplifier 124, a second amplitude error integrator 126, a DC voltage reference 130, a first limiter 132, a first Frequency to Voltage (F–V) converter 134, a second F–V converter 136, a frequency difference amplifier 138, a frequency error integrator 140, a POR integrator 142, a first flip-flop 144, and a second flip flop 146.

The first amplitude difference amplifier 120 is coupled to receive the in-phase amplitude signal via the first amplitude line 96. The first amplitude difference amplifier 120 additionally has an input coupled to an output of the DC voltage reference 130. The first amplitude difference amplifier 120 outputs an amplitude error signal that is received by the first amplitude error integrator 122, which in turn outputs a first level adjustment signal. In a like manner, the second amplitude difference amplifier 124 has inputs coupled to both the second amplitude line 97 and the output of the DC voltage reference 130. The second amplitude difference amplifier 124 outputs an amplitude error that is received by the second amplitude error integrator 126, which in turn outputs a second level adjustment signal.

Figure 3B:
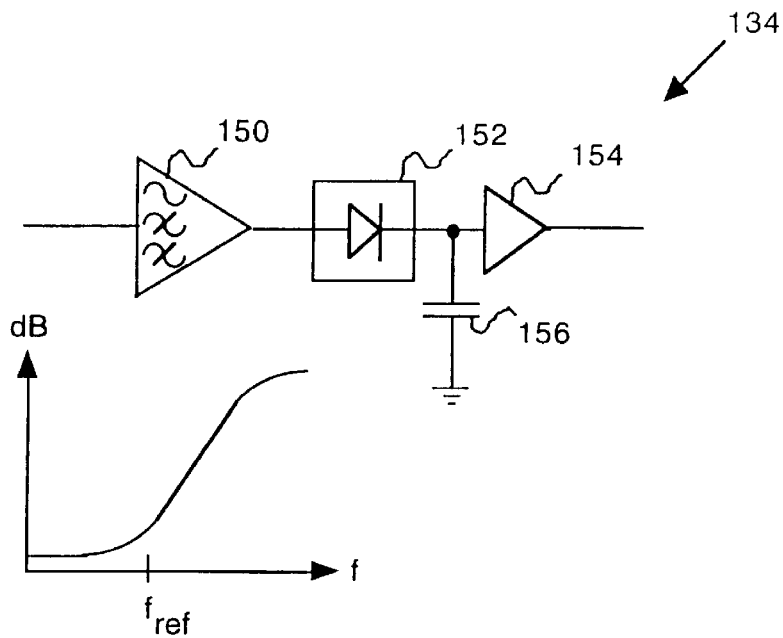
FIG. 3B is a block diagram of a preferred embodiment of a first Frequency-to-Voltage converter of the present invention.

The first F–V converter 134 receives the original frequency reference signal via the frequency input line 91, and outputs a first voltage in response. Referring now to FIG. 3B, a block diagram of a preferred embodiment of the first F–V converter 134 is shown. The first F–V converter 134 preferably comprises a high-pass filter 150 having a transmission characteristic as shown; a peak detector 152; an output buffer 154; and a capacitor 158. The high-pass filter's stop-band edge is preferably defined as shown in FIG. 3B, where $f_{ref}$ is the frequency output by the crystal frequency reference oscillator 70.

The second F–V converter 136 preferably has a structure and transmission characteristic identical to that of the first F–V converter 134. In conjunction with the first limiter 132, the second F–V converter 136 receives the first reduced-power version of the in-phase reference signal via the power monitoring line 93, and outputs a second voltage in a conventional manner. The frequency difference amplifier 138 outputs a voltage error signal indicating a voltage error between the first and second voltages, and thus generates a voltage-indicated frequency error between the signals applied to the inputs of the first and second F–V converters 134, 136. The frequency error integrator 140 receives the output of the frequency difference amplifier 138, and outputs a second tuning signal.

Each of the first level adjustment signal, the second level adjustment signal, and the second tuning signal are output by the calibration control unit 90 and delivered to the system QRO 72 via the second calibration line 51.

Figure 3C:
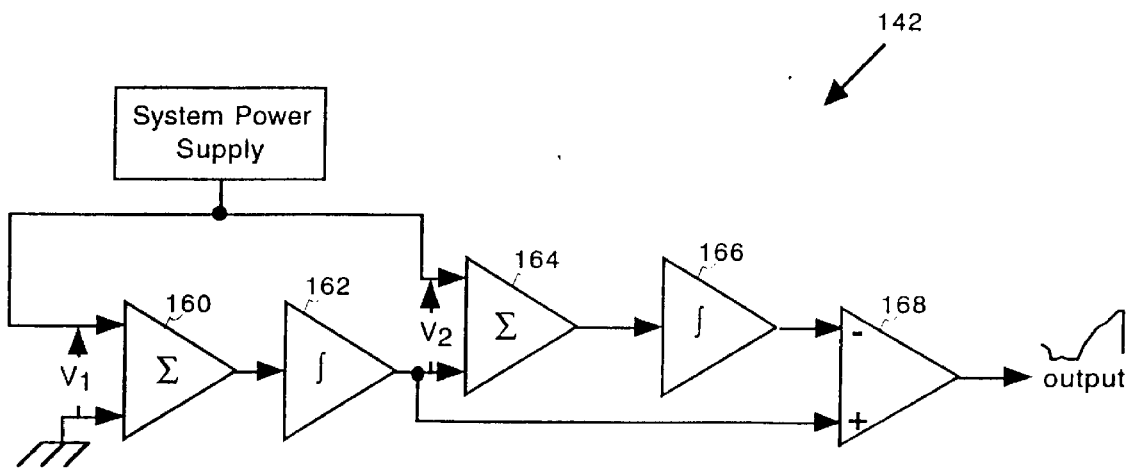
FIG. 3C is a block diagram of a preferred embodiment of a Power-On Reset integrator of the present invention.

As previously mentioned, the calibration control unit 90 additionally outputs a synchronized POR signal to form the master time-base unit's reset output. The synchronized POR signal is generated via the POR integrator 142, the first flip-flop 144, and the second flip-flop 146. The POR integrator 142 generates an early gating signal that indicates when a system power supply voltage has stabilized to a predetermined level following a POR condition. Referring now to FIG. 3C, a block diagram of a preferred embodiment of the Power-On/Reset integrator 142 is shown. The POR integrator 142 comprises a first difference amplifier 160, a first error integrator 162, a second difference amplifier 164, a second error integrator 166, and a comparator 168. The first difference amplifier 160 has a first input coupled to electrical ground, a second input coupled to a voltage output of a system power supply 170, and an output coupled to an input of the first error integrator 162. The second difference amplifier 164 has a first input coupled to the voltage output of the system power supply 170, a second input coupled to the output of the first error integrator 162, and an output coupled to an input of the second error integrator 166. Finally, the comparator 168 has a first input coupled to the output of the first error integrator 162 and a second input coupled to the output of the second error integrator 166. The comparator 168 additionally has an output that forms the output of the POR integrator 142.

The first difference amplifier 160 measures the rise of the system power supply voltage relative to electrical ground, which is shown in FIG. 3C as V1. The first integrator 162 outputs an integrated version of V1, and hence the second difference amplifier 164 measures the rise of the system power supply voltage relative to the integrated version of V1, which is shown in FIG. 3B as V2. The second integrator 166 outputs an integrated version of V2 to the comparator 168. In the preferred embodiment, the time constant of the first integrator 162 is much shorter than the time constant of the second integrator 166, for example, by a factor of ten. Those skilled in the art will recognize that the exact value of either time constant does not critically affect circuit operation. The POR integrator 142 thus performs a dual integration of the power supply voltage with respect to itself, at two distinct rates of change. The comparator 168 receives the output of the first and second integrators 162, 166 and outputs the early gating signal that indicates when the power supply voltage has stabilized or stopped changing.

Each of the elements within the POR integrator 142 preferably receives power from the system power supply. Typical switching power supplies exhibit a switching knee at approximately 50 to 70 percent of their rated output voltage. Those skilled in the art will recognize that the rate at which a switching power supply's output voltage rises may be slightly oscillatory depending upon load impedance, and that this rate generally decreases past the switching knee. Those skilled in the art will also understand that circuit activity within the POR integrator 142 begins before the system power supply voltage has reached its final value. Herein, it is assumed that circuit activity begins when the system power supply voltage has reached approximately 40% of its final value, which for a conventional 5 Volt system power supply equals 2 Volts.

The first and second differential amplifiers 160, 162 begin measuring voltage differences at the first application of system power, and the rate of voltage rise at their outputs is clearly dependent upon the rate at which the system power supply voltage rises. Until the initiation of circuit activity, the output of the comparator 168 provides a low-impedance, low-voltage output. Preferably, the comparator 168 is biased such that the application of near-zero voltages at its inputs is slightly weighted towards its negative terminal at the onset of circuit activity. When the system power supply voltage has risen to the point at which circuit activity begins, the integrations performed by the first and second integrators 162, 166 ensure that any initial power supply voltage oscillation is significantly dampened. The time constant relationship between the first and second integrators 162, 166 ensures that the output of the first integrator 162 rises much more rapidly than that of the second integrator 166. When the output of the first integrator 162 is greater than that of the second integrator 166, the comparator 168 is in an output-high state. The output of the comparator 168 thus rises as a slow ramp that follows the rise of the system power supply voltage after circuit activity has begun. Eventually, the output of the first integrator 162 saturates at a level that is slightly less than the final value of the system power supply voltage. The output of the second integrator 166, however, continues to rise until the power supply voltage has stopped changing in time. Thus, once the output of the second integrator 166 becomes greater than the saturated output of the first integrator 162, the output of the comparator 168 rapidly switches to a low-voltage state, indicating that the system power supply voltage has stabilized at its final value. An exemplary waveform representing the early gating signal is shown at the output of the comparator 168 in FIG. 3C. In an exemplary embodiment, the first difference amplifier 160 and the first integrator 162 are implemented together using a single National Semiconductor LM3900 Operational Amplifier, as are the second difference amplifier 164 and the second integrator 166. Those skilled in the art will recognize that the entire POR integrator 142 could be implemented as a single integrated circuit in an alternate embodiment.

Referring again to FIG. 3A, the frequency error integrator 140 is coupled to receive the early gating signal at a gate input, thereby ensuring that the second tuning signal is generated only after the system power supply voltage has stabilized. The first and second flip-flops 144, 146 each receive the early gating signal at a reset input. The first flip-flop 144 is coupled to receive the second lock signal via the second lock indication line 92. The second flip-flop 146 is coupled to receive an output of the first flip-flop 144, and an output of the second flip-flop 146 provides the synchronized POR signal. Finally, each of the first and second flip-flops 144, 146 has a clock input coupled to an output of the first limiter 132.

Once the early gating signal makes its sharp transition to a low-voltage state following the stabilization of the system power supply voltage, the first and second flip-flops 144, 146 are reset, and thus preferably output a low voltage. The first and second flip-flops 144, 146 are clocked at the frequency of the system QRO 72. Herein, it is assumed that the establishment of phase-lock between the crystal frequency reference oscillator 70 and the system QRO 72 is indicated when the second lock signal transitions to a high-voltage state. Those skilled in the art will recognize that in an alternate embodiment, phase-lock could be indicated by a transition to a low-voltage state. Once the second lock signal indicates that phase-lock has been established, the output of the second flip-flop 146, that is, the synchronized POR signal, transitions to a high-voltage state after two system QRO oscillation periods, indicating that the CRS 30 has stabilized following a POR condition. Components external to the system preferably utilize the synchronized POR signal as a gate signal for controlling POR operations, although those skilled in the art will recognize that the synchronized POR signal could be used for other operations as well.

Figure 2B:
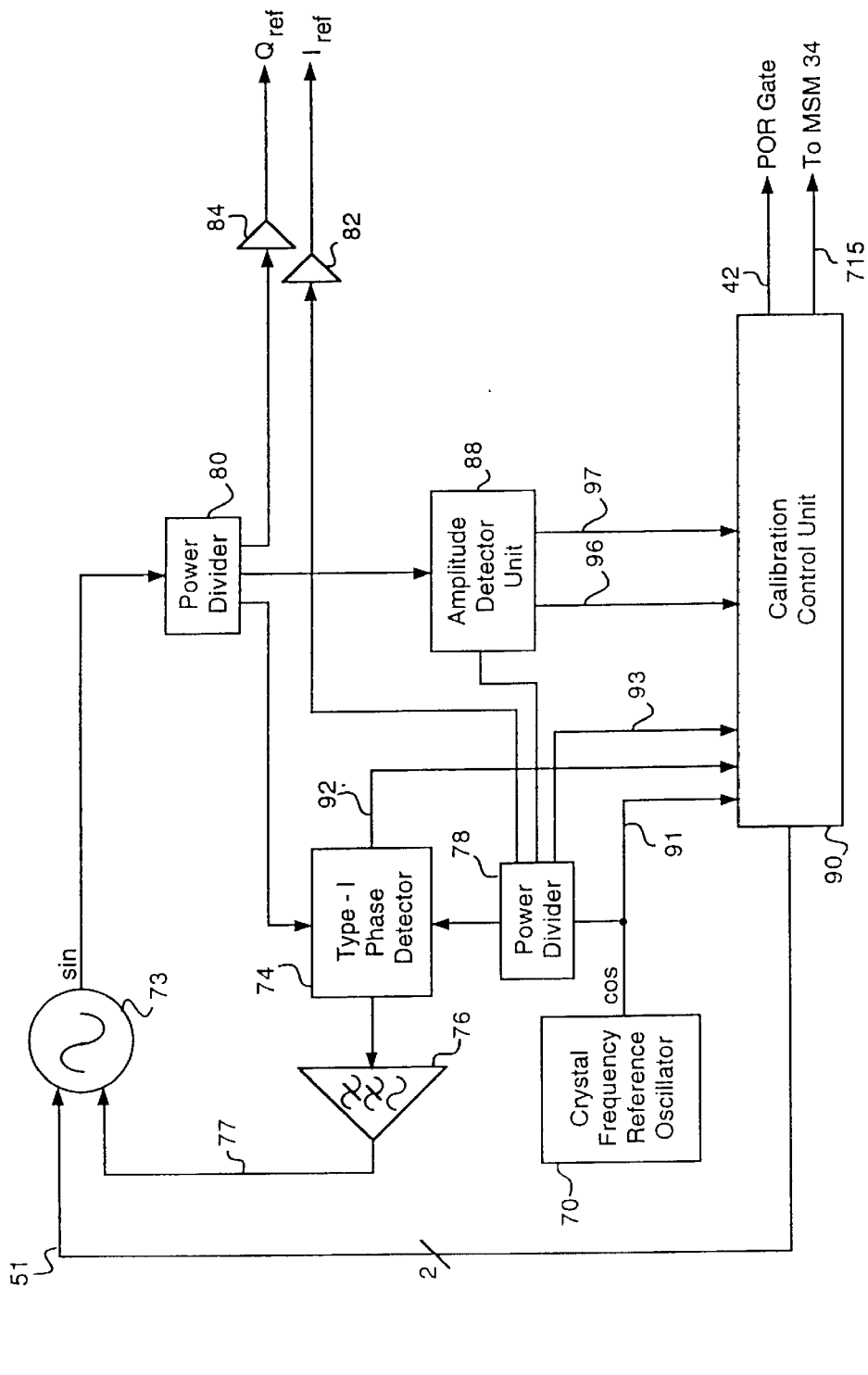
FIG. 2B is a block diagram of a second embodiment of a Calibrated Reference System of the present invention.
Figure 3D:
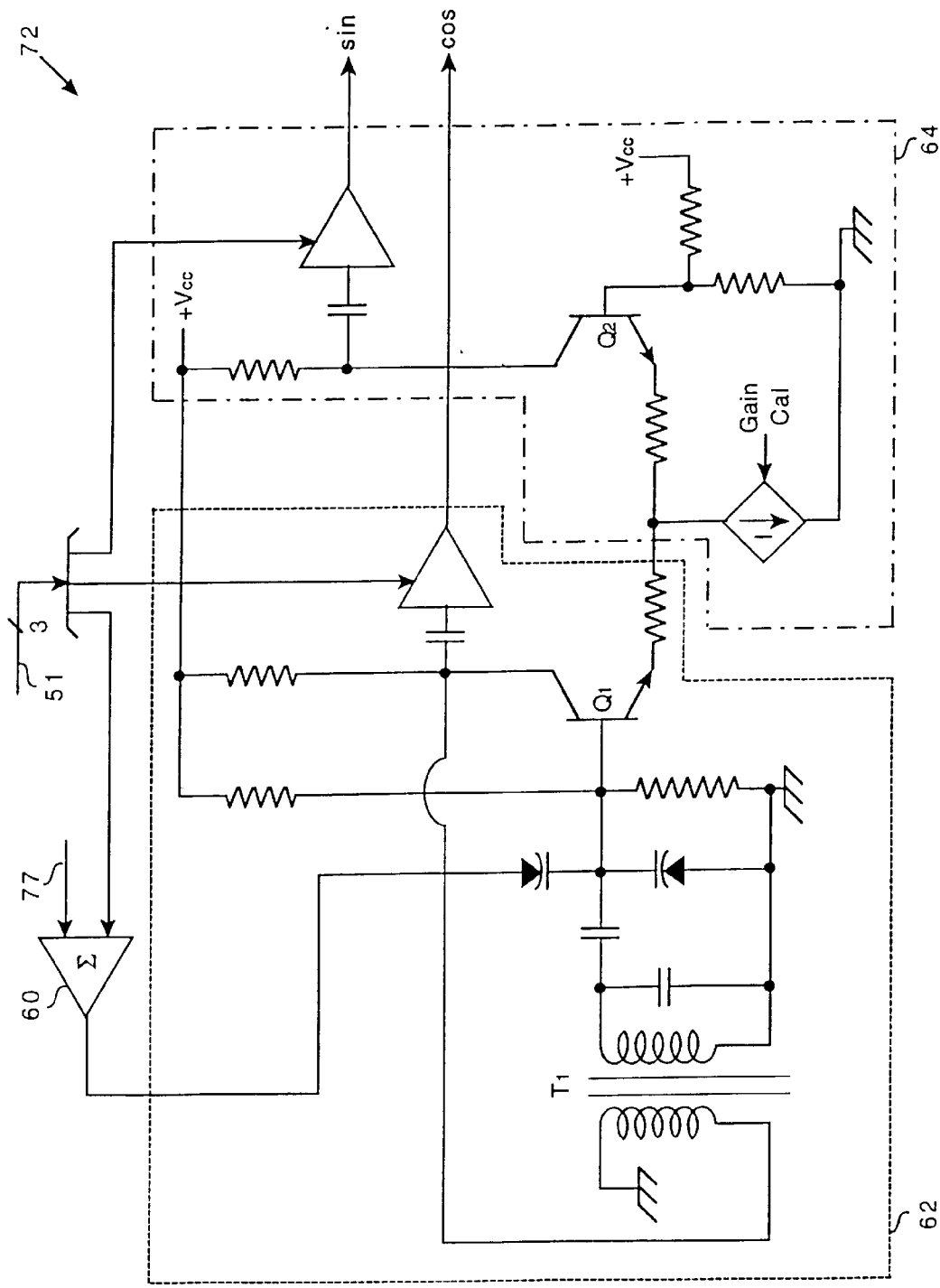
FIG. 3D is a block diagram of a preferred embodiment of a system Quadrature Reference Oscillator of the present invention.

The system QRO 72 generates the in-phase and quadrature-phase reference signals, which in the preferred embodiment are sinusoidal. Referring now to FIG. 3D, a block diagram of a preferred embodiment of the system Quadrature Reference Oscillator 72 is shown. The system QRO 72 preferably comprises a first difference amplifier 60, a conventional Armstrong RF oscillator 62, and a common-base feedback branch 64. The Armstrong RF oscillator 62 preferably comprises a first transistor; an in-phase buffer amplifier; a varactor; a resonant oscillation tank comprising a capacitor coupled to a transformer; and a plurality of resistors. The base of the first transistor, an output of the varactor, and the capacitor are each coupled to a first leg of the transformer. The collector of the first transistor is resistively coupled to a peak voltage reference that is preferably provided by the system power supply. Additionally, the collector of the first transistor is coupled to a second leg of the transformer, and to an input of the in-phase buffer amplifier. The in-phase buffer amplifier outputs the in-phase reference signal to the first power divider 78 of FIG. 2.

The common-base feedback branch 64 preferably comprises a second transistor, a current source, a quadrature-phase buffer amplifier, and a plurality of resistors. The emitters of the first transistor within the RF Armstrong oscillator and the second transistor within the common-base feedback branch 64 are coupled to an input of the current source. The base of the second transistor is coupled to a voltage divider, and the collector of the second transistor is coupled to the peak voltage reference. The quadrature-phase buffer amplifier is coupled to the second transistor's collector, and the quadrature-phase buffer amplifier outputs the quadrature-phase reference signal to the second power divider 80 as shown in FIG. 2.

The system QRO 72 receives the first level adjustment signal, the second level adjustment signal, and the second tuning signal via the second calibration line 51. Each of these signals is generated by the calibration control unit 90 in the manner described above. The in-phase buffer amplifier is coupled to receive the first level adjustment signal. Similarly, the quadrature-phase buffer amplifier is coupled to receive the second level adjustment signal. The first difference amplifier 60 receives the first tuning signal via the first calibration line 77 and the second tuning signal via the second calibration line 51. The first difference amplifier 60 outputs a frequency setpoint signal that is delivered to the base of the first transistor, the capacitor, and one-half of the transformer via the varactor. The frequency setpoint signal determines the resonant frequency of the resonant oscillation tank, which in turn determines the frequency of the in-phase and quadrature-phase reference signals.

The first transistor preferably offers sufficient gain upon the application of system power to satisfy the Barkhausen oscillation criterion. Via the common-base base feedback branch 64, the Armstrong RF oscillator 62 is placed in mutual feedback with a common-base amplifier. Within the Armstrong RF oscillator 62, the first transistor provides 180 degrees of feedback, and the resonant transformer provides another 180 degrees of feedback. Those skilled in the art will recognize that the oscillation input to the second transistor is at its emitter rather than at its base. Thus, the combination of the first transistor within the Armstrong RF oscillator 62 and the second transistor within the common-base feedback branch 64 functions as a transconductance amplifier. Thus, the voltage at the collector of the first transistor maintains a quadrature phase relationship with the voltage at the collector of the second transistor.

In an exemplary embodiment, the system QRO 72 is implemented using Motorola MPSH10 transistors (Motorola, Inc., Schaumburg, Ill.), a Motorola MV209 varactor, and Amidon & Associates ferrite cores (Amidon & Associates, Santa Ana, Calif.). Those skilled in the art will recognize that the system QRO 72 could be implemented using another type of quadrature oscillator in an alternate embodiment. In the present invention, the system QRO 72 is preferably characterized as having a range of operating frequencies and a center frequency within this operating frequency range, where the dynamic frequency range of the system QRO 72 is less than or equal to 2:1.

The preferred embodiment of the CRS 30, as described in FIG. 2A and FIGS. 3A through 3D, is useful for generating signals having frequencies up to approximately 1.0 Gigahertz (GHz), that is, frequencies up to the middle portion of the Ultra-High Frequency (UHF) band. In the event that an embodiment of the present invention is to operate below frequencies of approximately 300 Megahertz (MHz), a simpler implementation of the CRS 30 is possible, as is described hereafter with reference to FIG. 2B. Referring now to FIG. 2B, a block diagram of a second embodiment of a Calibrated Reference System 31 is shown. In FIGS. 2A and 2B, like reference numerals have been used for ease of understanding. The second embodiment of the CRS 31 comprises a crystal frequency reference oscillator 70, a system reference oscillator 73, a first phase detector 74, a first loop filter 76, a first power divider 78, a second power divider 80, a first distribution amplifier 82, a second distribution amplifier 84, and a calibration control unit 90. In the second embodiment of the CRS 31, the first system reference signal is derived directly from a first power-divided version of the original frequency reference signal output by the calibrated frequency reference oscillator 70. The system reference oscillator 73 preferably comprises a conventional sinusoidal oscillator. The first phase detector 74 and the first loop filter 76 serve to maintain phase-lock between a second power-divided version of the original frequency reference signal and a quadrature-phase signal output by the system reference oscillator 73. Thus, the phase locked loop shown in FIG. 2B automatically provides the desired quadrature phase relationship. The second system reference signal is generated from a power-divided version of the quadrature-phase signal.

As with the system QRO 27, the system reference oscillator 73 is preferably characterized as having a range of operating frequencies and a center frequency within this operating frequency range. The dynamic frequency range of the system reference oscillator 73 is preferably less than or equal to 2:1.

Figure 13A:
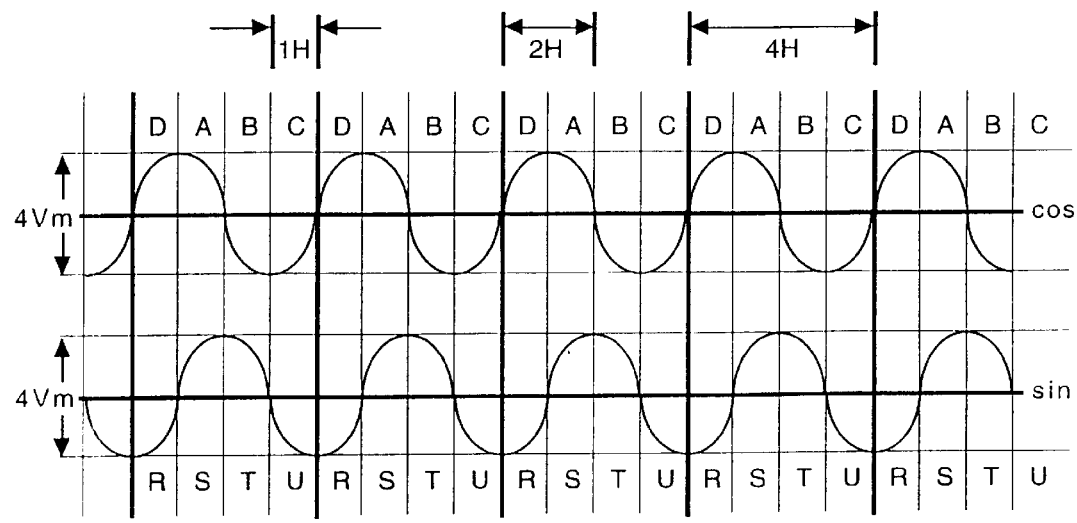
FIG. 13A is a waveform diagram showing a preferred system reference signal protocol of the present invention.

Referring again to FIGS. 1, 2A, 2B, and 3A through 3D, the elements within the CRS 30 generate the first and second system reference signals in the manner described above. In the preferred embodiment, the first and second system reference signals are sinusoidal signals having a quadrature phase relationship. Herein, the relationship between the first and second system reference signals is used to define a system reference signal protocol. Referring now to FIG. 13A, a waveform diagram showing a preferred system reference signal protocol is shown. In FIG. 13A, the first system reference signal is identified as "cos," and the second system reference signal is identified as "sin." In the preferred system reference signal protocol, the amplitude of the first and second system reference signals is defined as ($2^n$* Vm). Herein, n is defined as 2, and thus the first and second system reference signals are defined to have amplitudes equal to 4Vm. In FIG. 13A, 4Vm is shown as a peak-to-peak amplitude for convenience and to aid understanding. As will be described in detail below with reference to FIG. 5B, when the first and second system reference signals are modulated, the resulting signals have amplitudes that range between Vm and ($2^n$* Vm) according to Vm increments. Vm is thus an amplitude modulation increment. Those skilled in the art will recognize that the exact values of Vm and n are design choices, as will also be described in detail below. In the preferred embodiment, 4Vm equals 13.0 dBm.

In the preferred system reference signal protocol, a plurality of subperiods are defined within a single period of each of the first and second system reference signals. For the first system reference signal, the subperiods are denoted R, S, T and U in the manner shown in FIG. 13A. For the second system reference signal, the subperiods are denoted A, B, C, and D. Each subperiod thus represents one-quarter of a reference signal period, that is, a phase interval of π/2. The subperiods R, S, T, and U for the first system reference signal are shown in FIG. 13A beneath the second system reference signal because these subperiods define timing events associated with the second system reference signal, as described in detail below. Similarly, the subperiods A, B, C, and D for the second system reference signal define timing events associated with the first system reference signal, and are thus shown above the first system reference signal in FIG. 13A. The time interval corresponding to each subperiod is defined in FIG. 13A as "H." Those skilled in the art will recognize that the preferred system reference signal protocol remains valid regardless of any particular frequency considered because each subperiod, and thus the time interval H, is an autoadaptive parameter with respect to frequency. The operations performed by the modulator 32 and elements within each local time-base unit 22 are described below with regard to the preferred system reference signal protocol.

Taken together, the first and second system reference signals provide a system-wide timing reference that is distributed to each local time-base unit 22 via the system bus 14. Via the modulator 32 and the MSM 34, the present invention additionally provides for the distribution of messaging signals to each local time-base unit 22 in a manner described in detail hereafter.

Figure 4A:
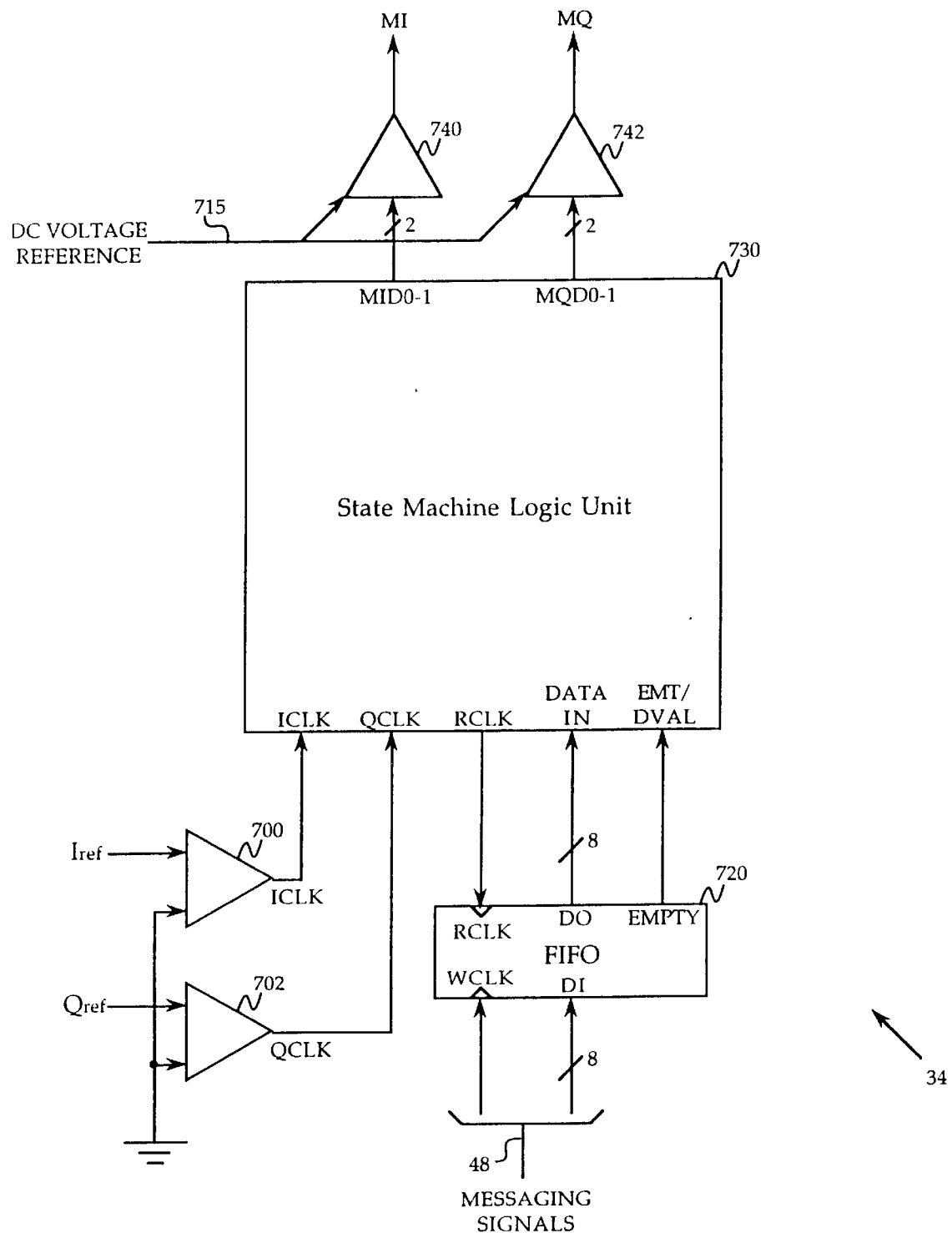
FIG. 4A is a block diagram of a preferred embodiment of a Modulation State Machine of the present invention.

The MSM 34 is preferably a state machine that converts messaging signals into a first information signal and a second information signal. Referring now to FIG. 4A, a block diagram of a preferred embodiment of the Modulation State Machine 34 is shown. The MSM 34 comprises an in-phase limiter 700, a quadrature-phase limiter 702, a FIFO buffer 720, a state machine logic unit 730, a first Digital-to-Analog (D/A) converter 740, and a second D/A converter 742. The in-phase and quadrature-phase limiters 700, 702 are coupled to receive the first and second system reference signals, respectively, from the CRS 30. In the preferred embodiment, the in-phase limiter 700 detects zero crossings in the first system reference signal, and the quadrature-phase limiter 702 detects zero crossings in the second system reference signal. The in-phase limiter 700 outputs an in-phase clock signal, denoted ICLK in FIG. 4A, to a first clock input of the state machine logic unit 730 in a conventional manner. In an analogous manner, the quadrature-phase limiter 702 outputs a quadrature-phase clock signal, denoted QCLK in FIG. 4A, to a second clock input of the state machine logic unit 730. The in-phase and quadrature-phase clock signals sequence the operations performed by the state machine logic unit 730, in a manner described in detail below with reference to FIG. 4B. The in-phase and quadrature-phase clock signals are synchronous with the first and second system reference signals, respectively, thereby ensuring that the conversion of messaging signals into the first and second information signals is synchronous with the first and second system reference signals.

The FIFO buffer 720 is preferably conventional, and thus includes FIFO load circuitry and FIFO output circuitry. The FIFO buffer 720 is coupled to receive messaging signals via the first message line 40. The messaging signals preferably include data signals received at a data input of the FIFO buffer 720, and a FIFO-load signal received at a first clock input of the FIFO buffer 720. The FIFO-load signal clocks the loading of data signals into the FIFO buffer 720 in a conventional manner. In FIG. 4A, the data signals are shown as spanning 8 bits. Those skilled in the art will recognize that in an alternate embodiment, the data signals could span additional or fewer bits in view of design considerations discussed in detail below.

The state machine logic unit 730 has a data input coupled to receive data signals from a data output of the FIFO buffer 720. The state machine logic unit 730 also has a clock output coupled to deliver a FIFO-output signal, identified in FIG. 4A as RCLK, to a second clock input of the FIFO buffer 720. The FIFO-output signal clocks the FIFO output circuitry in a conventional manner, and thus controls the transfer of data signals from the FIFO buffer 720 into the state machine logic unit 730. The state machine logic unit 730 additionally has a status input coupled to receive a FIFO status signal, identified as EMT/DVAL in FIG. 4A, from a status output of the FIFO buffer 720. The FIFO status signal preferably indicates whether the FIFO buffer 720 is empty.

Figure 4B:
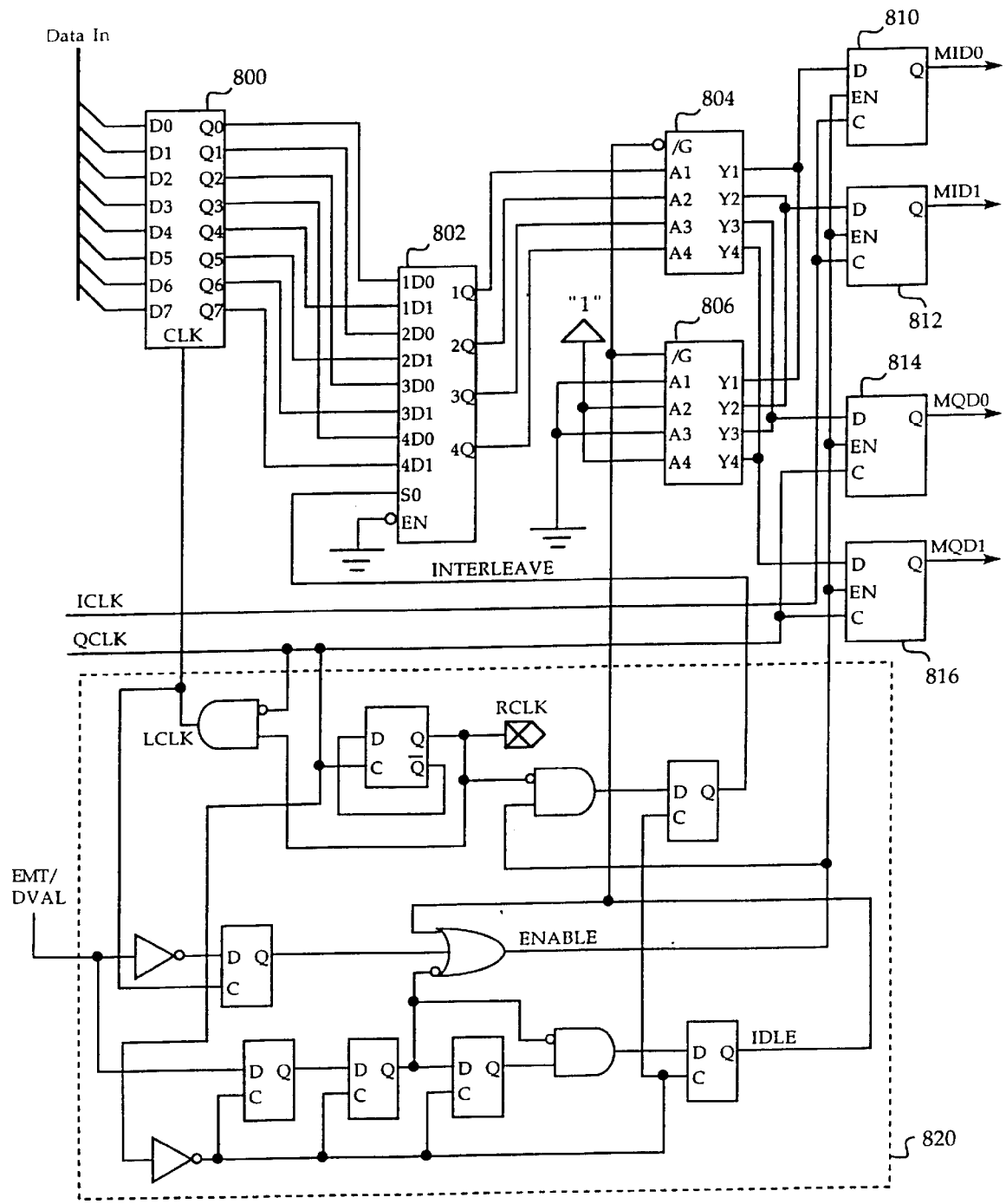
FIG. 4B is a block diagram of a preferred embodiment of a state machine logic unit within the Modulation State Machine.

The state machine logic unit 730 loads data signals from the FIFO buffer 730, converts loaded data signals into a first and a second bit sequence, and outputs the first and second bit sequences to the first and second D/A converters 740, 742, respectively. The in-phase and quadrature-phase clock signals sequence the operations performed by the state machine logic unit 730. Referring also now to FIG. 4B, a block diagram of a preferred embodiment of the state machine logic unit 730 is shown. The state machine logic unit 730 comprises a latch register 800, a multiplexor 802, a first signal gate 804, a second signal gate 806, an in-phase Least-Significant Bit (LSB) flip flop 810, an in-phase Most-Significant Bit (MSB) flip flop 812, a quadrature-phase LSB flip-flop 814, a quadrature-phase MSB flip-flop 816, and a sequencer 820. The sequencer 820 receives the quadrature-phase clock signal QCLK and the FIFO status signal EMT/DVAL, and in turn generates control signals that direct the operation of other elements within the state machine logic unit 730. As shown in FIG. 4B, the sequencer 820 generates the FIFO-output signal RCLK; an LCLK signal that clocks the loading of data signals into the latch register 800; an INTERLEAVE signal that controls the routing of signals from multiplexor inputs to multiplexor outputs; an IDLE signal that controls the operation of the first and second signal gates 804, 806; and an ENABLE signal that enables the operation of each LSB and MSB flip-flop 810, 814, 812, 816 within the state machine logic unit 730. The state of ENABLE is dependent upon the states of QCLK, EMT/DVAL, LCLK, and IDLE in the manner shown. As can be seen from FIG. 4A, each signal generated within the sequencer 820 is related to QCLK.. The detailed operations performed within the state machine logic unit 730 are described hereafter according to the timing relationships between ICLK, QCLK, LCLK, RCLK, INTERLEAVE, ENABLE, and IDLE.

Figure 4C:
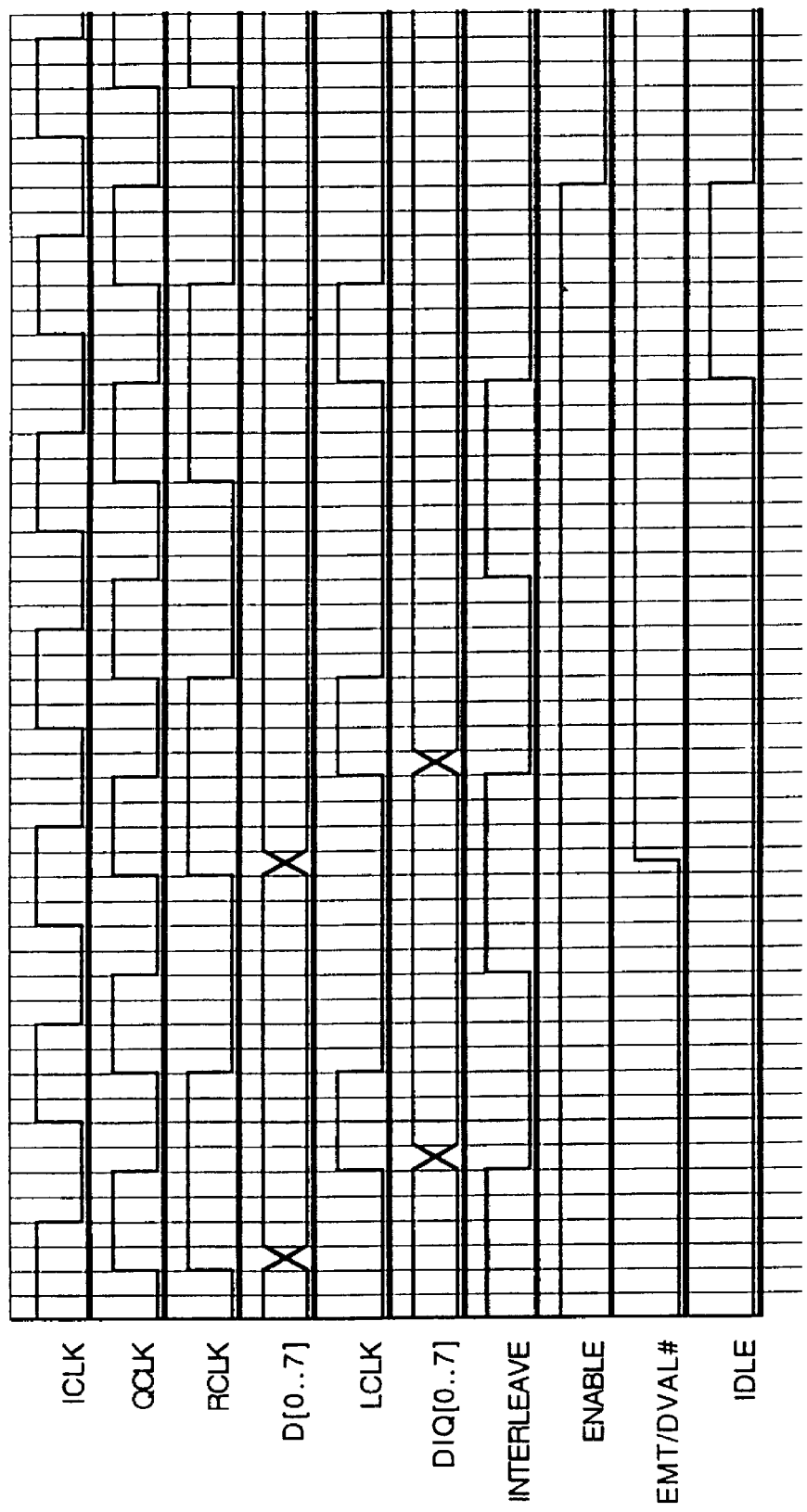
FIG. 4C is a preferred timing diagram for a sequencer of the present invention.

Referring also now to FIG. 4C, a preferred timing diagram for the sequencer 820 is shown. As shown in FIG. 4C, ICLK and QCLK are quadrature-phase square-wave signals. The FIFO buffer 720 outputs a set of data signals at intervals determined by RCLK. Once a given set of data signals is output by the FIFO buffer 720, LCLK clocks the loading of this set of data signals into the latch register 800. The data signals clocked into the latch register 800 subsequently appear at latch register outputs, and are delivered to inputs of the multiplexor 802. The multiplexor 802 routes a first subset or a second subset of the data signals to its outputs according to the value of INTERLEAVE. Preferably, the first and second data signal subsets each span one-half of the number of bits spanned by a set of data signals. For the 8-bit sets of data signals considered herein, the first data signal subset preferably comprises the four lowest-order bits within a given set of data signals, and is routed to the multiplexor's outputs when INTERLEAVE is in a low state. The second data signal subset comprises the four highest-order bits within the 8-bit set of data signals, and is routed to the multiplexor's outputs when INTERLEAVE is in a high state.

The first signal gate 804 is coupled to receive the multiplexor's outputs. Thus, according to the value of INTERLEAVE, the first signal gate 804 either receives the first data signal subset or the second data signal subset. The second signal gate 806 is coupled to receive a predetermined idle code, which is defined according to a signaling plan as described in detail below with reference to FIG. 5B. As can be seen in FIG. 4B, the idle code is 0101 in the preferred embodiment.

The state of IDLE determines whether: 1) a data signal subset output by the multiplexor 802; or 2) the idle code is routed to the state machine logic unit's in-phase and quadrature-phase LSB and MSB flip-flops 810, 814, 812, 816. In the preferred embodiment, a data signal subset is routed to the state machine logic unit's LSB and MSB flip-flops 810, 814, 812, 816 via the first signal gate 804 while IDLE is in a low state. Thus, while IDLE is in a low state, the first data signal subset is routed to the state machine logic unit's LSB and MSB flip-flops 810, 814, 812, 816 during the time in which INTERLEAVE is in a low state, and the second data signal subset is routed to the state machine logic unit's LSB and MSB flip-flops 810, 814, 812, 816 during the time in which INTERLEAVE is in a high state. While IDLE is in a high state, the idle code is routed to the aforementioned flip-flops 810, 814, 812, 816 via the second signal gate 806. The in-phase and quadrature-phase LSB and MSB flip-flops 810, 812, 814, 816 output the first and second bit sequences to the first and second D/A converters 740, 742 of FIG. 4A as described hereafter.

Each of the first and second signal gates 804, 806 has a first through a fourth output respectively coupled to an input of the in-phase LSB flip-flop 810, an input of the in-phase MSB flip-flop 812, an input of the quadrature-phase LSB flip-flop 814, and an input of the quadrature-phase LSB flip-flop 816. The in-phase LSB and MSB flip-flops 810, 812 thus receive a first and a second bit, respectively, within either of a given data signal subset or the idle code. Each of the in-phase LSB and MSB flip-flops 810, 812 receive LCLK at a clock input. The in-phase LSB and in-phase MSB flip-flops each have an output that taken together provide the first bit sequence to the first D/A converter 740 of FIG. 4A. In a manner analogous to that for the in-phase LSB and MSB flip-flops 810, 812, the quadrature-phase LSB and MSB flip-flops 814, 816 receive a third and a fourth bit, respectively, within either of a given data signal subset or the idle code. Each of the quadrature-phase LSB and MSB flip-flops 814, 816 receive QCLK at a clock input. Taken together, the quadrature-phase LSB and MSB flip-flops 814, 816 output the second bit sequence to the MSM's second D/A converter 742. Thus, the output of the first bit sequence by the in-phase LSB and MSB flip-flops 810, 812 is synchronous with ICLK, and the output of the second bit sequence by the quadrature-phase LSB and MSB flip-flops 814, 816 is synchronous with QCLK. Those skilled in the art will recognize that while INTERLEAVE and IDLE are in a low state, ICLK and QCLK clock bits within the first data signal subset into the state machine logic unit's in-phase and quadrature-phase flip-flops 810, 812, 814, 816, respectively. Therefore, when INTERLEAVE and IDLE are in a low state, the first and second bit sequences comprise particular bits within the first data signal subset. In an analogous manner, while INTERLEAVE is in a high state and IDLE is in a low state, ICLK and QCLK clock bits within the second data signal subset into the state machine logic unit's in-phase and quadrature-phase flip-flops 810, 812, 814, 816, respectively, and thus the first and second bit sequences comprise particular bits within the second data signal subset.

Following a transition in IDLE to a high state, the first and second bit sequences comprise bits within the idle code. As shown in FIG. 4B, a low-to-high transition in EMT/DVAL results in a time interval over which IDLE is in a high state, as will now be described. While the FIFO buffer 720 contains data signals, EMT/DVAL is in a low state, as is IDLE. An EMT/DVAL transition to a high state indicates that a last set of data signals has been output by the FIFO buffer 720. Following such a transition, IDLE remains in a low state until: 1) the first and second bit sequences generated from the first data signal subset within the last set of data signals have been output by the state machine logic unit's in-phase and quadrature-phase flip-flops 810, 812, 814, 816; and 2) the first and second bit sequences generated from the second data signal subset within the last set of data signals have been output by the in-phase and quadrature-phase flip-flops 810, 812, 814, 816. After the second data signal subset has been output as the first and second bit sequences, IDLE transitions to a high state. The idle code is subsequently clocked into the in-phase and quadrature-phase flip-flops 810, 812, 814, 816. Once the first and second bit sequences comprise the idle code, IDLE transitions to a low state, causing ENABLE to transition to a low state as well. In the preferred embodiment, ENABLE is delivered to an enable input of each in-phase and quadrature-phase flip-flop 810, 812, 814, 816, thereby disabling further input to these flip-flops 810, 812, 814, 816. As shown in FIG. 4B, a high-to-low transition in EMT/DVAL, indicating that the FIFO buffer 720 once again contains data signals, causes ENABLE to transition to a high state as clocked by LCLK, thereby enabling further flip-flop input.

Regardless of whether the first and second bit sequences are generated from the first data signal subset, the second data signal subset, or the idle code, those skilled in the art will recognize that the first and second bit sequences are temporally offset by the time interval H shown in FIG. 13A due to the quadrature phase relationship between ICLK and QCLK.

In the preferred embodiment, the first and second bit sequences each span two bits, That is, the first bit sequence is a first dibit, and the second bit sequence is a second dibit. Those skilled in the art will recognize the first and second bit sequences could span additional or fewer bits in an alternate embodiment. Preferably, the number of bits spanned by the first and second bit sequences depends upon the characteristics of the modulator 32, as will be described in detail below. The state machine logic unit 730 outputs the first dibit to the first D/A converter 740, and the second dibit to the second D/A converter 742. Each of the first and second D/A converters 740, 742 has a reference input coupled to receive the DC voltage reference output by the calibration control unit 90 of FIG. 3A via the reference line 715. The first D/A converter 740 performs a conventional D/A level conversion to convert the first dibit into the first information signal. Similarly, the second D/A converter 742 converts the second dibit into the second information signal via a conventional D/A level conversion. The preferred manner in which the amplitude of the first and second information signals respectively varies according to the first and second dibits is described in detail hereafter.

By definition, a bit sequence spanning "n" bits corresponds to a binary number "b" having a value between 0 and ($2^n$−1). In the preferred embodiment, each information signal has $2^n$ possible amplitude values that are successively spaced in equal amplitude increments. Each possible amplitude value corresponds to a unique bit pattern within a bit sequence. In the preferred embodiment, the first bit sequences is a dibit (i.e., n equals 2), as is the second bit sequence. Thus, each information signal has four possible amplitude values in the preferred embodiment. At any given time, the voltage amplitude of each information signal corresponds to one of the dibit sequences <00>, <01>, <10>, or <11>.

Those skilled in the art will recognize that in general, the MSM 34 is a state machine that performs the function of converting messaging signals into a first information signal and a second information signal. Thus, those skilled in the art will readily understand that other implementations of the MSM 34 are possible.

The modulator 32 modulates the first and second system reference signals according to the first and second information signals received from the MSM 34, respectively. In the preferred embodiment, the modulator 32 comprises a gain controlled amplifier for performing direct carrier Amplitude Modulation (AM) upon the first system reference signal, and a gain controlled amplifier for performing direct carrier AM upon the second system reference signal.

Figure 5A:
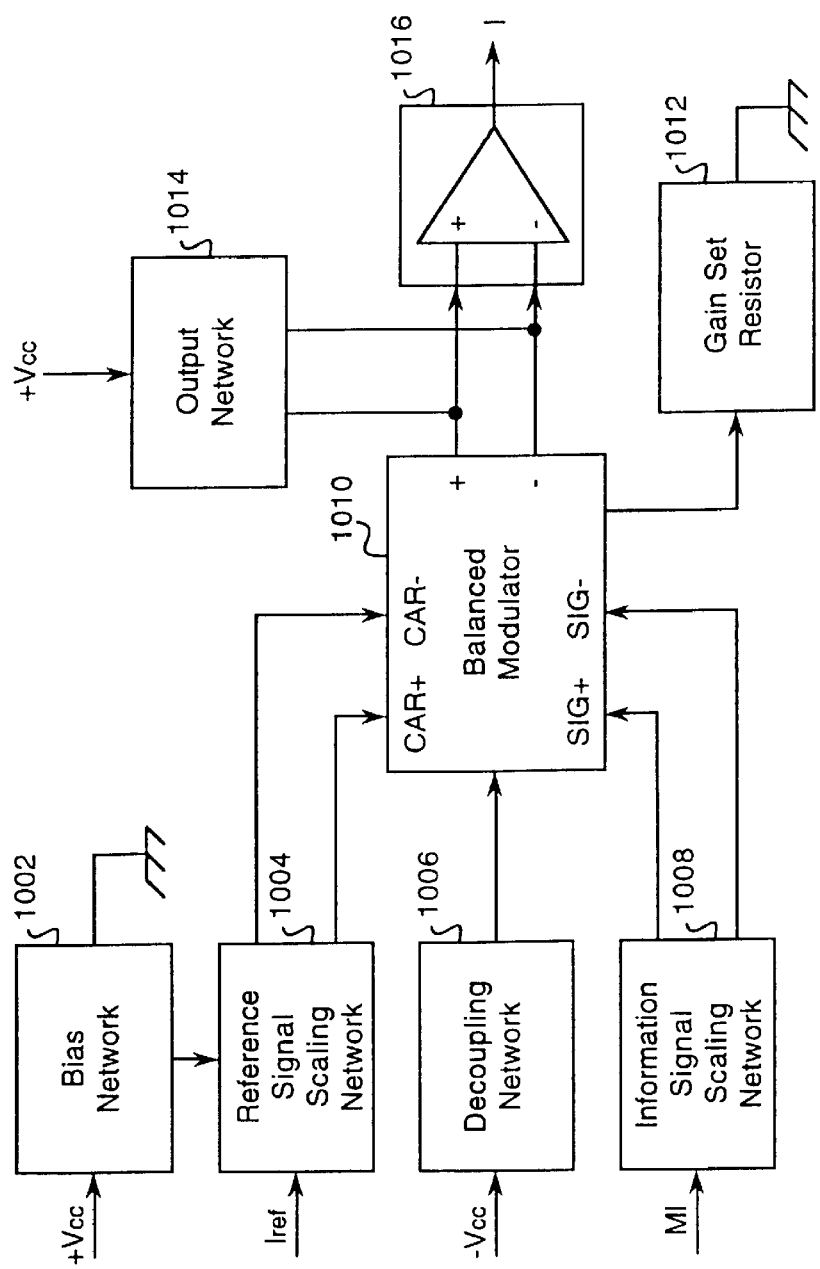
FIG. 5A is a block diagram of a first gain controlled amplifier of the present invention.

Referring now to FIG. 5A, a block diagram of a preferred embodiment of a first gain controlled amplifier 1000 for modulating the first system reference signal is shown. The first gain controlled amplifier 1000 comprises a bias network 1002, a reference signal scaling network 1004, a decoupling network 1006, an information signal scaling network 1008, a balanced modulator 1010, a gain-set resistor 1012, an output network 1014, and a level-shift/gain block 1016. The bias network 1002 and the decoupling network 1004 are coupled to a positive and a negative voltage reference, respectively. The reference signal scaling network 1004 is coupled to receive the first system reference signal, and the information signal scaling network 1008 is coupled to receive the first information signal. The balanced modulator 1010 receives an output of the decoupling network 1006, as well as a high and low carrier signal output by the reference signal scaling network 1004 and a high and low modulation signal output by the information signal scaling network 1008. The balanced modulator 1010 is preferably a conventional balanced modulator for performing direct carrier Amplitude Modulation (AM) upon the first system reference signal. In direct carrier AM, the amplitude of the first system reference signal is encoded according to the amplitude of the first information signal at a rate equal to the period of the first system reference signal. Direct carrier AM differs dramatically from conventional AM, in which a carrier signal's amplitude is modulated continuously according to amplitude changes occurring throughout a modulating signal's period.

The balanced modulator 1010 outputs a modulation sum signal and a modulation difference signal to a first and second input of the level-shift/gain block 1016, as scaled by the output network 1014. The level-shift/gain block 1016 in turn provides the first output of the modulator 32. In an exemplary embodiment, the balanced modulator 1010 is a Motorola MC1596 balanced modulator, and the level-shift/gain block 1016 is implemented using a National Semiconductor LM6264 operational amplifier.

In the preferred embodiment, the modulator 32 also comprises a second gain controlled amplifier (not shown) for performing direct carrier AM upon the second system reference signal according to the second information signal. The second gain controlled amplifier has an internal structure identical to that of the first gain controlled amplifier 1000, and is coupled to receive the second system reference signal and the second information signal in a manner that will be readily understood by those skilled in the art.

As described above, the first and second information signals are each characterized by four amplitude values in the preferred embodiment. The possible amplitudes of the first and second modulated system reference signals are 1Vm, 2Vm, 3Vm, and 4Vm. The amplitude increment for modulated system reference signals is therefore Vm.

Figure 13B:
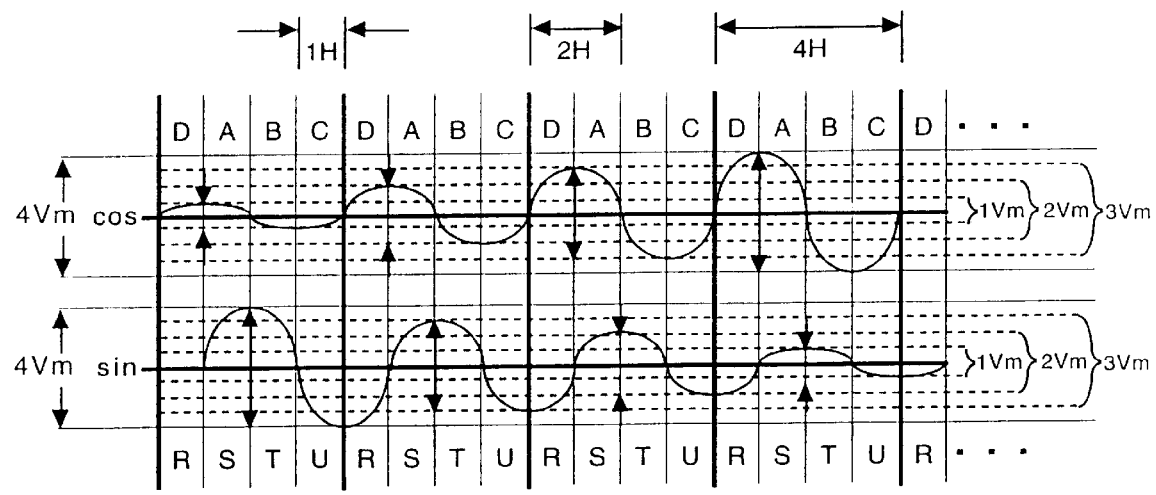
FIG. 13B is a waveform diagram showing a preferred system reference signal modulation protocol.

Referring now to FIG. 13B, a waveform diagram of a preferred system reference signal modulation protocol is shown to aid understanding. The possible amplitudes of the first and second modulated system reference signals are discrete, integral multiples of Vm, up to a maximum of 4Vm. As in FIG. 13A, each multiple of Vm is depicted as a peak-to-peak amplitude for ease of understanding. The sequence of amplitude changes shown in FIG. 13B is exemplary only; that is, for either of the first and second modulated system reference signals, dibits can be sequenced in any order to produce a corresponding sequence of amplitude changes.

In the preferred embodiment, the values of 1Vm, 2Vm, 3Vm, and 4Vm are defined as power ratios respectively having the values of 0.91 dBm, 6.93 dBm, 10.4 dBm, and 13.0 dBm. Those skilled in the art will recognize that these power ratios correspond to 1Vm having an amplitude of 0.25 Vrms, or 0.70 Vp-p; 2Vm having an amplitude of 0.50 Vrms, or 1.41 Vp-p; 3Vm having an amplitude of 0.75 Vrms, or 2.12 Vp-p; and 4Vm having an amplitude of 1.00 Vrms, or 2.81 Vp-p, for the first and second lines 16, 18 of the system bus 14 characterized by a 50-Ohm impedance. Those skilled in the art will recognize that in an alternate embodiment, the exact value of Vm could be defined differently. Those skilled in the art will also recognize that the generation of the first and second modulated system reference signals is entirely synchronous with the first and second system reference signals, respectively.

In the preferred embodiment, the first modulated system reference signal has four possible distinct states. Similarly, the second modulated system reference signal has four possible distinct states. Therefore, sixteen possible state combinations between the first and second modulated system reference signals are available for defining a signaling plan that indicates how state combinations are to be interpreted by each local time-base unit 22. Referring now to FIG. 5B, a table defining a preferred signaling plan of the present invention is shown. In FIG. 5B, sixteen unique state combinations are defined. A preferred signaling operation is also defined for each such state combination. Each of the preferred signaling operations will be described in detail below with reference to FIG. 6 and FIGS. 8 through 12D. Those skilled in the art will recognize that the preferred embodiment of the present invention operates according to a Quadrature Amplitude Modulation, 16-stage (QAM 16) modulation scheme. Those skilled in the art will further recognize that another QAM modulation scheme such as QAM 4, QAM 64, or QAM 256, could be utilized in an alternate embodiment. Those skilled in the art will additionally recognize that a different mapping of QAM states to signaling operations, that is, a different signaling constellation, could be defined for an alternate embodiment.

Regardless of the particular QAM modulation scheme or the QAM state mapping utilized, the modulator 32 preferably outputs signals having non-zero amplitudes at all times during normal system operation. Thus, during normal system operation, current is continuously present on the system bus 14.

System-Wide Signal Distribution

The first modulated system reference signal and the second modulated system reference signal are delivered to the first line 16 and second line 18 of the system bus 14 via the first and second distribution amplifiers 36, 38, respectively. Via the first line 16 and the second line 18, the first and second modulated system reference signals are delivered to each local time-base unit 22. The line termination 20 is chosen to match the impedance of the system bus 14 in a manner that will be readily apparent to those skilled in the art. Preferably, each of the first and second lines 16, 18 are implemented using integrated wire manufactured according to conventional printed circuit board fabrication processes to form a stripline or microstrip transmission line. Because the first and second lines 16, 18 are preferably implemented in transmission line form, the first and second lines 16, 18 are each characterized by a known impedance per unit length. Those skilled in the art will recognize that the present invention advantageously avoids the use of multiple amplification stages along either of the first or second lines 16, 18 of the system bus 14. That is, each local time-base unit 22 is passively coupled to the master time-base unit 12 by a controlled impedance, in contrast to prior art systems and methods in which one or more amplification stages are present along the signal distribution path. Because the system bus 14 is implemented in the manner described above, the arrival time for a signal sent from the master time-base unit 12 to a local time-base unit 22 in FIG. 1 can be precisely determined, with a degree of phase precision equal to a small fraction of a wavelength. In general, systems and methods that distribute timing signals using cascaded ranks of clock distribution amplifiers do not share this property.

The system bus 14 is characterized by a controlled impedance per unit length. Therefore, the system bus 14 can be scaled to accommodate any number of local time-base units 22, ranging from one to many thousands of local time-base units 22, by increasing the length of the system bus 14 and relocating the line termination 20. Those skilled in the art will recognize that sets of local time-base units 22 may reside upon separate circuit boards. Thus, when large numbers of local time-base units 22 are present, the present invention preferably employs conventional controlled-impedance network power division circuitry to provide physically distinct versions of the system bus 14, thereby replicating versions of the first and second line 16, 18 to accommodate board-to-board signal path transitions without changing the electrical nature of the network. Those skilled in the art will recognize that the first and second distribution amplifiers 36, 38 are preferably adjusted to output higher-power signals when such network power-division circuitry is utilized.

Local Time-Base Unit

Figure 6:
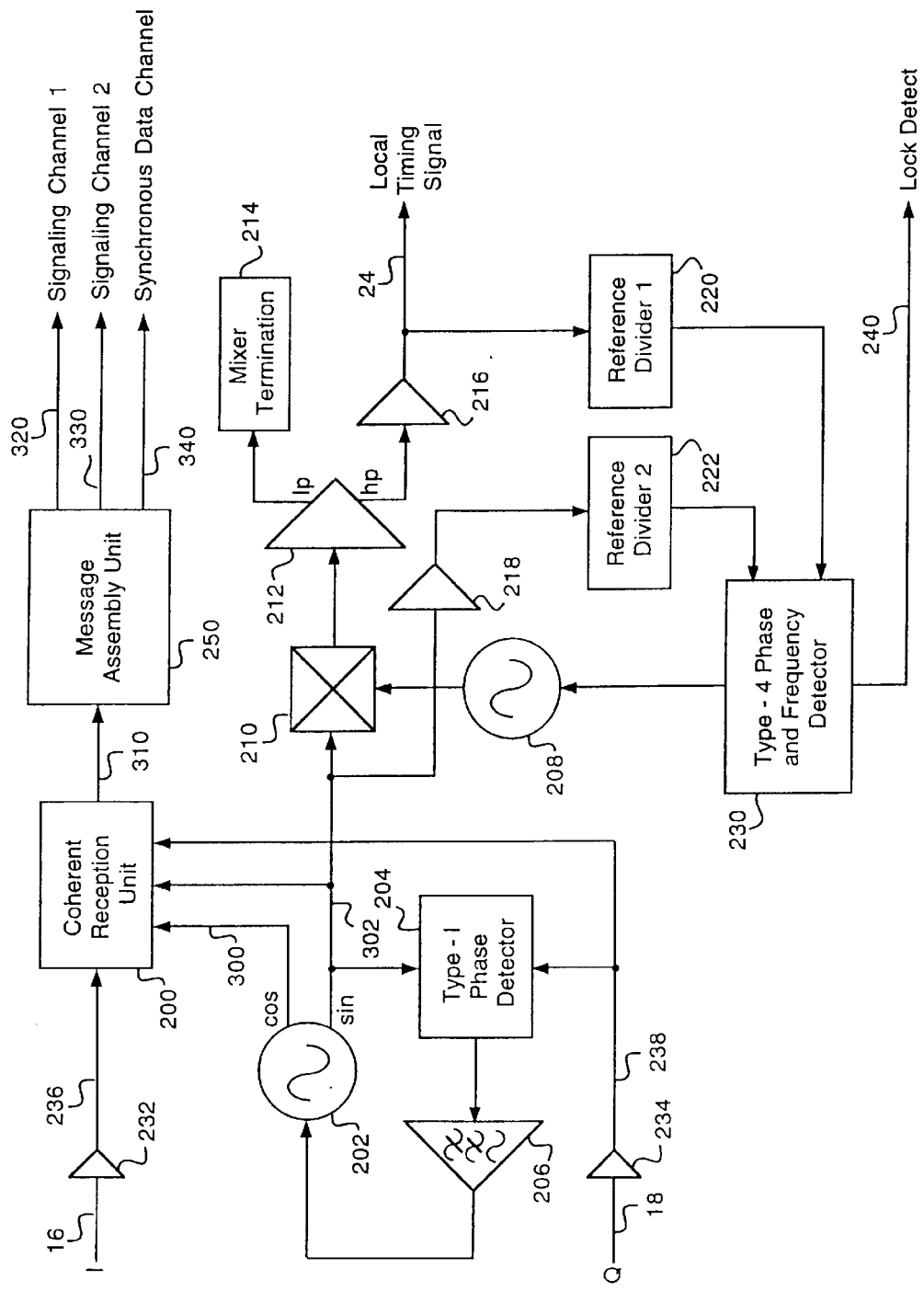
FIG. 6 is a block diagram of a preferred embodiment of a local time-base unit of the present invention.

Referring now to FIG. 6, a block diagram of a preferred embodiment of the local time-base unit 22 is shown. The local time-base unit 22 preferably comprises a first local buffer amplifier 232, a second local buffer amplifier 234, a coherent reception unit 200, a message assembly unit 250, a local QRO 202, a second phase detector 204, a second loop filter 206, a Local Timing Oscillator (LTO) 208, a timing signal mixer 210, a timing signal filter 212, a mixer termination 214, a first local limiter 216, a second local limiter 218, a first reference divider 220, a second reference divider 222, and a phase and frequency detector 230.

The first and second local buffer amplifiers 232, 234 are respectively coupled to the first and second lines 16, 18 of the system bus 14, and therefore receive the first and second modulated system reference signals. For the preferred embodiment of the system bus 14 as described above, scalability requires that each local time-base unit 22 maintain an essentially, or very-nearly, reflectionless coupling to the system bus 14, such that the system 10 of the present invention can accommodate any number of local time-base units 22. Therefore, the first and second local buffer amplifiers 232, 234 are each preferably a high-impedance amplifier having a gain of one. In the preferred embodiment, an essentially reflectionless coupling condition is satisfied when the net parallel impedance resulting from a federation of local time-base units 22 is less than a 1% load relative to the impedance of the system bus 14. In an exemplary embodiment, each of the first and second local buffer amplifiers 232, 234 are implemented using a National Semiconductor LM6261 operational amplifier. Those skilled in the art will recognize that the local buffer amplifiers 232, 234 beneficially provide the local time-base unit 22 with a change of impedance level from a constant low level as provided by the system bus 14 to a higher level for local use. In an alternate embodiment, an essentially reflectionless coupling condition could also be satisfied by the use of parallel transformer couplings with respect to a system ground in a manner known to those skilled in the art. That is, the local buffer amplifiers 232, 234 would be replaced by line transformers in this alternate embodiment.

The local QRO 202, the second phase detector 204, and the second loop filter 206 serve to generate a first local reference signal and a second local reference signal that are phase-locked to the first and second system reference signals, respectively. The local QRO 202 is preferably a voltage-controlled quadrature oscillator having an in-phase output, a quadrature-phase output, and a control input, and characterized by a dynamic frequency range of less than or equal to 2:1. Those skilled in the art will recognize that the local QRO 202 could be implemented in a manner analogous to that shown in FIG. 3D, or as a conventional type of quadrature oscillator. The local QRO 202 outputs the first and second local reference signals, where the first and second local reference signals are each sinusoidal and maintain a quadrature phase relationship with each other. A voltage received at the local QRO's control input preferably determines the frequency of the first and second local reference signals relative to the local QRO's operating frequency range in a conventional manner. Those skilled in the art will recognize that in an embodiment designed to operate at frequencies limited to approximately 300 MHz, the first and second local reference signals could be generated using the inherent characteristics of phase-lock and quadrature signaling in a manner analogous to that shown in FIG. 2B. In the preferred embodiment, the first and second local reference signals have unit zero-to-peak amplitude (i.e., a zero-to-peak amplitude of one Volt). Those skilled in the art will recognize that the local QRO 202 could output the first and second local reference signals having another zero-to-peak amplitude. The second phase detector 204 and the second loop filter 206 form a conventional phase-locked loop for maintaining phase lock between the second local reference signal and the second system reference signal. Thus, the second phase detector 204 is coupled to receive the second modulated system reference signal from an output of the second local buffer amplifier 234, and additionally receives the second local reference signal output by the local QRO 202. The second phase detector 204 outputs a first local phase error signal to the second loop filter 206, which in turn is coupled to deliver a first local tuning signal to the local QRO 202. By virtue of the phase relationship between each system reference signal and each local reference signal, phase-lock is also maintained between the first local reference signal and the first system reference signal. In the preferred embodiment, the second phase detector 204 is a type-I phase detector, and the second loop filter 206 is a low-pass filter, both of which are utilized to implement phase locking in a conventional manner that will be readily apparent to those skilled in the art. Those skilled in the art will also recognize that the possible amplitudes of the second modulated system reference signal, as defined by the preferred system reference signal modulation protocol, do not affect phase-locking.

Within the local time-base unit 22, a local timing signal is generated and output to the local timing line 24. Preferably, the local timing signal serves as a clock for one or more components external to the system 10 described herein. In the generation of the local timing signal, the LTO 208 generates an offset signal that is mixed with the second local reference signal, as will now be described in detail. In the preferred embodiment, the LTO 208 is a conventional Voltage-Controlled Oscillator (VCO) having an output and a control input. The LTO 208 is thus characterized as having a range of operating frequencies and a center frequency within this operating frequency range. In the preferred embodiment, the dynamic frequency range of the LTO 208 is less than or equal to 2:1. A voltage received at the LTO's control input preferably determines the frequency of the offset signal relative to the LTO's operating frequency range in a conventional manner.

In the generation of the offset signal, the LTO 208 preferably outputs a sinusoidal signal having a higher frequency than that of the second local reference signal. The control input of the LTO 208 is coupled to receive a second local tuning signal output by the phase and frequency detector 230. Thus, the exact frequency of the offset signal is determined by the second local tuning signal, which is described in detail below. The timing signal mixer 210 is coupled to receive the offset signal, and also receives the second local reference signal output by the local QRO 202. The timing signal mixer 210 is preferably a conventional mixer that mixes, or multiplies, the offset signal and the second local reference signal, thereby producing a timing mix signal. Defining the frequency of the second local reference signal as $f_{lq}$ and the frequency of the offset signal as $f_o$, the timing mix signal preferably includes a fundamental sum signal having a frequency given by $(f_o+f_{lq})$, as well as a fundamental difference signal having a frequency given by $(f_o-f_{lq})$. The timing signal filter 212 is preferably a diplexer coupled to receive the timing mix signal. The timing signal filter 212 routes the fundamental sum signal to the first local limiter 216, and routes other frequency components within the timing mix signal to the mixer termination 214. The mixer termination 214 preferably comprises an impedance chosen to absorb the energy of frequency components received from the diplexer. Those skilled in the art will also recognize that the fundamental sum signal is produced via conventional serrodyne upconversion. The first local limiter 216 detects the zero crossings in the fundamental sum signal, and outputs the local timing signal. Preferably, the local timing signal changes from zero amplitude to a predetermined positive amplitude when the fundamental sum signal exhibits a positive-direction zero crossing, and changes from the positive amplitude to zero amplitude when the fundamental sum signal exhibits a negative-direction zero crossing. The local timing signal is thus a square wave in the preferred embodiment. Those skilled in the art will recognize that in an alternate embodiment, the local timing signal could be a sinusoid, or any other type of waveform that can be derived from a sinusoid in general.

The frequency of the local timing signal is higher than that of the second local reference signal (or equivalently, either of the first or second system reference signals) or the offset signal. In most digital systems, a single master clock signal is distributed throughout the entire digital system, where the single master clock signal is the highest-frequency signal in the digital system. The need for ever-increasing computational power fuels the need for digital systems operating at ever-higher frequencies. Those skilled in the art will recognize that signal distribution becomes more difficult as signal frequency increases, particularly because the impedance of distribution lines becomes more complex with increasing frequency. In the present invention, the first and second system reference signals are not the highest frequency signals in the system 10. Indeed, the frequency of the first and second system reference signals is lower than that of any given local timing signal. Those skilled in the art will recognize that the frequency of the system reference signals can be much lower than that of any local timing signal. Thus, the present invention can advantageously generate one or more high-frequency local timing signals without requiring the system-wide distribution of a high-frequency signal.

The generation of the local timing signal in the manner described herein may necessitate the use of an LTO 208 capable of operating at very high frequencies. Those skilled in the art will recognize that this requirement can be readily satisfied in an exemplary embodiment through the use of a National Semiconductor LMX2325 single-chip 2.5 GHz phase-locked loop.

The second local limiter 218, the first and second reference dividers 220, 222, and the phase and frequency detector 230 serve to maintain phase lock between a frequency-divided version of the local timing signal and a frequency-divided version of the second local reference signal. The first reference divider 220 is coupled to receive the local timing signal, and provides the frequency-divided version of the local timing signal to a first input of the phase and frequency detector 230. The second local limiter 218 is coupled to receive the second local reference signal from the local QRO 202. In a manner analogous to that for the first local limiter 216, the second local limiter 218 detects zero crossings in the second local reference signal, and preferably outputs a square wave to the second reference divider 222. The second reference divider 222 outputs the frequency-divided version of the second local reference signal to a second input of the phase and frequency detector 230. The phase and frequency detector 230 outputs the second local tuning signal to the LTO 208, thereby controlling the frequency of the offset signal. The phase and frequency detector 230 additionally outputs the first lock signal to the first lock indication line 240 at the local time base unit's lock output. In the preferred embodiment, the phase and frequency detector 230 is a type IV phase and frequency detector implemented using conventional circuitry.

The first reference divider 220 preferably comprises conventional frequency division circuitry, and is characterized by a first divider constant k1. Similarly, the second reference divider 222 preferably comprises conventional frequency division circuitry, and is characterized by a second divider constant k2. Those skilled in the art will recognize that when the frequency-divided versions of the local timing signal and the second local reference signal are phase-locked, the following equation is satisfied:

$$f_{lq}/k2 = (f_{lq}+f_o)/k1 \qquad (1)$$

The LTO 208 adjusts the frequency of the offset signal, $f_o$, according to the value of the second local tuning signal output by the phase and frequency detector 230. The value of the second local tuning signal, however, is determined by the relationship between $(f_{lq}/k2)$ and $(f_{lq}+f_o)/k1$. The frequency of the second local reference signal, $f_{lq}$, is identical to that of either system reference signal. The values of k1 and k2 are determined by the internal structures of the first and second reference dividers 220, 222, respectively. The phase and frequency detector 230 adjusts the value of the second local tuning signal in a direction that leads to the satisfaction of equation (1). Thus, once phase-lock has been established, the offset signal's frequency is given by:

$$f_o = f_{lq} * ((k1/k2) - 1) \qquad (2)$$

Because the offset signal's frequency depends upon the values of k1 and k2, the frequency of the local timing signal, given by $(f_{lq}+f_o)$, also depends upon the values of k1 and k2 according to the following equation:

$$(f_{lq}+f_o) = f_{lq} * (k1/k2) \qquad (3)$$

Thus, once phase-lock has been established, the local timing signal's frequency is equal to the ratio of the first and second divider constants multiplied by the frequency of the system reference signals. In the preferred embodiment, the first reference divider 220 and the second reference divider 222 are each implemented using a reconfigurable or reprogrammable logic device, such as a Field Programmable Logic Device (FPGA). Such an implementation provides for the programmable specification of values for k1 and k2 at any given time, in a manner that will be readily understood by those skilled in the art. The present invention therefore provides for the programmable specification of any local timing signal frequency within the system 10. In the preferred embodiment, the frequency of any individual local timing signal is determined according to a local frequency plan. The frequencies of all local timing signals are related through a system frequency plan, as is described hereafter.

As previously described, the CRS 30 outputs the first and second system reference signals, each of which has a frequency identical to that of the original frequency reference signal output by the crystal frequency reference oscillator 70 of FIG. 2. In the preferred embodiment, the frequency of the first and second system reference signals is defined by the installation of a crystal frequency reference oscillator 70 having a desired frequency. A local frequency plan specifies local timing signal frequencies for a fixed system reference signal frequency. Referring now to FIG. 7A, a table showing a preferred local frequency plan of the present invention is shown. With regard to FIG. 7A, the frequency of the original frequency reference signal, and thus the frequency output by the CRS 30, is defined as 25 Megahertz (MHz) for purpose of example. Those skilled in the art will recognize that another frequency, for example, 50 MHz, could be chosen without any loss of generality. In FIG. 7A, a first column lists the exemplary 25 MHz frequency output by the CRS 30. A second and a third column in FIG. 7A list values for k1 and k2, respectively. A fourth column in FIG. 7A lists the offset signal frequencies corresponding to the first three columns, and a fifth column lists the resulting local timing signal frequencies obtained through the serrodyne upconversion described above. In the preferred local frequency plan, k2 is held constant while k1 is varied to produce local timing signals spanning a range of frequencies. As shown in FIG. 7A, the local timing signal may range from 60 MHz to 90 MHz in 2 MHz increments as k1 is varied from 170 to 230 in steps of 4. Those skilled in the art will recognize that in an alternate local frequency plan, the values of k2 and/or both k1 and k2 could be allowed to vary.

The present invention provides the ability to individually specify the frequency of the local timing signal output by each local time-base unit 22. Thus, in a computing environment characterized by multiple processing elements, subsets of processing elements could be clocked at unique frequencies, down to the level of the individual processing elements themselves. Furthermore, the frequency of any local timing signal can be programmably specified at any given time. The system 10 of the present invention can therefore readily adapt to changing timing needs within the computing environment. Prior art systems and methods do not share this property.

The frequency of the first and second system reference signals can be modified via installation of a crystal frequency reference oscillator 70 having a desired frequency. Thus, to implement a system-wide speed upgrade, a higher-frequency crystal frequency reference oscillator 70 is used. For a lower-speed implementation of the system 10, possibly desirable from a cost standpoint, a lower-frequency crystal frequency reference oscillator 70 is used. Referring now to FIG. 7B, a table showing a preferred system frequency plan of the present invention is shown. The preferred system frequency plan provides for the modification of the frequency of the first and second system reference signals, such that a unit increment in system reference signal frequency produces a constant increment in local timing signal frequency. In FIG. 7B, a first column lists frequencies output by the CRS 30; a second and a third column list values for k1 and k2, respectively; a fourth column lists LTO frequencies corresponding to the values in the first three columns; and a fifth column lists resulting local timing signal frequencies. As shown in FIG. 7B, each 1 MHz increase in the system reference signal frequency preferably produces a 4 MHz increase in the local timing signal frequency, where the values of k1 and k2 are modified accordingly.

In addition to the first and second reference dividers 220, 222, the phase and frequency detector 230 is also preferably implemented using a reconfigurable logic device. Reconfiguration of logic within a reconfigurable logic device requires a given amount of time to complete. In general, signals generated by reconfigurable logic cannot be guaranteed to be valid until a predetermined time interval has elapsed following the initiation of a reconfiguration. In actuality, one or more signals may be valid before the predetermined time interval has elapsed. The implementation of the phase and frequency detector 230 using reconfigurable logic ensures that the first lock signal can be used by components external to the system 10 as a gate signal to indicate that 1) reconfiguration has been completed, and 2) the local timing signal is valid. The generation of a gate signal in this manner is particularly useful when some or all of the external components are themselves implemented within a reconfigurable logic device. In an exemplary embodiment, the first reference divider 220, the second reference divider 222, and the phase and frequency detector 230 are implemented using reconfigurable logic within a single Xilinx XC4013 FPGA (Xilinx, Inc., San Jose, Calif.). Those skilled in the art will recognize that another type of reconfigurable logic device could be used to implement the first reference divider 220, the second reference divider 222, and the phase and/or frequency detector 230, for example, an Erasable Programmable Logic Device (EPLD).

Figure 8:
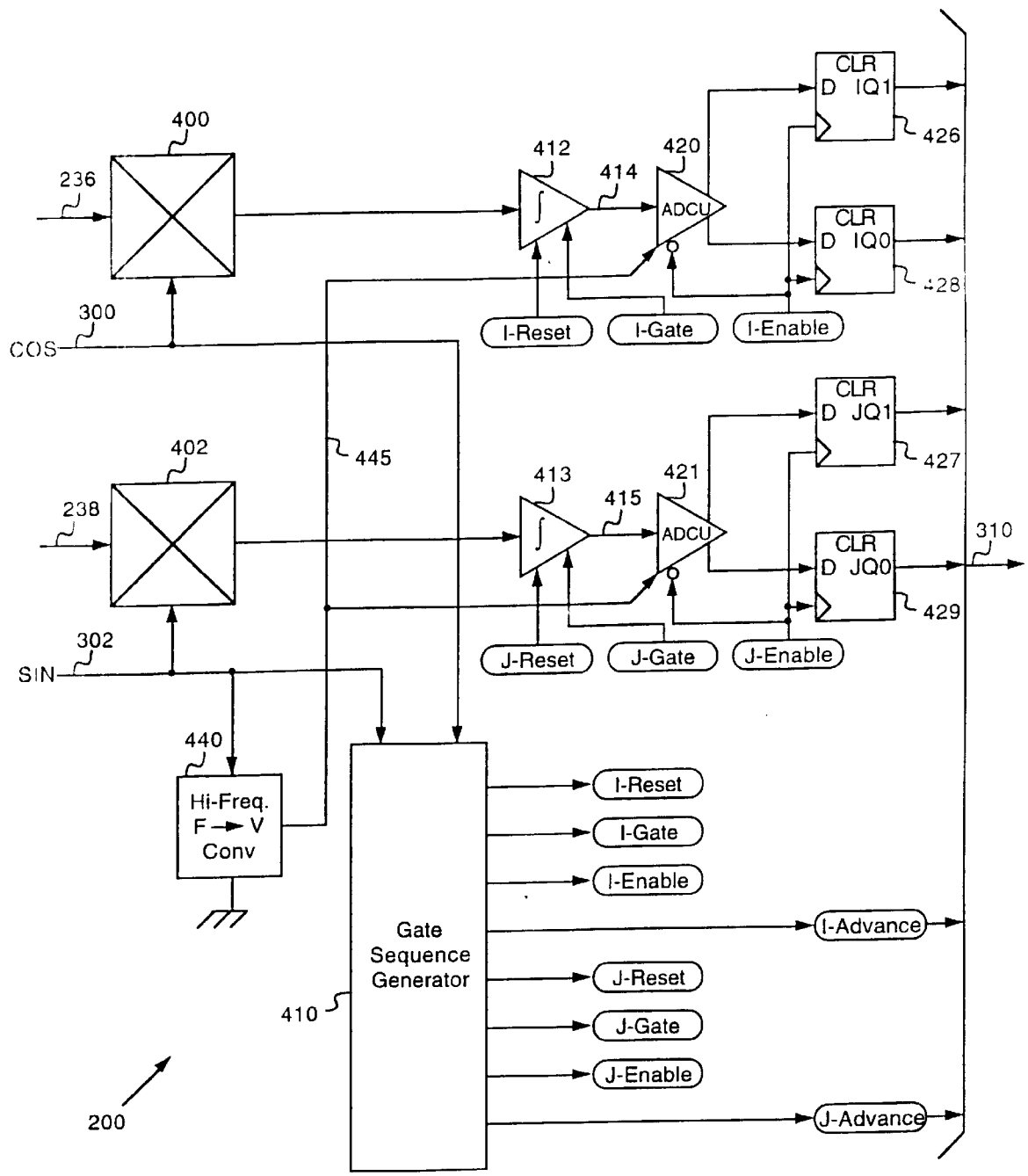
FIG. 8 is a block diagram of a coherent reception unit of the present invention.

The coherent reception unit 200 demodulates the first and second modulated system reference signals and generates a set of messages based upon the demodulation. Referring now to FIG. 8, a block diagram of a preferred embodiment of the coherent reception unit 200 is shown. The coherent reception unit 200 preferably comprises a first mixer 400, a first gated integrator 412, a first Analog-to-Digital Conversion Unit (ADCU) 414, a first Most-Significant-Bit (MSB) flip-flop 426, a first Least-Significant-Bit (LSB) flip-flop 428, a second mixer 402, a second gated integrator 413, a second ADCU 415, a second MSB flip-flop 427, a second LSB flip-flop 429, a third F–V converter 440, and a gate sequence generator 410.

The first mixer 400 is coupled to receive the first modulated system reference signal from an output of the first local buffer amplifier 232, and also receives the first local reference signal output by the local QRO 202. The first local reference signal preferably has unit amplitude. The first mixer 400 mixes, or multiplies, the first modulated system reference signal and the first local reference signal, and outputs a first rectified signal. Because the first local reference signal is phase-locked to the first modulated system reference signal, the first rectified signal is a full-wave rectified version of the first modulated system reference signal. Moreover, because the first local reference signal has unit amplitude in the preferred embodiment, the first rectified signal is a squared sinusoid having a peak amplitude equal to that of the first modulated system reference signal. The second mixer 402 is coupled to receive the second modulated system reference signal and the second local reference signal. The second mixer 402 generates a second rectified signal that is a full-wave rectified version of the second modulated system reference signal in a manner analogous to that for the first mixer 400.

The first gated integrator 412 and the first ADCU 420 demodulate the first rectified signal to produce a first MSB and a first LSB of an in-phase dibit that corresponds to a first information signal originally output by the MSM 34 of FIG. 1. The first MSB flip-flop 426 latches the first MSB, and the first LSB flip flop 428 latches the first LSB. Similarly, the second gated integrator 412 and the second ADCU 421 demodulate the second rectified signal to produce a second MSB and a second LSB of a quadrature-phase dibit that corresponds to a second information signal originally generated by the MSM 34. The second MSB flip-flop 427 latches the second MSB, and the second LSB flip-flop 429 latches the second LSB.

Figure 13C:
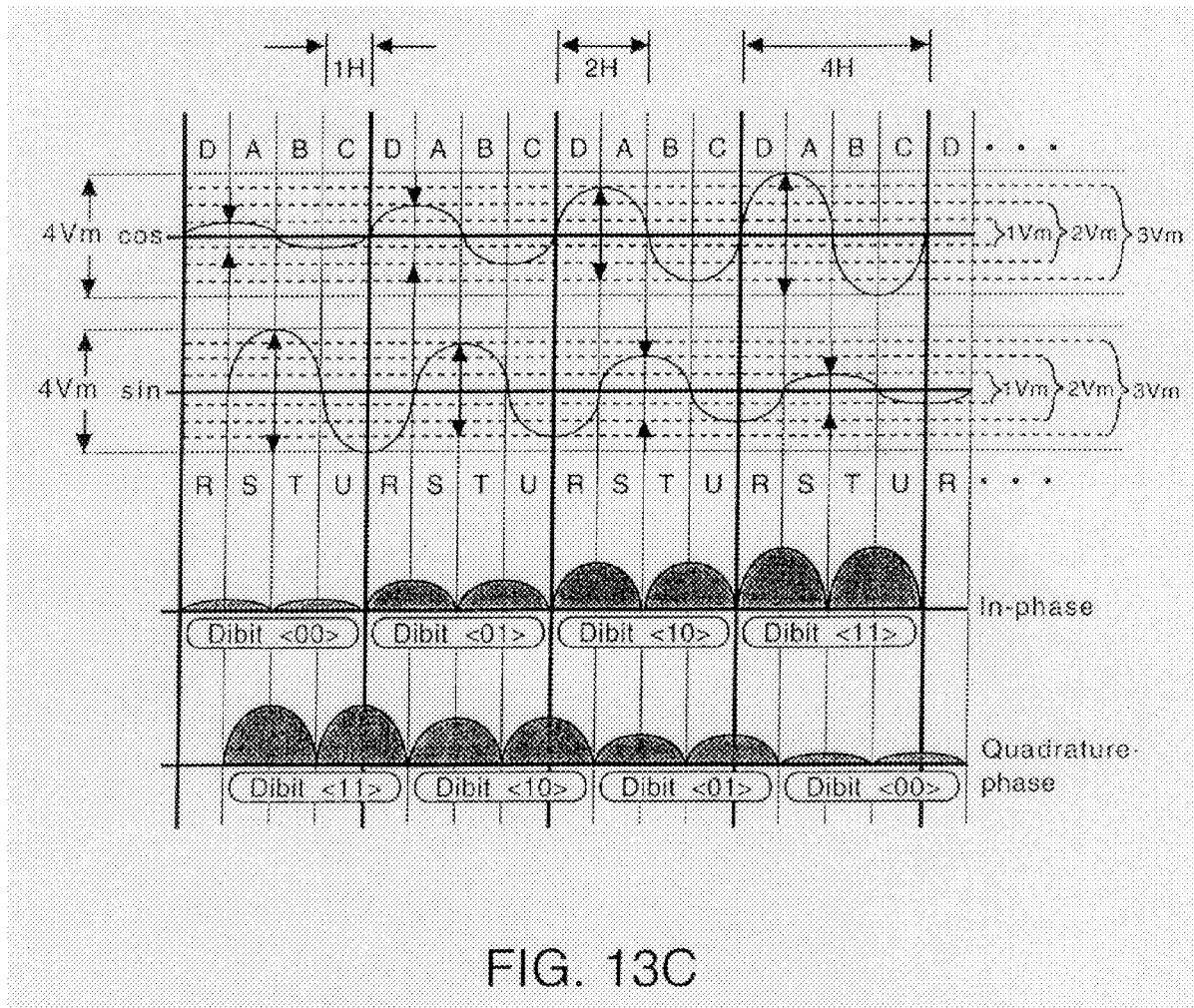
FIG. 13C is a waveform diagram showing a preferred system reference signal demodulation protocol.

The manner in which the first and second modulated system reference signals are demodulated defines a system reference signal demodulation protocol. Referring now to FIG. 13C, a waveform diagram showing a preferred system reference signal demodulation protocol is shown to aid understanding. As shown in FIG. 13C, the first rectified signal is a "double-bump," or a type of full-wave rectified, signal generated synchronously with the first modulated system reference signal (or, equivalently, either of the first system reference signal or the first local reference signal). Based upon an integration and an A/D conversion applied to the first rectified signal as described in detail below, an in-phase dibit is generated. The bit values within the in-phase dibit preferably correspond to an integral of the first rectified signal. The second rectified signal is a "double-bump" signal generated synchronously with the second modulated system reference signal, from which the quadrature-phase dibit is generated in a manner analogous to that for the in-phase dibit. The detailed manner in which the first and second modulated system reference signals are demodulated is described hereafter.

Figure 9A:
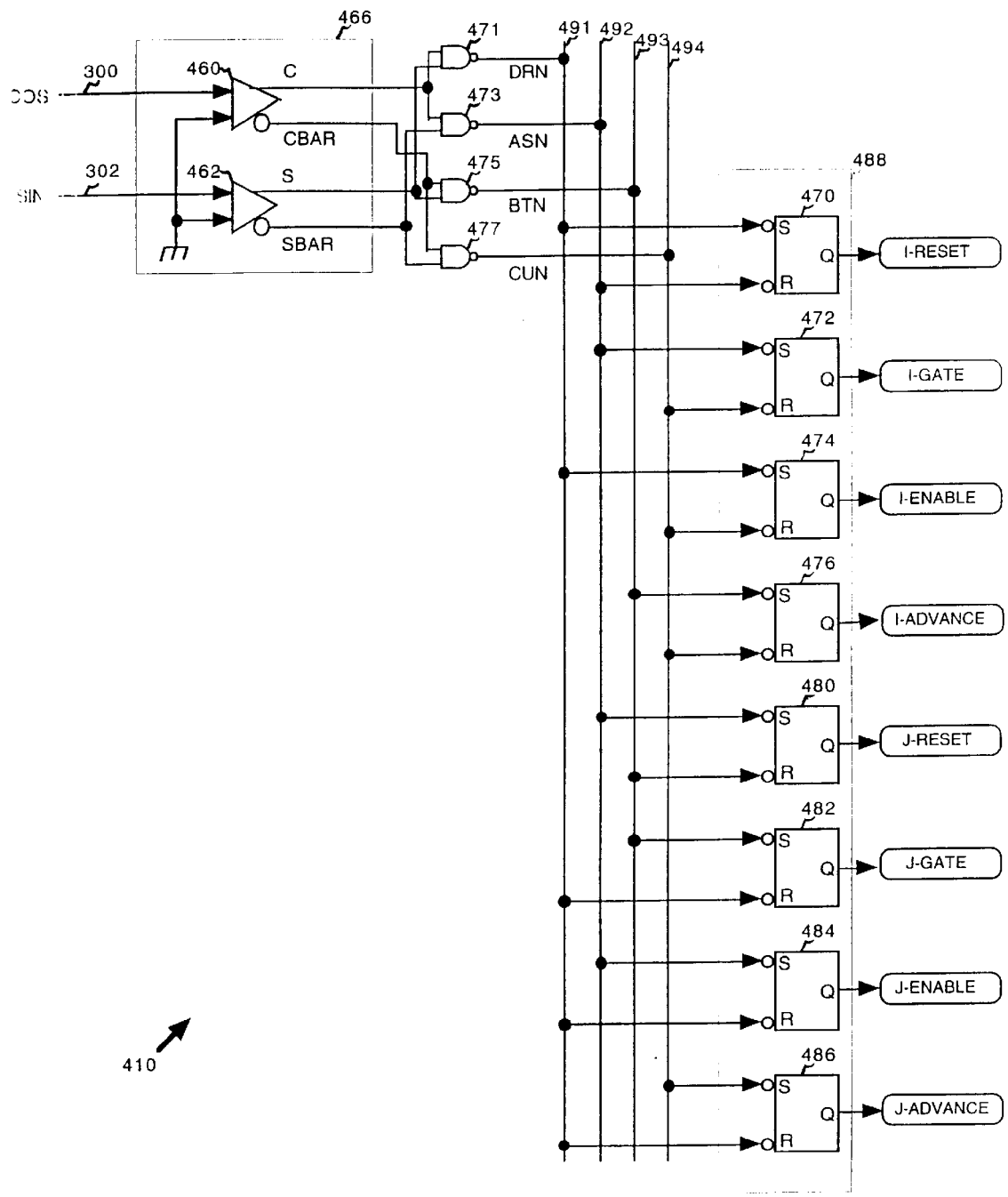
FIG. 9A is a block diagram of a preferred embodiment of a gate sequence generator of the present invention.

The gate sequence generator 410 sequences the operation of the first and second gated integrators 412, 413, the first and second ADCUs 420, 421, and each of the first MSB, first LSB, second MSB, and second LSB flip-flops 426, 428, 427, 429 to facilitate the aforementioned demodulations in accordance with the system reference signal demodulation protocol. Referring now to FIG. 9A, a block diagram of a preferred embodiment of the gate sequence generator 410 is shown. The gate sequence generator 410 preferably comprises a Quadrature Zero-Crossing Detector (QZCD) 466, a first, a second, a third and a fourth decoder gate 471, 473, 475, 477, and a flip-flop tree 488. The QZCD 466 preferably comprises an in-phase comparator 460 and a quadrature-phase comparator 462, each of which has an input coupled to electrical ground. The in-phase and quadrature-phase comparators 460, 462 are also coupled to receive the first and second local reference signals, respectively. The in-phase and quadrature-phase comparators 460, 462 detect signal zero-crossings and generate square-wave signals in a manner previously described herein, which will be readily understood by those skilled in the art. The in-phase comparator 460 generates an in-phase square-wave signal at a first output and a complementary in-phase square wave signal at a second output. In FIG. 9A, the in-phase square-wave signal is identified as C, and the complementary in-phase square-wave signal is identified as CBAR. In a manner analogous to that for the in-phase comparator 460, the quadrature-phase comparator 462 generates a quadrature-phase square-wave signal and a complementary quadrature-phase square-wave signal at a first and second output, respectively. The quadrature-phase and complementary quadrature-phase square-wave signals are respectively identified as S and SBAR in FIG. 9A. The first through fourth decoder gates 471, 473, 475, 477 receive and decode C, CBAR, S, and SBAR in a conventional manner to produce a first, second, third, and fourth strobe pulse, respectively. In FIG. 9A, the first through fourth strobe pulses are respectively labeled as DRN, ASN, BTN, and CUN.

Figure 9B:
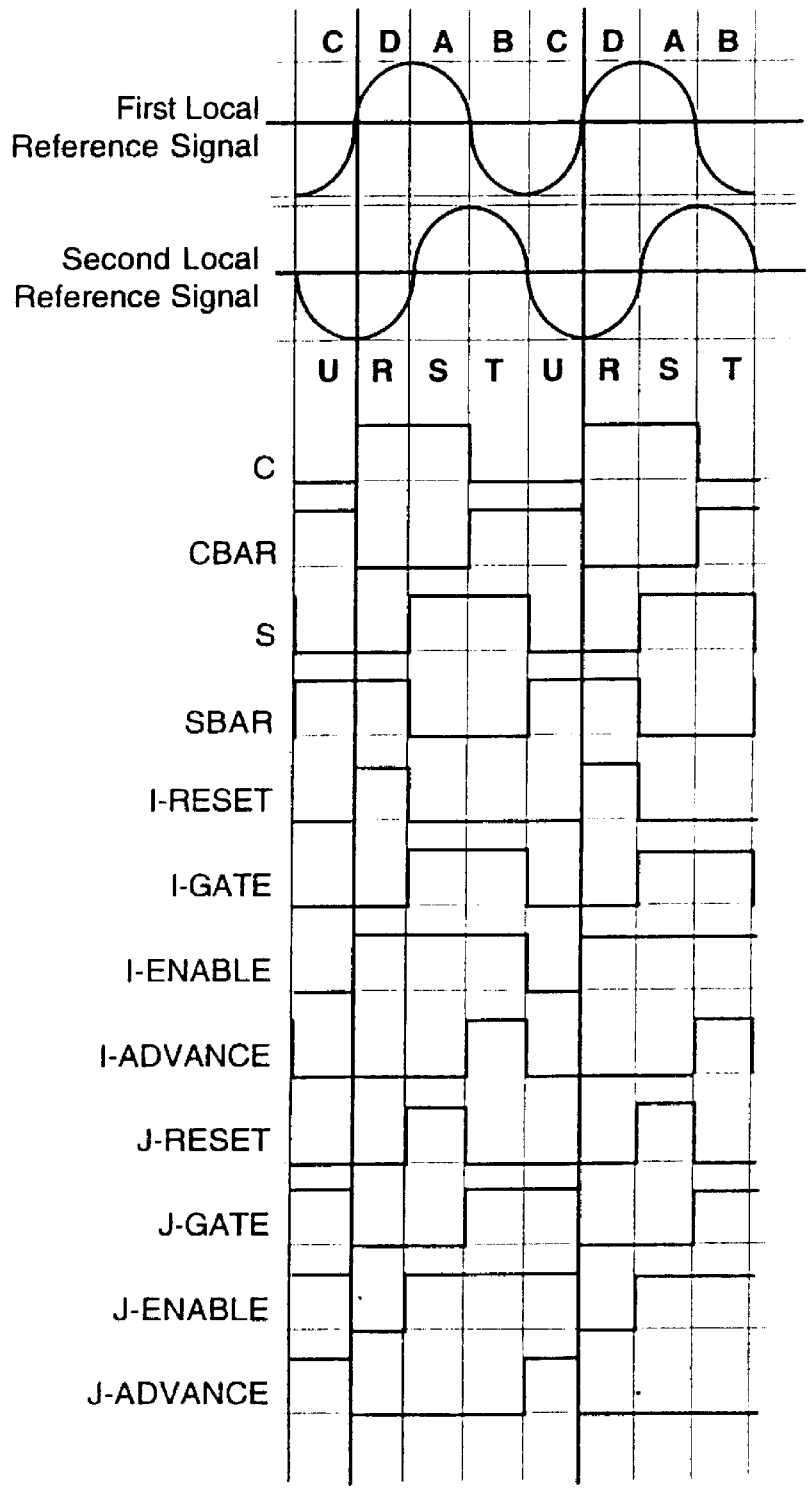
FIG. 9B is a preferred timing diagram for signals generated by the gate sequence generator.

Referring again to FIG. 13A, subperiods R, S, T, and U are defined within a single period of the first system reference signal, and subperiods A, B, C, and D are defined within a single period of the second system reference signal. Each subperiod corresponds to a phase interval of $\pi/2$. Referring also now to FIG. 9B, a preferred timing diagram for signals generated by the gate sequence generator 410 is shown. FIG. 9B shows the timing and phase relationships between the first local reference signal, the second local reference signal, and signals produced within the gate sequence generator 410. As shown in FIG. 9B, the first strobe pulse is in a low state during subperiod D, or equivalently, during subperiod R, and otherwise is in a high state. The first strobe pulse is thus an active-low pulse that corresponds exactly to subperiods D and R. Similarly, the second strobe pulse is an active-low pulse that corresponds exactly to subperiods A and S. The third strobe pulse is an active-low pulses that corresponds exactly to subperiods B and T, and the fourth strobe phase is an active-low pulse that corresponds exactly to subperiods C and U. Those skilled in the art will recognize that any or all of the strobe pulses could be active-high pulses in an alternate embodiment. Thus, the first through fourth strobe pulses precisely indicate which $\pi/2$ subperiod the local reference signals are in at a particular time. The first through fourth strobe pulses are therefore time-aligned to information signals that the modulator 32 of FIG. 2 has applied to the first and second system reference signals.

The first through fourth strobe pulses are applied to the flip-flop tree 488 via a first through a fourth distribution line 481, 492, 493, 494, respectively. the flip-flop tree 488 preferably comprises a set of SR flip-flops that includes an in-phase reset flip-flop 470, an in-phase gate flip-flop 472, an in-phase enable flip-flop 474, an in-phase advance flip-flop 476, a quadrature-phase reset flip-flop 480, a quadrature-phase gate flip-flop 482, a quadrature-phase enable flip-flop 484, and a quadrature-phase advance flip-flop 484, each of which has a first input, a second input, and an output. The input and output of each flip-flop 470, 472, 474, 476, 480, 482, 484, 486 within the flip-flop tree 488 is preferably coupled to the set of distribution lines 481, 482, 483, 484 in the manner shown in FIG. 9A. In the preferred embodiment, the flip-flop tree 488 outputs an in-phase reset signal at the output of the in-phase reset flip-flop 470; an in-phase gate signal at the output of the in-phase gate flip-flop 472; an in-phase enable signal at the output of the in-phase enable flip-flop 474; an in-phase advance signal at the output of the in-phase advance flip-flop; a quadrature-phase reset signal at the output of the quadrature-phase flip-flop 482; a quadrature-phase gate signal at the output of the quadrature-phase gate flip-flop 484; a quadrature-phase enable signal at the output of the quadrature-phase enable flip-flop 486; and a quadrature-phase advance signal at the output of the quadrature-phase advance flip-flop 486. The output of each flip-flop 470, 472, 474, 476, 480, 482, 484, 486 within the flip-flop tree 488 forms an output of the gate sequence generator 410.

As previously mentioned, the gate sequence generator 410 sequences demodulation operations within the coherent reception unit 200. The detailed application of the in-phase reset, gate, enable, and advance signals for the demodulation of the first rectified signal is now considered with regard to FIGS. 8 and 9B. At the beginning of phase D of the first local reference signal, the in-phase reset signal and the in-phase enable signal transition from a low state to a high state. Herein, the low state will be referred to as a "0," and the high state will be referred to as "1," corresponding to a conventional binary representation. The first gated integrator 412 receives the in-phase reset signal at a reset input. Thus, during phase D, the in-phase reset signal is applied to the first gated integrator 412 and the first gated integrator's output transitions to 0. This 0 propagates through the first ADCU 420 because the first ADCU 420 receives the in-phase enable signal. When the first local reference signal transitions from phase D to phase A, the in-phase reset signal transitions to 0 and the in-phase gate signal transitions from 0 to 1. As shown in FIG. 9B, the period during which the in-phase gate signal is high corresponds to the period during which the second local reference signal is positive, or equivalently, phases S and T. Thus, phases S and T correspond to an integration gate for the first gated integrator 412. During phases S and T, the first gated integrator 412 integrates the first rectified signal, thereby generating a first average signal. At the end of phase T, the first average signal preferably has an amplitude equal to the amplitude of the first rectified signal, scaled by the integral of a squared sinusoid over one-half of its period, or $\pi/2$. Those skilled in the art will recognize that in an alternate embodiment, the first gated integrator 412 could include conventional circuitry for applying an additional scaling to the amplitude of the first rectified signal, for example, by a factor of $1/\pi$ or $2/\pi$ it.

Figure 9C:
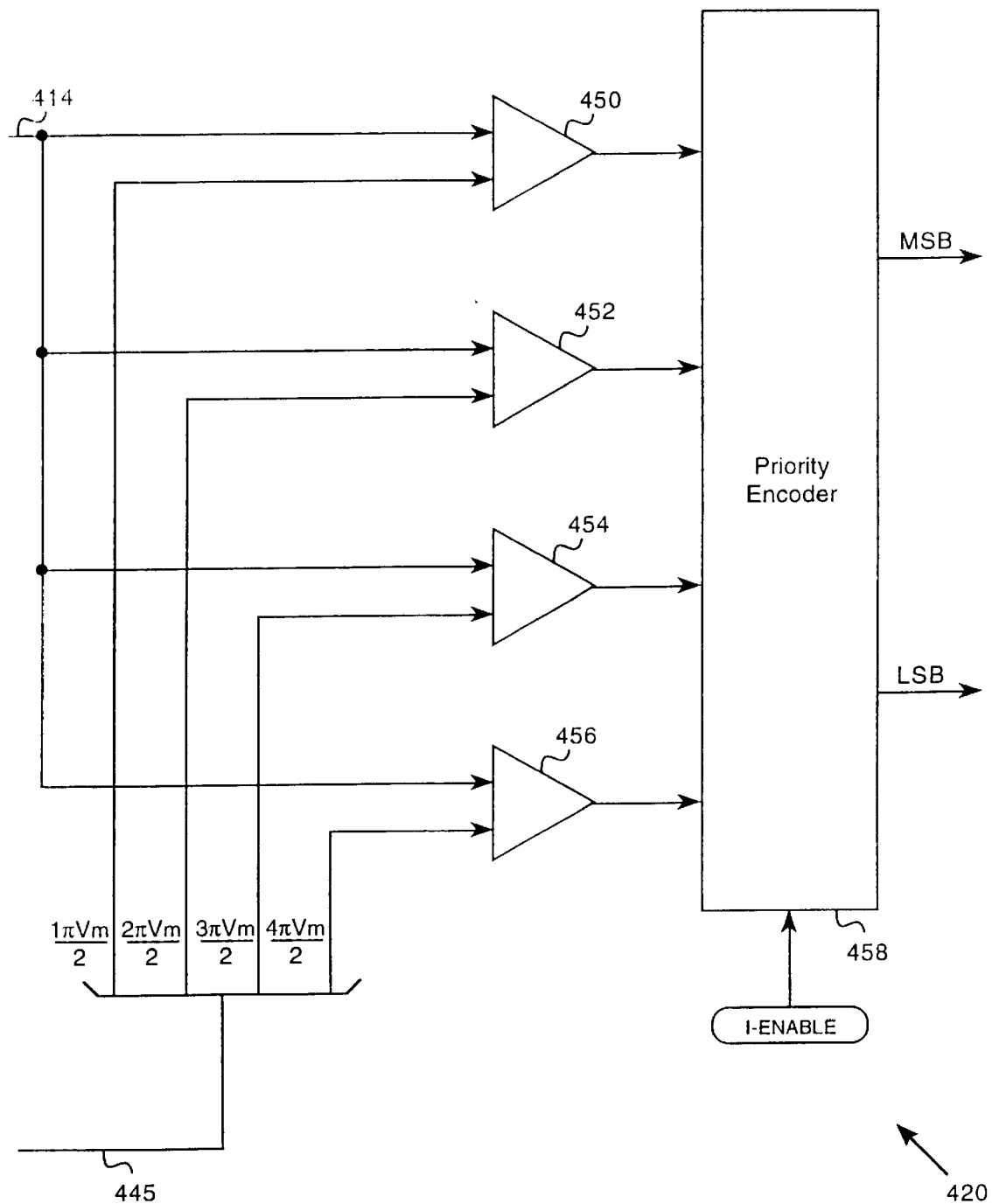
FIG. 9C is a block diagram of a preferred embodiment of an Analog-to-Digital Conversion Unit of the present invention.

In the preferred embodiment, the third F–V converter 440 outputs a set of demodulation reference voltages having amplitudes that depend upon the frequency of the second local reference signal, or equivalently, upon the frequency of the first and second system reference signals. The third F–V converter 440 preferably has an internal structure analogous to that shown for the first F–V converter 134 of FIG. 3B. The first ADCU 420 receives the demodulation reference voltages, compares the first average signal against the demodulation reference voltages, and generates an in-phase dibit comprising a first MSB and a first LSB. Referring now to FIG. 9C, a block diagram of a preferred embodiment of the first Analog-to-Digital Conversion Unit 420 is shown. The first ADCU 420 preferably comprises a first comparator 450, a second comparator 452, a third comparator 454, a fourth comparator 456, and a priority encoder 458. Each of the first, second, third, and fourth comparators 450, 452, 454, 456 have a first input coupled to the output of the first gated integrator 412 via a first average line 414. Each of the first through fourth comparators 450, 452, 454, 456 have a second input coupled to a demodulation reference line 445 such that the first comparator 450 receives a voltage of $(1V_m*\pi/2)$; the second comparator 452 receives a voltage of $(2V_m*\pi/2)$; the third comparator 454 receives a voltage of $(3V_m*\pi/2)$; and the fourth comparator 456 receives a voltage of $(4V_m*\pi/2)$. Each of the first through fourth comparators 450, 452, 454, 456 additionally has an output coupled to a corresponding input of the priority encoder 458. The priority encoder 458 also has an enable input coupled to receive the in-phase enable signal, and an MSB output and an LSB output coupled to the input of the first MSB flip-flop 426 and the input of the first LSB flip-flop 428, respectively. The priority encoder's MSB output forms an MSB output of the first ADCU 420, and the priority encoder's LSB output forms an LSB output of the first ADCU 420.

In operation, each of the first through fourth comparators 450, 452, 454, 456 receive the first average signal, and compare the first average signal against a corresponding voltage received via the demodulation reference line 445. For a given comparator 450, 452, 454, 456, voltage equality results in the generation of a 1 at its output, while voltage inequality results in the generation of a 0. Thus, in the event that the first average signal equals $(1V_m*\pi/2)$, the first comparator 450 outputs a 1. Similarly, in the event that the first average signal equals $(2V_m*\pi/2)$, $(3V_m*\pi/2)$, or $(4V_m*\pi/2)$, the second, third, or fourth comparator 452, 454, 456 output a 1, respectively. The priority encoder 458 receives the output of each of the first through fourth comparators 450, 452, 454, 456, and generates a corresponding in-phase dibit in accordance with the preferred signaling plan, thereby recovering a dibit that the modulator 32 of FIG. 1 had encoded onto the first system reference signal. Referring again to FIG. 5B, in the preferred signaling plan of the present invention, in the event that the first average signal equals $(1V_m*\pi/2)$, the priority encoder 458 generates the in-phase dibit as <00>, where the dibit format is defined as <MSB, LSB>. Similarly, when the first average signal equals $(2V_m*\pi/2)$, $(3V_m*\pi/2)$, or $(4V_m*\pi/2)$, the priority encoder 458 generates the in-phase dibit as <01>, <10>, or <11>, respectively. At the end of subperiod T, or equivalently subperiod B, the in-phase enable signal transitions to 0, causing the first MSB flip-flop 426 to latch the first MSB and the first LSB flip-flop 428 to latch the first LSB.

Those skilled in the art will readily understand the manner in which the third F–V converter 440 and the ADCU 420 would be modified to ensure proper generation of the in-phase dibit in the event that the first gated integrator 412 included circuitry for applying an additional scaling to the amplitude of the first rectified signal, for example, by a factor of $1/\pi$ or $2/\pi$.

The in-phase reset, gate, and enable signals are used in the generation of the in-phase dibit via demodulation of the first rectified signal. Those skilled in the art will recognize that the second ADCU 421 has an internal structure identical to that of the first ADCU 420, and is coupled to the third F–V converter 440, the quadrature-phase MSB flip-flop 427, and the quadrature-phase LSB flip-flop 429 in the manner shown in FIG. 8. Moreover, those skilled in the art will readily understand that the demodulation of the second rectified signal is performed in a manner analogous to that described above for the first rectified signal, and is sequenced according to the quadrature-phase signals shown in FIG. 9B to produce the quadrature-phase dibit. Those skilled in the art will also recognize that the quadrature-phase dibit is generated later than the in-phase dibit by one subperiod, or the time interval H.

As described above, an in-phase dibit and a quadrature-phase dibit are generated based upon the modulation applied to the first and second system reference signals, respectively, within the master time-base unit 12. Herein, the manner in which the aforementioned dibits are generated is preferably defined by the system reference signal demodulation protocol shown in FIG. 13C.

When the present invention is employed to provide one or more local timing signals and/or messaging signals to external components, external signals may be exchanged with the circuitry described herein. This may result in some coupling of external noise into the system 10 of the present invention, such as high-speed digital signals cross-coupling through an electrical ground path. In the system 10 of the present invention, the process of coherent reception mitigates this noise coupling situation substantially through the use of synchronous reception and signal integration in the dibit recovery process described above. That is, recovery of information is performed within the context of the inherently noise-rejecting circuitry described herein.

Figure 10:
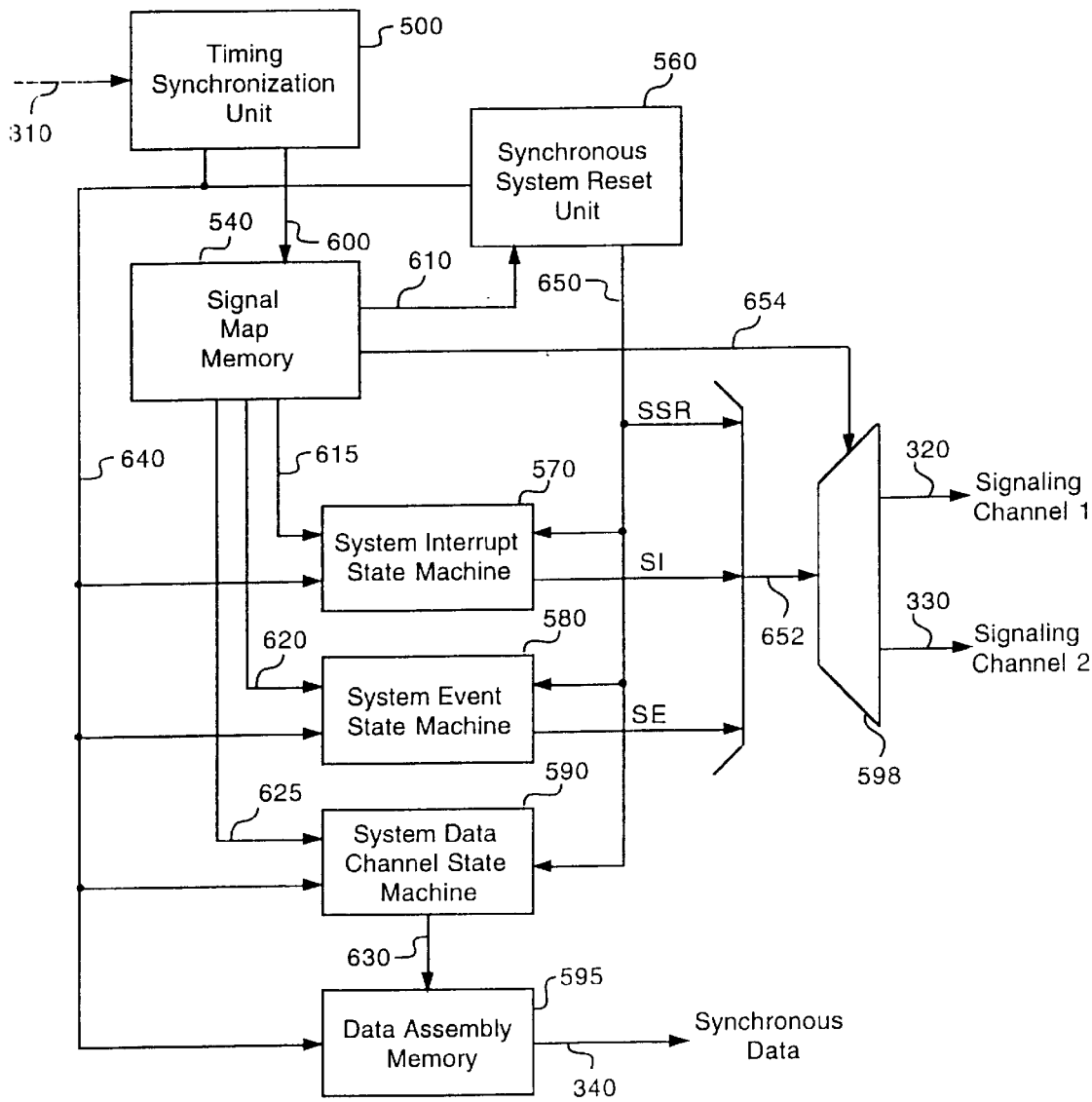
FIG. 10 is a block diagram of a preferred embodiment of a Message Assembly Unit of the present invention.

The MAU 250 receives the in-phase dibits, the quadrature-phase dibits, and the in-phase and quadrature-phase advance signals generated by the coherent reception unit 200 via a second message line 310, and in response generates messages and organizes data. Those skilled in the art will recognize that the messages are generated according to a signaling plan, which herein is given by the preferred signaling plan of FIG. 5B. Referring now to FIG. 10, a block diagram of a preferred embodiment of the Message Assembly Unit 250 is shown. The MAU 250 preferably comprises a Timing Synchronization Unit (TSU) 500, a signal-map memory 540, a Synchronous System Reset Unit (SSRU) 560, a System Interrupt (SI) state machine 570, a System Event (SE) state machine 580, a Synchronous Data Channel (SDC) state machine 590, a Data Assembly (DA) memory 595, and a data selector 598.

Figure 11A:
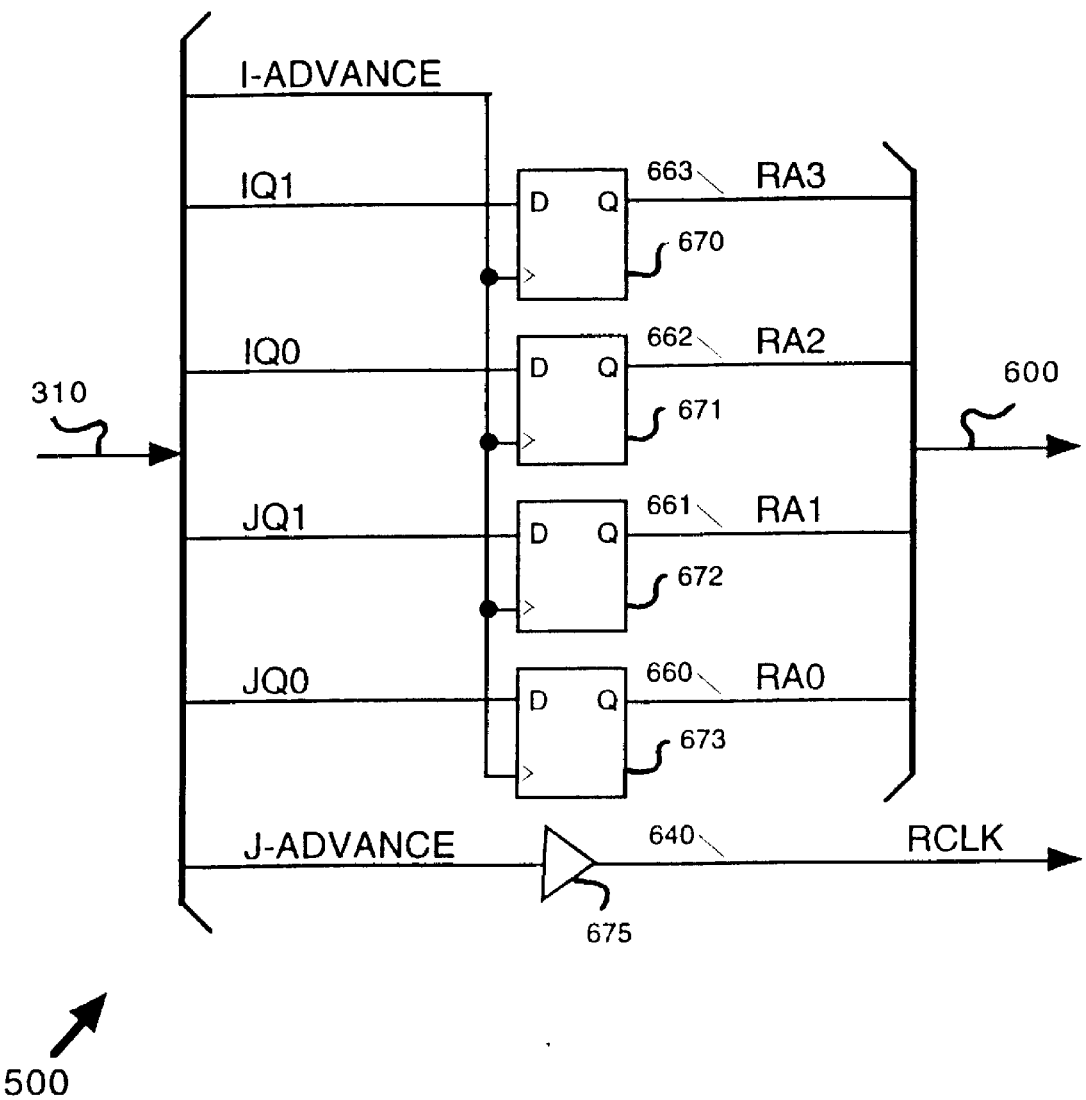
FIG. 11A is a block diagram of a preferred embodiment of a Timing Synchronization Unit of the present invention.

The TSU 500 is coupled to the second message line 310, and thus receives the in-phase dibit, the quadrature-phase dibit, the in-phase advance signal, and the quadrature-phase advance signal. The TSU 500 temporally aligns each in-phase dibit/quadrature-phase dibit pair received from the coherent reception unit. Referring now to FIG. 11A, a block diagram of a preferred embodiment of the Timing Synchronization Unit 500 is shown. The TSU 500 preferably comprises a first, a second, a third, and a fourth synchronization flip-flop 670, 671, 672, 673, and an output amplifier 675. The output amplifier 675 is coupled to receive the quadrature-phase advance signal. The output amplifier 675 has an output that routes the quadrature-phase advance signal to the SI state machine 570, the SE state machine 580, the SDC state machine 590, and the DA memory 595 via a clock line 640. The use of the quadrature-phase advance signal in each of SI, SE, and SDC state machines 570, 580, 590 and the DA memory 595 is described in detail below with reference to FIGS. 12A through 12D.

The first synchronization flip-flop 670 is coupled to receive the MSB of the in-phase dibit, that is, the first MSB. The second synchronization flip-flop 671 is coupled to receive the LSB of the in-phase dibit. Similarly, the third and fourth synchronization flip-flops 672, 673 are respectively coupled to receive the MSB and LSB of the quadrature-phase dibit. Each of the first, second, third, and fourth synchronization flip-flops 670, 671, 672, 673 has an enable input coupled to receive the in-phase advance signal. The in-phase advance signal directs the loading of the in-phase and quadrature-phase dibits into the set of synchronization flip-flops 670, 671, 672, 673. Referring again to FIG. 9B, the in-phase advance signal transitions from 0 to 1 in response to the first local reference signal's zero-crossing transition from subperiod A to subperiod B. The in-phase advance signal subsequently transitions from 1 to 0 in response to the second local reference signal's zero-crossing transition from subperiod T to subperiod U. The in-phase advance signal is thus high for the duration of a single subperiod, which is defined herein as the time interval H. In the preferred embodiment, the first through fourth synchronization flip-flops 671, 672, 673, 674 latch a signal present at their inputs in response to a low-to-high, or rising-edge transition, in the in-phase advance signal. As can be seen from FIG. 9B, there is a time delay equal to 3H between the latching of the in-phase dibit within the coherent reception unit 200 and the latching of the in-phase dibit within the TSU 500. Similarly, there is a time delay equal to 2H between the latching of the quadrature-phase dibit within the coherent reception unit 200 and the latching of this dibit within the TSU 500. Because the in-phase and quadrature-phase dibit latching delays differ by H, the TSU 500 eliminates the phase difference between each in-phase/quadrature-phase dibit pair received from the coherent reception unit 200. The first through fourth synchronization flip-flops 671, 672, 673, 674 output each temporally-aligned in-phase/quadrature-phase dibit pair to the signal-map memory 540 via an address line 600.

Figure 11B:
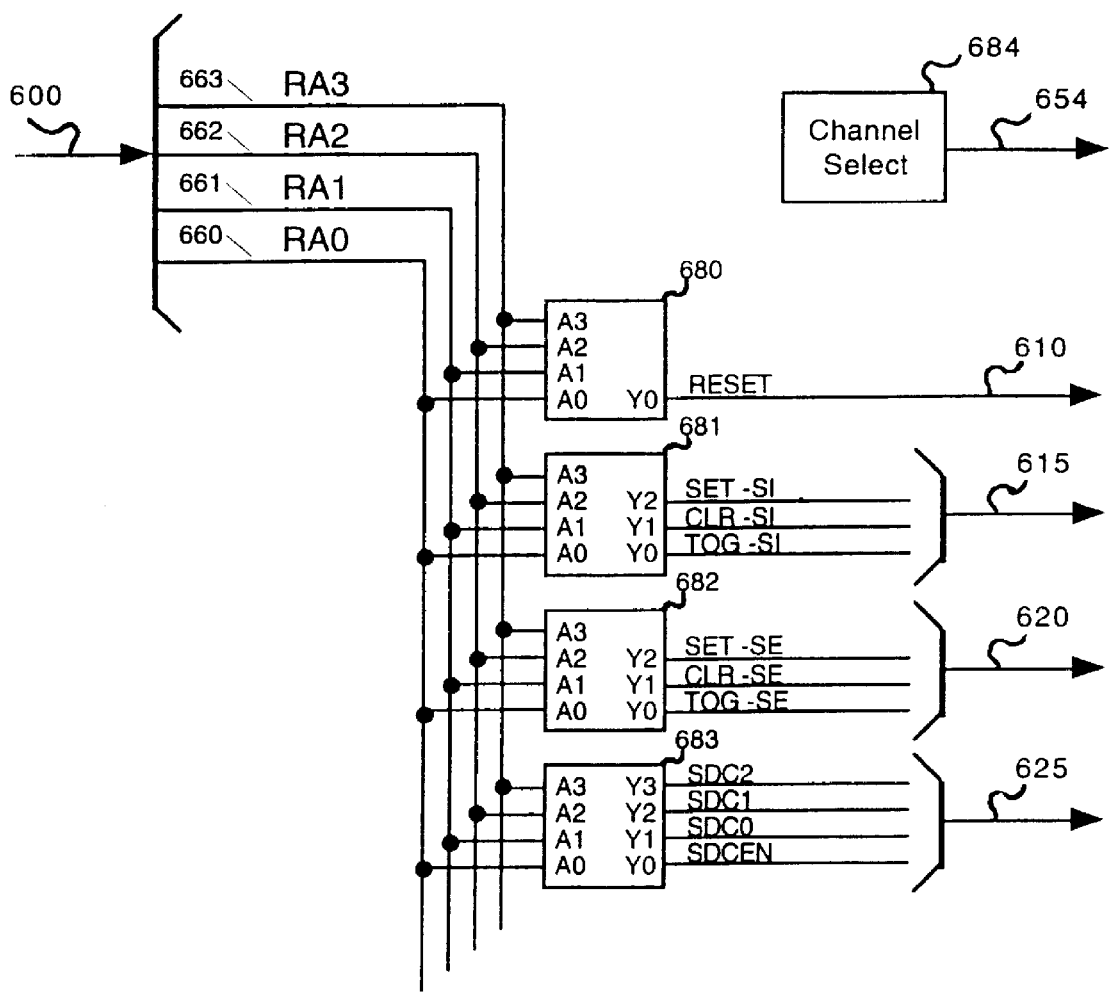
FIG. 11B is a block diagram of a preferred embodiment of a signal-map memory of the present invention.

The signal-map memory 540 receives each temporally-aligned in-phase dibit/quadrature-phase dibit pair, and generates state control signals in response. The signal-map memory 540 additionally outputs a channel select signal. Referring now to FIG. 11B, a block diagram of a preferred embodiment of the signal-map memory 540 is shown. The signal-map memory 540 preferably comprises a first memory 680, a second memory 681, a third memory 682, a fourth memory 683, and a channel-select memory 684. Within the signal-map memory 540, the address line 600 is divided into a first, a second, a third, and a fourth address-select line 660, 661, 662, 663. Each of the first, second, third, and fourth memories 680, 681, 682, 683 has a first, second, third, and fourth input respectively coupled to the first address-select line 660, the second address-select line 661, the third address-select line 662, and the fourth address-select line 663. The first through fourth memories 680, 681, 682, 683 preferably receive the MSB of the in-phase dibit on the fourth address-select line 663, the LSB of the in-phase dibit on the third address-select line 662, the MSB of the quadrature-phase dibit on the second address-select line 661, and the LSB of the quadrature-phase dibit on the first address-select line 660.

The first, second, third, and fourth memories 680, 681, 682, 683 each have a set of outputs that provide state control signals to the SSRU 560, the SI state machine 570, the SE state machine 580, and the SDC state machine 590, respectively. Based upon the values of the MSB and LSB of each of the in-phase and quadrature-phase dibits, each memory 680, 681, 682, 683 acts as a look-up table, and routes a particular set of state control signals to its set of outputs. In the preferred embodiment, the first memory 680 outputs a reset signal. The second memory 681 outputs an SI-toggle signal, an SI-clear signal, and an SI-set signal. The third memory 682 outputs an SE-toggle, an SE-clear, and an SE-set signal. Finally, the fourth memory 683 outputs an SDC-enable signal, a first SDC signal, a second SDC signal, and a third SDC signal. The state control signals output by the first through fourth memories 680, 681, 682, 683 preferably direct the operation of the SSRU 560 and the state machines 570, 580, 590 within the MAU 250 to implement the functions specified by the preferred signaling plan of FIG. 5B.

The channel-select memory 684 is preferably a memory for storing and outputting a channel-select signal that controls the operation of the data selector 598 of FIG. 10, which is described in detail below. In the preferred embodiment, each memory 680, 681, 682, 683 within the signal-map memory 540 is implemented as a type of Read-Only Memory (ROM) using a reconfigurable or reprogrammable logic device, such as an FPGA. Such an implementation provides for the flexible specification of each memory's mapping of in-phase and quadrature-phase dibit LSBs and MSBs to state control signals at its outputs. That is, by reprogramming or reconfiguring one or more memories 680, 681, 682, 683 within the signal-map memory 540, the state control signals output by each of the first, second, third, and/or fourth memories 680, 681, 682, 683, as well as the channel-select signal output by the channel-select memory 684, can be selectively altered. In the preferred embodiment, the first through fourth memories 680, 681, 682, 683 within the signal-map memory 540 are configured such that the state control signals direct the SSRU 560, the SI state machine 570, the SE state machine 589, and the SDC state machine 590 to perform the functions defined within the preferred signaling plan of FIG. 5B. Those skilled in the art will recognize that one or more memories 680, 681, 682, 683 within the signal-map memory 540 can be selectively reconfigured to implement functions other than those defined in FIG. 5B.

Figure 12A:
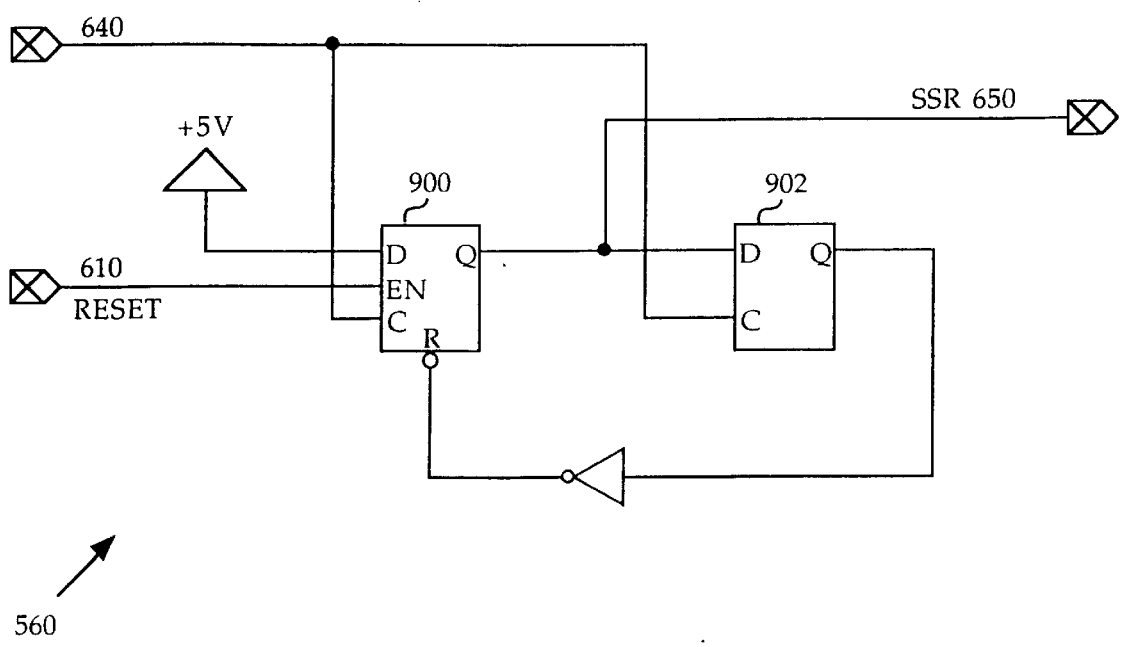
FIG. 12A is a block diagram of a preferred embodiment of a Synchronous System Reset unit of the present invention.

In the preferred embodiment, the reset signal output by the signal-map memory 540 indicates whether a system-wide reset is required. When a system-wide reset is required, the SSRU 560 outputs an SSR signal, which is indicated as the "Assert SSR" function in FIG. 5B. Referring now to FIG. 12A, a block diagram of a preferred embodiment of the Synchronous System Reset Unit 560 is shown. The SSRU 560 comprises a first flip-flop 900 and a second flip-flop 902. The SSRU 560 is coupled to receive the reset signal output by the signal-map memory 540 at an enable input of the first flip-flop 900. Each of the first and second flip-flops 900, 902 have a clock input coupled to the clock line 640. The first flip-flop 900 has an input coupled to a high-state signal, and the second flip-flop 902 has an input coupled to an output of the first flip-flop 900. The output of the first flip-flop 900 forms an output of the SSRU 560, at which the SSR signal is produced. Finally, the first flip-flop 900 has a reset input coupled to an output of the second flip-flop 902. In the event that the reset signal transitions to a high state, the SSR signal is maintained in a high state over two system reference signal periods, that is, a time interval of 8H, as synchronized by the quadrature-phase advance signal. The SSR signal is routed to each of the SI state machine 570, the SE state machine 580, the SDC state machine 590, and the data selector via an SSR line 650.

Figure 12B:
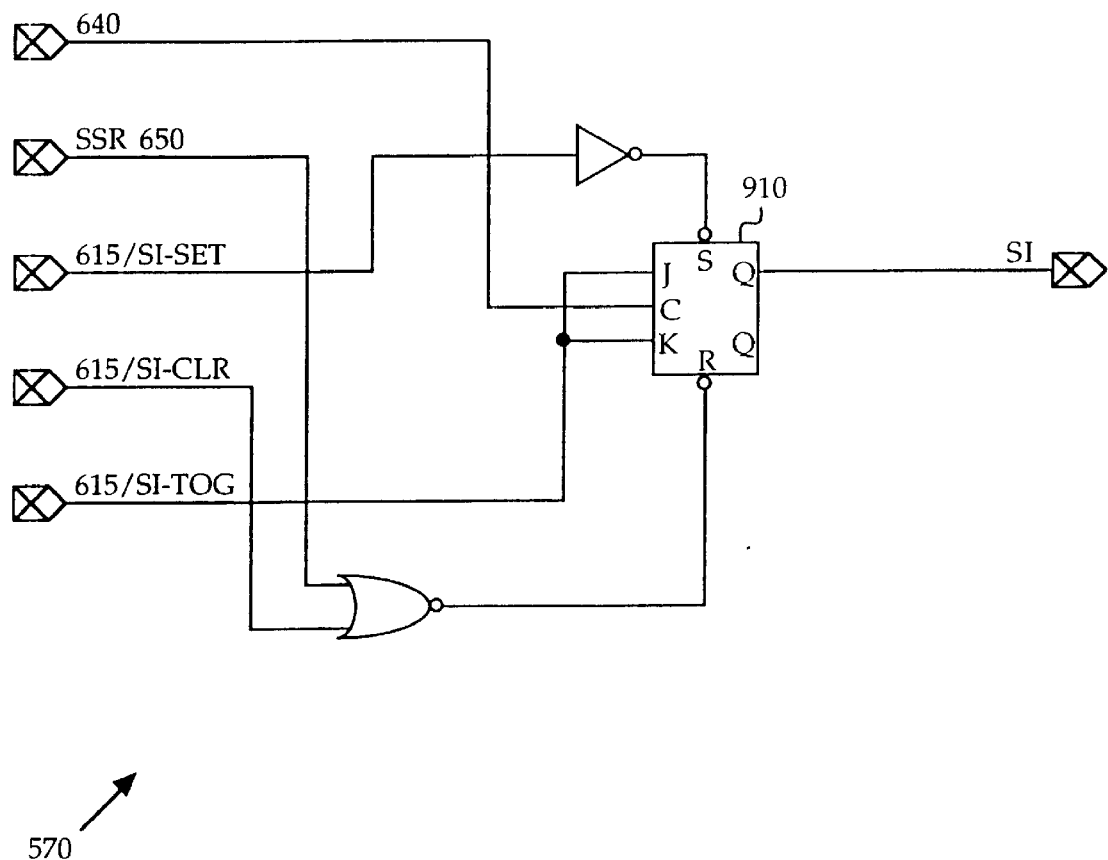
FIG. 12B is a block diagram of a preferred embodiment of a System Interrupt state machine of the present invention.

The SI-toggle, SI-reset, and SI-set signals output by the signal-map memory specify that a system interrupt signal SI is to be toggled, reset, or set, respectively, in accordance with the "Toggle SI," "Set SI to L," and "Set SI to H" functions shown in FIG. 5B. The SI state machine 570 outputs the SI signal. Referring now to FIG. 12B, a block diagram of a preferred embodiment of the System Interrupt state machine 570 is shown. The SI state machine 570 comprises a first J–K flip-flop 910 coupled to receive the SI-set signal at a set input; the SI-toggle signal at each of a J and a K input; and each of the SSR signal and the SI-clear signal at a reset input via an OR function. The first J–K flip-flop 910 additionally has a clock input coupled to the clock line 640, and an output that forms an output of the SI state machine 570, at which the SI signal is produced. In the preferred embodiment, the SI-set, SI-toggle, and the SI-clear signals are applied to the first J–K flip-flop 910 to set, toggle, and reset the SI signal in a manner that will be well understood by those skilled in the art.

Figure 12C:
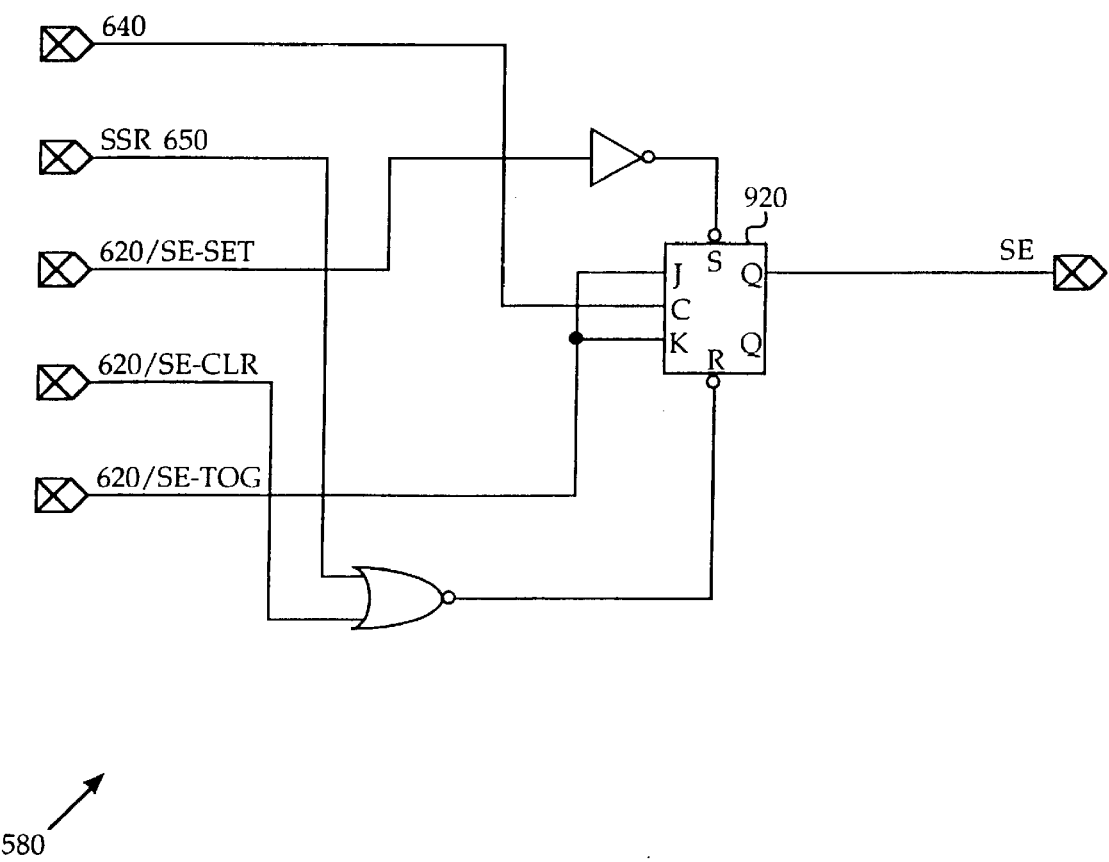
FIG. 12C is a block diagram of a preferred embodiment of a System Event state machine of the present invention.

The SE-toggle, SE-reset, and SE-set signals output by the signal-map memory 540 specify that a system event signal SE is to be toggled, reset, or set, respectively, in accordance with the "Toggle SE," "Set SE to L," and "Set SE to H" functions shown in FIG. 5B. The SE state machine 570 outputs the SE signal. Referring now to FIG. 12C, a block diagram of a preferred embodiment of the System Event state machine 580 is shown. The SE state machine 580 structure and couplings are preferably identical to those of the SI state machine 590, with the exception that the SI-set, SI-clear, and SI-toggle signals are replaced with the SE-set, SE-clear, and SE-toggle signals as shown. The manner in which the SE signal is generated will be readily understood by those skilled in the art.

Referring again to FIG. 10, the data selector 598 is coupled to receive each of the SSR signal, the SI signal, and the SE signal. The data selector 598 additionally has a control input coupled to receive the channel select signal output by the channel select memory 598. The data selector 598 is preferably implemented using a set of conventional data selectors. Based upon the channel select signal, the data selector 598 routes the SSR, the SI, and the SE signals to the first signaling channel 320 or the second signaling channel 330. The present invention thus facilitates the selective, synchronous transfer of a plurality of signals to multiple destinations. Those skilled in the art will recognize that an alternate embodiment could utilize additional or fewer signaling channels 320, 330. When routed to the first signaling channel 320, the SSR, SE, and SI signals provide a means for signaling a first set of external components. In an analogous manner, when routed to the second signaling channel, the SSR, SE, and SI signals provide a means for signaling a second set of external components. Those skilled in the art will recognize that each set of external components can interpret the SSR, SI, and SE signals differently.

Figure 12D:
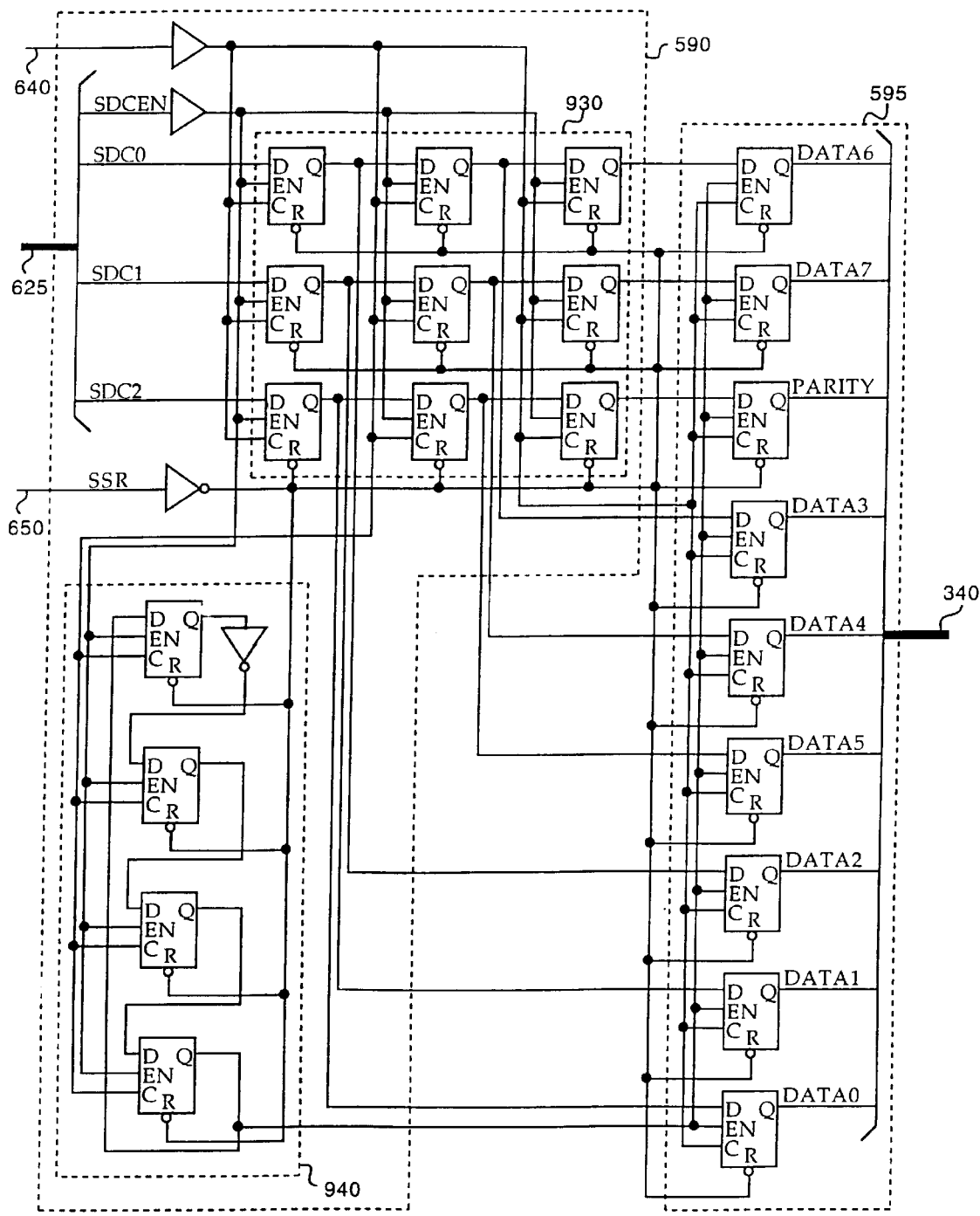
FIG. 12D is a block diagram of a preferred embodiment of a Synchronous Data Channel state machine and a Data Assembly memory of the present invention.

The SDC state machine 590 controls data assembly operations in which the first, second, and third SDC signals output by the signal-map memory 540 are grouped within the DA memory 595 into data words and output to the synchronous data channel 340. Referring now to FIG. 12D, a block diagram of a preferred embodiment of the Synchronous Data Channel state machine 590 and the Data Assembly Memory 595 is shown. The SDC state machine 590 comprises a multistage buffer 930 and a sequence counter 940. The multistage buffer 930 is coupled to receive the first, second, and third SDC signals as well as the SDC enable signal output by the signal-map memory 540. The multistage buffer 930 is additionally coupled to receive the quadrature-phase advance signal via the clock line 640. In the preferred embodiment, the multistage buffer 930 comprises D flip-flops coupled to form three stages. Within any given stage, each D flip-flop has an output coupled to an input of a corresponding D flop-flop within the subsequent stage. Moreover, each D flip-flop within the multistage buffer 930 has an output coupled to an input of the DA memory 595. The flip-flops within each stage are clocked by the quadrature-phase advance signal and enabled by the SDC enable signal. Those skilled in the art will recognize that when the multistage buffer 930 is enabled, each quadrature-phase advance signal pulse clocks a first group of the first, second, and third SDC signals from the second stage into the third stage; a second group of the first, second, and third SDC signals from the first stage into the second stage; and a third group of the first, second, and third SDC signals as output by the signal-map memory 540 into the first stage. Thus, any given set of the first, second, and third SDC signals is transferred from one stage to the next according to the quadrature-phase advance signal.

The sequence counter 940 outputs a periodic enable signal to the DA memory 595. The sequence counter 940 is coupled to receive the quadrature-phase advance signal and the SDC enable signal. The sequence counter 940 preferably comprises flip-flops coupled to output a binary sequence such that loading of the DA memory 595 is enabled according to a periodic number of quadrature-phase advance signal pulses. For a multistage buffer 930 having a number of stages defined as S, the sequence counter 940 preferably outputs the periodic enable signal such that DA memory 595 loading is enabled every for every (S+1)th quadrature-phase advance signal pulse.

The DA memory 595 preferably comprises a conventional register coupled to receive the quadrature-phase advance signal, the periodic enable signal, and signals output by the multistage buffer 930. When the periodic enable signal transitions to a high state, the DA memory 595 loads the outputs of each stage within the multistage buffer 930. In the preferred embodiment, the multistage buffer 930 outputs nine bits, which are grouped as eight data bits plus one parity bit in the manner shown in FIG. 12D. Those skilled in the art will recognize that the DA memory 595 could be implemented to output additional or fewer bits. The DA memory 595 outputs the loaded data bits and the parity bit to the synchronous data channel 340. Those skilled in the art will further recognize that in an alternate embodiment, the DA memory 595 could output one or more bits to an additional synchronous data channel (not shown). Such an embodiment could simultaneously output subsets of bits to separate synchronous data channels, or select a given synchronous data channel via a data selector or reprogrammable logic.

Via the signal-map memory 540, the SDC state machine 590, and the DA memory 595, the present invention facilitates data broadcast operations in which data is synchronously transferred from the master time-base unit 12 to each local time-base unit 22. Those skilled in the art will recognize that because the data is encoded onto the system reference signals via the modulator 32, the present invention facilitates high-speed data broadcast operations which are not possible in the prior art.

Those skilled in the art will recognize that in general, the SI, SE, and SDC state machines 570, 580, 590 are state machines that perform system interrupt, system reset, and synchronous data operations, respectively. Therefore, those skilled in the art will readily understand that alternate implementations of the SI, SE, and SDC state machines 570, 580, 590 are possible.

Method Steps

Figure 14A:
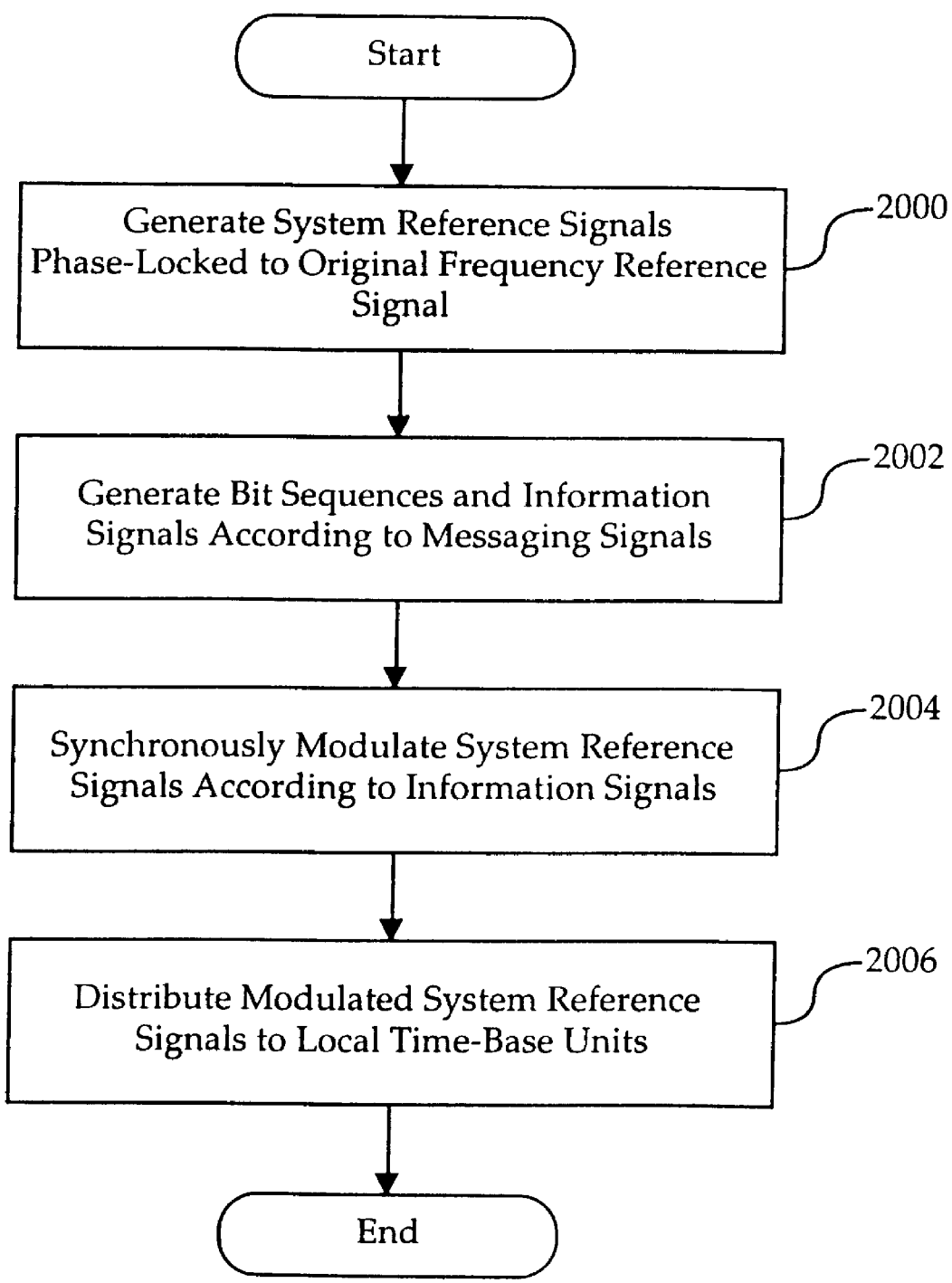
FIG. 14A is a flowchart of preferred master time-base unit operations in the present invention.

Referring now to FIG. 14A, a flowchart of preferred master time-base unit operations is shown. The preferred master time-base unit 12 operations begin in step 2000 with the generation of the first and second system reference signals by the CRS 30, where the first and second system reference signals are phase-locked to the original frequency reference signal in the manner described above. In the preferred embodiment, the first and second system reference signals are sinusoidal signals having a quadrature phase-relationship. Next, in step 2002, the MSM 34 generates bit sequences and information signals according to messaging signals received at its input. As previously described, the MSM 34 uses the first and second system reference signals to synchronously generate the bit sequences and information signals. Following step 2002, the modulator 32 synchronously modulates the first and second system reference signals according to the information signals generated by the MSM 34 in step 2004. In step 2004, the modulation is preferably direct-carrier AM. After step 2004, the first and second modulated system reference signals are respectively distributed to each local time-base unit 22 via the first and second distribution amplifiers 36, 38 and the first and second lines 16, 18 of the system bus 14 in step 2006, after which the preferred method ends. The preferred master time-base unit operations shown in FIG. 14A have been described as a single sequence for ease of understanding. Those skilled in the art will recognize that each of the aforementioned steps are performed continuously and synchronously relative to each other step during normal system operation.

Figure 14B:
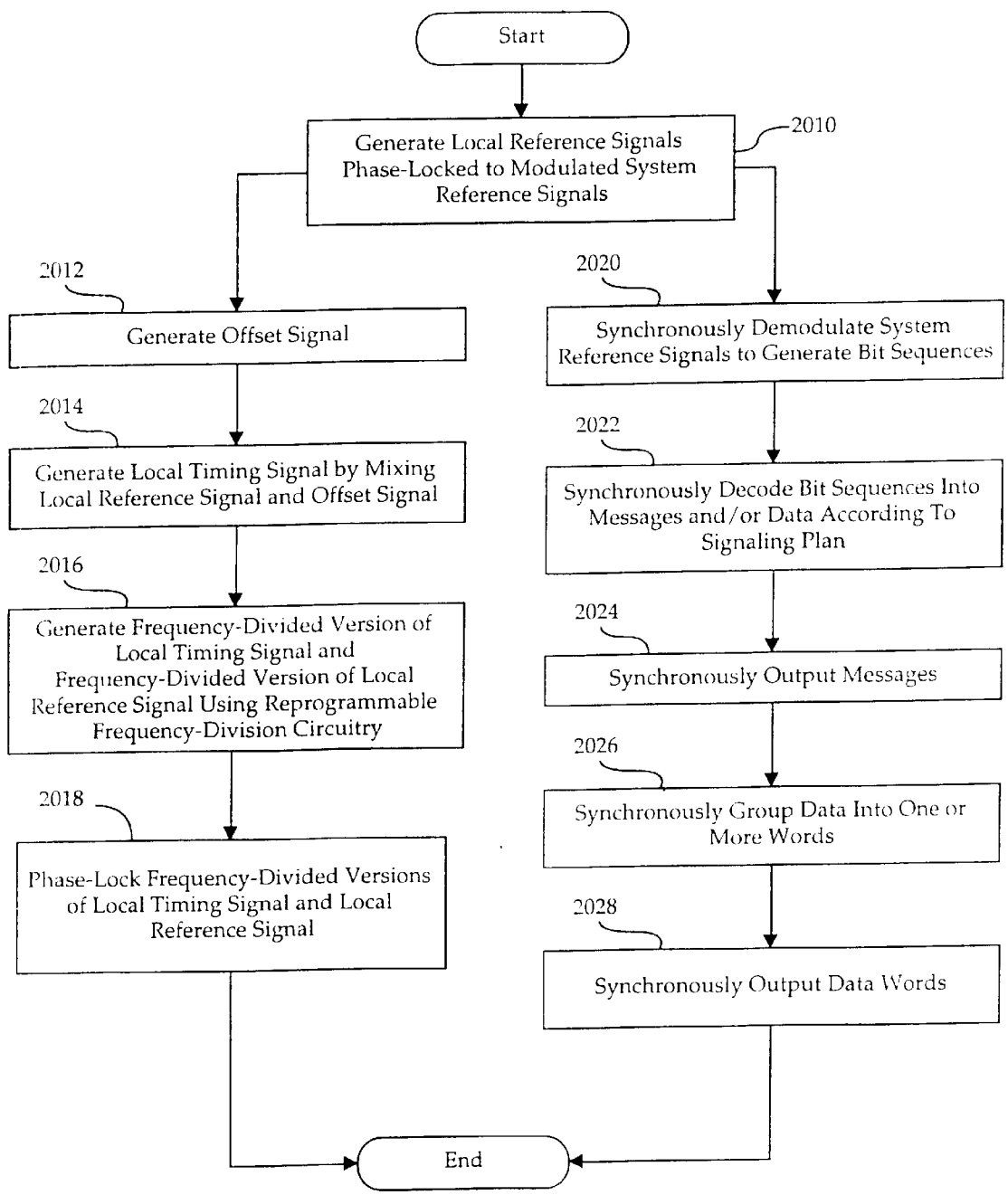
FIG. 14B is a flowchart of preferred local time-base unit operations in the present invention.

Referring also now to FIG. 14B, a flowchart of preferred local time-base unit operations is shown. The preferred local time-base unit 22 operations begin in step 2010 with the generation of the first and second local reference signals by the local QRO 202, where the local reference signals are phase-locked to the modulated system reference signals via the second phase detector 204 and the second loop filter 206 as described above.

Each local time-base unit 22 simultaneously generates a local timing signal and demodulates the first and second modulated system reference signals after step 2010. In the generation of the local timing signal, the LTO 208 generates the offset signal in step 2012. Next, the timing signal mixer 210 and the timing signal filter generate the local timing signal via frequency upconversion in step 2014, in the manner previously described. Because the local timing signal is generated via frequency upconversion, the frequency of the local timing signal is higher than that of the first and second system reference signals. Following step 2014, the first and second reference dividers 220, 222 generate a frequency-divided version of the local timing signal and a frequency-divided version of the second local reference signal in step 2016, respectively. The frequency-divided versions of the local timing signal and the second local reference signal are then phase-locked in step 2018. The use of reprogrammable or reconfigurable reference dividers 220, 222 in conjunction with phase-lock facilitates the programmable specification of the frequency of the local timing signal, within a frequency range.

In the demodulation of the first and second modulated system reference signals, the coherent reception unit 200 synchronously demodulates the first and second modulated system reference signals in step 2020, thereby recovering bit sequences that were encoded onto the first and second system reference signals by the modulator 32 within the master time-base unit 12. Next, the MAU 250 synchronously decodes the bit sequences output by the coherent reception unit 200 according to a signaling plan in step 2022, thereby producing messages and/or data. Following step 2022, the MAU 250 synchronously outputs messages to a signaling channel 320, 330 in step 1024. The MAU 250 additionally synchronously groups data into one or more words in step 2026, after which the MAU 250 outputs each data word to the synchronous data channel 340 in step 2028. Following each of steps 2018 and 2028, the preferred method ends. The preferred local time-base unit operations shown in FIG. 14B have been described as a nonrepetitive sequence for ease of understanding. Those skilled in the art will recognize that each of the steps shown in FIG. 14B are performed continuously and synchronously relative to each other step during normal system operation.

Conclusion

In contrast to nearly all prior art systems and methods for generating and distributing a reference timing signal, the present invention generates and distributes sinusoidal signals rather than square-wave signals. Those skilled in the art will recognize that the generation and distribution of square-wave signals is particularly difficult at high frequencies because more current and vastly more gain is required to reliably generate fast, low-skew square-wave signals than smoothly-varying sinusoidal signals. Additionally, pulse reflections along a distribution path are much more severe for square-wave signals because the magnitude of such reflections is proportional to the derivative of signal rise time. The present invention thus advantageously avoids the problems associated with the generation and system-wide distribution of a square-wave signal. In general, the present invention can reliably generate and distribute much higher frequency signals on a system-wide basis than prior art systems and methods based upon square-wave signals.

The first and second system modulated reference signals are each distributed to the local time-base units 22 using a single distribution amplifier 36, 38 and a controlled-impedance system bus 14 preferably implemented via conventional stripline or microstrip transmission line technology (i.e., metal and ground plane). Within each local time-base unit 22, a single high-impedance local buffer amplifier 232, 234 is coupled to receive a given modulated system reference signal, thereby ensuring that the local time-base unit 22 is coupled to the system bus 14 in an essentially reflectionless manner. The system 10 of the present invention can therefore be scaled to accommodate additional local time-base units 22 by increasing the length of the system bus 14 and relocating the line termination 20.

The present invention utilizes frequency upconversion within each local time-base unit 22 to generate a local timing signal having a higher frequency than the system reference signals. In contrast, in prior art systems and methods for timing signal distribution, a system timing reference signal is either 1) directly utilized; 2) frequency-divided; or 3) downconverted to produce locally-utilized utilized timing signals. Thus, in the present invention, a high-frequency signal does not have to be generated and distributed on a system-wide basis to produce a high-frequency locally-utilized timing signal. Rather, the system reference signals can be much lower in frequency than any given local timing signal, in stark contrast to prior art systems and methods. Moreover, the present invention teaches a means for generating multiple upconverted local timing signals in parallel, each of which are independent of each other yet synchronized and synchronizable, without requiring special synchronization circuitry within each local time-base unit 22.

Furthermore, except for POR situations, the timing and messaging system 10 described herein requires no synchronizers whatsoever across any boundary within the system 10. Prior art systems and methods do not share similar advantages.

In the preferred embodiment, the present invention relies upon reprogrammable or reconfigurable frequency dividers within each local time-base unit 22, such that local timing signal frequencies can be programmably specified on an individual basis at any given time. Prior art systems and methods for timing signal generation do not share this advantage.

The use of phase-lock ensures that the present invention is highly immune to digital noise. Those skilled in the art will recognize that phase-locked loops are equivalent to filters characterized by Q values in the millions, thereby facilitating the accurate tracking of signals in the presence of noise.

The manner in which the present invention utilizes quadrature signaling, in conjunction with phase-lock, facilitates synchronous, frequency-independent demodulation of the system reference signals. This in turn provides a means for performing synchronous or nearly-synchronous signaling and data transmission operations on a system-wide basis. Prior art systems and methods are incapable of operating in this manner.

While the present invention has been described with reference to certain preferred embodiments, those skilled in the art will recognize that various modifications may be provided. For example, the present invention could be modified to operate at frequencies above 1 GHz. As another example, the present invention could be modified to operate using signals having a non-quadrature phase-relationship or a non-sinusoidal waveform. As yet another example, one or more portions of the present invention could be combined into an integrated circuit. Variations upon and modifications to the preferred embodiments are provided for by the present invention, which is limited only by the following claims.

What is claimed is:

1. A system for clocking comprising:

a master unit having an output, for producing a set of sinusoidal timing reference signals, wherein the set of sinusoidal timing reference signals comprises a first sinusoidal timing reference signal and a second sinusoidal timing reference signal, the first sinusoidal timing reference signal having a fixed phase offset relative to the second sinusoidal timing reference signal; and a first local unit having an input coupled to the output of the master unit, for generating a first local timing signal using a first sinusoidal timing reference signal within the set of sinusoidal timing reference signals.

2. The system of claim 1, wherein the fixed phase offset is a quadrature phase offset.

3. The system of claim 1, wherein the master unit comprises:

a master oscillator having an output and providing an original frequency reference signal;

a phase detector having a first input, a second input, and an output, the first input of the phase detector coupled to the output of the master oscillator;

a loop filter having an input and an output, the input of the loop filter coupled to the output of the phase detector; and a secondary oscillator having a control input and a set of outputs, the control input of the secondary oscillator coupled to the output of the loop filter and the output of the secondary oscillator coupled to the second input of the phase detector, the set of outputs of the secondary oscillator providing the set of sinusoidal timing reference signals.

4. The system of claim 3, wherein the secondary oscillator comprises an Armstrong RF oscillator coupled to a common-base feedback circuit, the secondary oscillator providing a first sinusoidal signal at a first output and a second sinusoidal signal at a second output, the first and second sinusoidal signals having a quadrature phase relationship.

5. The system of claim 1, wherein the master unit comprises:

a master oscillator having an output and providing an original frequency reference signal and a first sinusoidal timing reference signal within the set of sinusoidal timing reference signals;

a phase detector having a first input, a second input, and an output, the first input of the phase detector coupled to the output of the master oscillator;

a loop filter having an input and an output, the input of the loop filter coupled to the output of the phase detector; and a secondary oscillator having a control input and an output, the control input of the secondary oscillator coupled to the output of the loop filter and the output of the secondary oscillator coupled to the second input of the phase detector, the output of the secondary oscillator providing a second sinusoidal timing reference signal within the set of sinusoidal timing reference signals.

6. The system of claim 5, wherein the first and second sinusoidal timing reference signals maintain a quadrature phase relationship.

7. The system of claim 1, wherein the local unit comprises a frequency divider.

8. The system of claim 1, wherein the local unit comprises a phase-locked loop for generating a local reference signal phase-locked to a sinusoidal timing reference signal within the set of sinusoidal timing reference signals.

9. The system of claim 1, wherein the local unit comprises:

an offset oscillator having an output; and a mixer having a first input, a second input, and an output, the first input of the mixer coupled to the output of the master unit, the second input of the mixer coupled to the output of the offset oscillator, the output of the mixer coupled to an output of the local unit.

10. The system of claim 9, wherein the local unit further comprises a diplexer having an input, a first output, and a second output, the input of the diplexer coupled to the output of the mixer, the first output of the diplexer coupled to an input of a mixer termination, the second output of the diplexer coupled to the output of the local unit, wherein the diplexer provides a low-frequency mixing product signal at its first output and a high-frequency mixing product signal at its second output.

11. The system of claim 9, wherein the local unit further comprises a limiter having an input and an output, the input of the limiter coupled to the output of the mixer, the output of the limiter providing the first local timing signal.

12. The system of claim 9, wherein the local unit further comprises:

a phase and frequency detector having a first input, a second input, and an output, the output of the phase and frequency detector coupled to a control input of the offset oscillator;

a first frequency divider having an input coupled to the output of the mixer and an output coupled to the first input of the phase and frequency detector; and a second frequency divider having an input coupled to the output of the master unit and an output coupled to the second input of the phase and frequency detector.

13. The system of claim 12, wherein the phase and frequency detector comprises a portion of a reprogrammable logic device.

14. The system of claim 12, wherein the first frequency divider comprises a portion of a reprogrammable logic device.

15. The system of claim 12, wherein the second frequency divider comprises a portion of a reprogrammable logic device.

16. The system of claim 1, further comprising a second local unit having an input coupled to the output of the master unit, for generating a second local timing signal from the first sinusoidal signal within the set of sinusoidal timing reference signals.

17. A system for clocking comprising:

a master unit having a first output, for producing a set of sinusoidal timing reference signals, wherein the set of sinusoidal timing reference signals comprises a first sinusoidal timing reference signal and a second sinusoidal timing reference signal, the first sinusoidal timing reference signal having a fixed phase offset relative to the second sinusoidal timing reference signal; and a plurality of local units, each local unit having a first input passively coupled to the first output of the master unit, each local unit generating a local timing signal using a first sinusoidal timing reference signal within the set of sinusoidal timing reference signals.

18. The system of claim 17, wherein the first input of each local unit is coupled to the first output of the master unit by a scalable passive signal distribution means.

19. The system of claim 18, wherein the scalable passive signal distribution means is a transmission line.

20. A system for combined clocking and messaging comprising:

a master unit having an output, for producing a set of sinusoidal timing reference signals and for modulating the amplitude of a first sinusoidal timing reference signal within the set of sinusoidal timing reference signals, wherein the set of sinusoidal timing reference signals comprises a first sinusoidal timing reference signal and a second sinusoidal timing reference signal, the first sinusoidal timing reference signal having a fixed phase offset relative to the second sinusoidal timing reference signal; and a first local unit having an input, for providing a first local timing signal using a sinusoidal timing reference signal within the set of sinusoidal timing reference signals and for demodulating the first sinusoidal timing reference signal, the input of the first local unit coupled to the output of the master unit.

21. The system of claim 20, further comprising a second local unit having an input, for providing a second local timing signal using a sinusoidal timing reference signal within the set of sinusoidal timing reference signals and for demodulating the first sinusoidal timing reference signal, the input of the second local unit coupled to the output of the master unit.

22. A system for flexible-frequency clocking and messaging comprising:

a master unit having an oscillator for producing a set of sinusoidal timing reference signals and a modulator for changing the amplitude of a first sinusoidal timing reference signal within the set of sinusoidal timing reference signals in response to a control signal, the master unit having an output, wherein the set of sinusoidal timing reference signals comprises a first sinusoidal timing reference signal and a second sinusoidal timing reference signal, the first sinusoidal timing reference signal having a fixed phase offset relative to the second sinusoidal timing reference signal; and a local unit having an offset oscillator for producing an offset signal, a mixer for producing a local timing signal using the offset signal and a sinusoidal timing reference signal within the set of sinusoidal timing reference signals, a first reprogrammable frequency divider for providing a frequency-divided version of the local timing signal, a second reprogrammable frequency divider for providing a frequency-divided version of a sinusoidal timing reference signal within the set of sinusoidal timing reference signals, a phase and frequency detector for controlling the offset oscillator based upon a frequency difference and a phase difference between the frequency-divided version of the local timing signal and the frequency-divided version of the sinusoidal timing reference signal, and a demodulation unit for demodulating the first sinusoidal timing reference signal within the set of sinusoidal timing reference signals, the local unit having an input coupled to the output of the master unit.

23. A method for clocking comprising the steps of:

generating a set of sinusoidal timing reference signals within a master unit, wherein the set of sinusoidal timing reference signals comprises a first sinusoidal timing reference signal and a second sinusoidal timing reference signal, the first sinusoidal timing reference signal maintaining a fixed phase relationship with the second sinusoidal timing reference signal;

receiving a first sinusoidal timing reference signal within the set of sinusoidal timing reference signals at a first local unit; and generating a first local timing signal using the first sinusoidal timing reference signal.

24. The method of claim 23, wherein the phase relationship is a quadrature phase relationship.

25. The method of claim 23, wherein the step of generating the first local timing signal comprises the step of generating a local timing reference signal phase-locked to the first sinusoidal timing reference signal.

26. The method of claim 23, wherein the step of generating the first local timing signal comprises the steps of:

generating an offset signal; and performing a frequency conversion using the offset signal and the first sinusoidal timing reference signal.

27. The method of claim 26, wherein the step of generating the first local timing signal further comprises the step of providing a high-frequency mixing product signal to a limiter to produce the first local timing signal.

28. The method of claim 23, further comprising the steps of:

generating a frequency-divided version of the first local timing signal;

generating a frequency-divided version of the first sinusoidal timing reference signal; and phase-locking the frequency-divided version of the first sinusoidal timing reference signal to the frequency-divided version of the first local timing signal.

29. The method of claim 28, wherein the step of generating the frequency-divided version of the first local timing signal comprises the substep of programmably specifying a frequency divider constant.

30. The method of claim 23, further comprising the steps of:

receiving the first sinusoidal timing reference signal within the set of sinusoidal timing reference signals at a second local unit; and generating a second local timing signal using the first sinusoidal timing reference signal within the second local unit.

31. The method of claim 30, further comprising the step of distributing the first sinusoidal timing reference signal to each local unit using a single scalable passive signal distribution means.

32. A method for combined clocking and messaging comprising the steps of:

generating a set of sinusoidal timing reference signals within a master unit, wherein the set of sinusoidal timing reference signals comprises the first sinusoidal timing reference signal and a second sinusoidal timing reference signal, the first and second sinusoidal timing reference signals maintaining a fixed phase relationship;

modulating the amplitude of a first sinusoidal timing reference signal according to a first control signal;

receiving the modulated first sinusoidal timing reference signal at a local unit;

generating a local timing signal using a sinusoidal timing reference signal within the set of sinusoidal timing reference signals; and demodulating the first sinusoidal timing reference signal to produce a messaging signal.

33. The method of claim 32, wherein the phase relationship is a quadrature phase relationship.

34. The method of claim 32, wherein the messaging signal comprises one from a group of a reset signal, an interrupt signal, and a data word.

35. The method of claim 32, further comprising the step of modulating the amplitude of a second sinusoidal timing reference signal within the set of sinusoidal timing reference signals according to a second control signal.

36. The method of claim 35, wherein the steps of modulating the amplitude of the first sinusoidal timing reference signal and modulating the amplitude of the second sinusoidal timing reference signal are performed according to Quadrature Amplitude Modulation.

37. The method of claim 32, wherein step of modulating is performed at a rate equal to the period of the first sinusoidal timing reference signal.

38. The method of claim 32, wherein the step of demodulating comprises the steps of:

producing a rectified version of the modulated first sinusoidal timing reference signal; and integrating the rectified version of the modulated first sinusoidal timing reference signal over a portion of its period.

39. The method of claim 38, further comprising the step of generating a bit sequence based upon a value generated during the step of integrating.

* * * * *